(12) United States Patent
Lablans

(10) Patent No.: US 10,831,093 B1
(45) Date of Patent: Nov. 10, 2020

(54) FOCUS CONTROL FOR A PLURALITY OF CAMERAS IN A SMARTPHONE

(71) Applicant: Peter Lablans, Morris Township, NJ (US)

(72) Inventor: Peter Lablans, Morris Township, NJ (US)

(73) Assignee: Spatial Cam LLC, Morristown, NJ (US)

(*) Notice: Subject to any disclaimer, the term of this patent is extended or adjusted under 35 U.S.C. 154(b) by 0 days.

(21) Appl. No.: 16/423,357

(22) Filed: May 28, 2019

Related U.S. Application Data

(63) Continuation-in-part of application No. 15/836,815, filed on Dec. 8, 2017, now Pat. No. 10,331,024, (Continued)

(51) Int. Cl.
| | |
|---|---|
| *H04N 11/02* | (2006.01) |
| *G03B 35/00* | (2006.01) |
| *H04N 5/232* | (2006.01) |
| *H04N 5/262* | (2006.01) |
| *H04N 13/246* | (2018.01) |
| *H04M 1/725* | (2006.01) |

(52) U.S. Cl.
CPC ......... *G03B 35/00* (2013.01); *H04N 5/23238* (2013.01); *H04N 5/2624* (2013.01); *H04N 13/246* (2018.05); *H04M 1/7253* (2013.01); *H04M 1/72527* (2013.01); *H04M 2250/16* (2013.01)

(58) Field of Classification Search
CPC ...................................................... G03B 35/00
USPC ........................................................... 348/46
See application file for complete search history.

(56) References Cited

U.S. PATENT DOCUMENTS

| | | | | |
|---|---|---|---|---|
| 4,577,827 A | * | 3/1986 | Eliscu | F16M 11/08 248/183.4 |
| 4,640,481 A | * | 2/1987 | Kohno | F16M 11/10 248/126 |

(Continued)

FOREIGN PATENT DOCUMENTS

GB      1021736.2      12/2010

OTHER PUBLICATIONS

Wikipedia, Image stabilization, online webpage at https://en.wikipedia.org/w/index.php?title=Image_stabilization&oldid=892981277, last edited Apr. 18, 2019.

(Continued)

*Primary Examiner* — Leron Beck

(57) ABSTRACT

Methods and apparatus to create and display screen stereoscopic and panoramic images are disclosed. Methods and apparatus are provided to generate multiple images that are combined into a stereoscopic or a panoramic image. An image may be a static image. It may also be a video image. A controller provides correct camera settings for different conditions. A focus sensor is included and determines a focus setting of one lens/sensor unit having a plurality of focus settings. Focus settings of other lens/sensor units are associated with the focus settings determined for the one lens/sensor unit. A focus mechanism controlled by the controller sets the focus settings of the plurality of lens/sensor units based on the focus setting of the one lens/sensor unit determined by the focus sensor.

14 Claims, 20 Drawing Sheets

Related U.S. Application Data which is a continuation of application No. 12/983,168, filed on Dec. 31, 2010, now abandoned, which is a continuation-in-part of application No. 12/634,058, filed on Dec. 9, 2009, now abandoned, which is a continuation-in-part of application No. 12/538,401, filed on Aug. 10, 2009, now Pat. No. 8,355,042, said application No. 12/983,168 is a continuation-in-part of application No. 12/435,624, filed on May 5, 2009, now Pat. No. 8,164,655.

(60) Provisional application No. 61/365,347, filed on Jul. 18, 2010, provisional application No. 61/322,875, filed on Apr. 11, 2010, provisional application No. 61/291,861, filed on Jan. 1, 2010, provisional application No. 61/106,768, filed on Oct. 20, 2008, provisional application No. 61/106,025, filed on Oct. 16, 2008, provisional application No. 61/089,727, filed on Aug. 18, 2008, provisional application No. 61/055,272, filed on May 22, 2008, provisional application No. 61/054,290, filed on May 19, 2008.

(56) References Cited

U.S. PATENT DOCUMENTS

| | | | | |
|---|---|---|---|---|
| 4,866,430 A * | | 9/1989 | Chek | H05B 33/0818 345/82 |
| 4,999,713 A * | | 3/1991 | Ueno | H04N 13/296 348/240.3 |
| 5,434,617 A * | | 7/1995 | Bianchi | G01S 3/7865 348/169 |
| 5,537,251 A * | | 7/1996 | Shimada | G02B 27/2285 359/462 |
| 5,612,732 A * | | 3/1997 | Yuyama | H04N 1/0044 348/14.01 |
| 5,947,359 A * | | 9/1999 | Yoshie | B60R 11/0241 224/552 |
| 6,029,073 A * | | 2/2000 | Lebby | G02B 23/18 345/1.1 |
| 6,069,593 A * | | 5/2000 | Lebby | G06F 3/1423 345/1.1 |
| 6,076,978 A * | | 6/2000 | McIlvenna | G03B 17/38 396/425 |
| 6,157,379 A * | | 12/2000 | Singh | G06F 3/04886 345/173 |
| 6,160,607 A * | | 12/2000 | Diaconu | G02B 7/30 352/139 |
| 6,388,571 B1 * | | 5/2002 | Kirino | G08B 13/19641 340/506 |
| 6,392,694 B1 * | | 5/2002 | Bianchi | H04N 7/181 348/169 |
| 6,421,069 B1 * | | 7/2002 | Ludtke | G06F 9/4415 715/762 |
| 6,445,293 B1 * | | 9/2002 | Alonso | G06Q 20/389 340/541 |
| 6,512,670 B1 * | | 1/2003 | Boehme | G06F 1/1616 312/223.2 |
| 6,747,610 B1 * | | 6/2004 | Taima | G09G 3/003 345/6 |
| 6,781,635 B1 * | | 8/2004 | Takeda | H04M 1/72527 348/552 |
| 6,819,355 B1 * | | 11/2004 | Niikawa | H04N 1/00204 348/207.11 |
| 6,853,809 B2 * | | 2/2005 | Pelletier | G08B 13/19628 348/159 |
| 6,992,733 B1 * | | 1/2006 | Klein | G02B 6/0021 349/58 |
| 7,103,698 B2 * | | 9/2006 | Zhang | G06F 1/1632 361/679.3 |
| 7,109,990 B1 * | | 9/2006 | Oler | G09G 3/3611 345/101 |
| 7,161,618 B1 | | 1/2007 | Niikawa et al. | |
| 7,209,176 B2 | | 4/2007 | Chapman | |
| 7,221,395 B2 * | | 5/2007 | Kinjo | H04N 1/3872 348/239 |
| 7,355,305 B2 | | 4/2008 | Nakumara et al. | |
| 7,376,441 B2 * | | 5/2008 | Lee | H04M 1/72527 341/176 |
| 7,379,664 B2 * | | 5/2008 | Marcus | G03B 17/38 348/211.11 |
| 7,418,275 B2 * | | 8/2008 | Yiu | H04M 1/021 455/550.1 |
| 7,429,988 B2 * | | 9/2008 | Gonsalves | G06F 3/0481 345/157 |
| 7,460,781 B2 * | | 12/2008 | Kanai | H04N 5/23203 348/211.3 |
| 7,477,919 B2 * | | 1/2009 | Warren | H04M 1/7253 455/557 |
| 7,495,694 B2 * | | 2/2009 | Cutler | H04N 5/2259 348/218.1 |
| 7,526,586 B2 * | | 4/2009 | Huber | G06F 1/1616 710/72 |
| 7,636,132 B2 * | | 12/2009 | Sakamoto | H04L 29/06027 348/723 |
| 7,643,066 B2 * | | 1/2010 | Henninger, III | G06K 9/00771 348/211.99 |
| 7,688,203 B2 | | 3/2010 | Rockefeller et al. | |
| 7,734,254 B2 | | 6/2010 | Frost et al. | |
| 7,741,961 B1 | | 6/2010 | Raffi et al. | |
| 7,835,736 B2 * | | 11/2010 | Larocca | H04L 12/185 455/418 |
| 7,869,117 B2 * | | 1/2011 | Choi | G02F 1/167 250/458.1 |
| 7,911,493 B2 * | | 3/2011 | Sarma | H04M 1/7253 348/14.01 |
| 7,933,512 B2 * | | 4/2011 | Campbell | G03B 35/00 396/325 |
| 8,077,243 B2 * | | 12/2011 | Morita | G06F 3/0483 348/333.01 |
| 8,180,410 B2 * | | 5/2012 | Kim | H04M 1/0266 345/32 |
| 8,233,090 B2 * | | 7/2012 | Chun | H04H 60/80 348/552 |
| 8,284,288 B2 * | | 10/2012 | Kitamori | H04N 5/772 348/211.5 |
| 8,300,086 B2 * | | 10/2012 | Pockett | H04N 13/246 13/246 |
| 8,311,513 B1 * | | 11/2012 | Nasserbakht | G06Q 10/109 455/410 |
| 8,325,239 B2 * | | 12/2012 | Kaplan | H04N 5/2252 348/207.1 |
| 8,350,923 B2 * | | 1/2013 | Nakayama | B60R 1/00 340/937 |
| 8,619,021 B2 * | | 12/2013 | Hayton | G06F 3/044 345/107 |
| 8,659,666 B2 * | | 2/2014 | Ishibashi | H04N 21/4425 348/207.1 |
| 8,675,071 B1 * | | 3/2014 | Slavin | H04M 11/04 348/143 |
| 9,939,608 B2 | | 4/2018 | Peng et al. | |
| 10,033,303 B2 | | 7/2018 | Liu et al. | |
| 10,203,515 B2 | | 2/2019 | Liu et al. | |
| 10,205,879 B2 | | 2/2019 | Segapelli | |
| 10,274,129 B2 | | 4/2019 | Saika | |
| 10,277,821 B2 | | 4/2019 | Shigeoka | |
| 10,277,858 B2 | | 4/2019 | Kankaanpaa et al. | |
| 10,281,737 B2 | | 5/2019 | Park et al. | |
| 10,284,782 B2 | | 5/2019 | Yamazaki | |
| 2002/0094845 A1 * | | 7/2002 | Inasaka | H04M 1/05 455/566 |
| 2003/0155413 A1 * | | 8/2003 | Kovesdi | G06F 16/954 235/375 |
| 2003/0226951 A1 * | | 12/2003 | Ye | G03F 7/70591 250/208.1 |
| 2004/0227840 A1 * | | 11/2004 | Houlberg | H04N 5/23203 348/345 |

(56) References Cited

U.S. PATENT DOCUMENTS

| | | | |
|---|---|---|---|
| 2004/0263659 A1* | 12/2004 | Abe | H04N 5/23293 348/333.01 |
| 2006/0061951 A1* | 3/2006 | Hara | G06F 1/1601 361/679.22 |
| 2006/0114987 A1* | 6/2006 | Roman | H04N 7/142 375/240.01 |
| 2006/0187312 A1* | 8/2006 | Labaziewicz | H04N 5/225 348/218.1 |
| 2006/0259942 A1* | 11/2006 | Toyama | H04M 1/72527 725/133 |
| 2007/0010200 A1* | 1/2007 | Kaneko | G01S 11/14 455/41.2 |
| 2007/0248260 A1* | 10/2007 | Pockett | H04N 13/327 382/154 |
| 2007/0254640 A1 | 11/2007 | Bliss | |
| 2008/0002023 A1* | 1/2008 | Cutler | G06T 3/4038 348/36 |
| 2008/0024596 A1* | 1/2008 | Li | H04N 5/2257 348/47 |
| 2008/0024614 A1* | 1/2008 | Li | H04N 5/225 348/207.99 |
| 2008/0064437 A1* | 3/2008 | Chambers | H04N 1/00307 455/556.1 |
| 2008/0136990 A1* | 6/2008 | Kimura | H01L 27/1218 349/46 |
| 2008/0147730 A1* | 6/2008 | Lee | G06F 16/9537 |
| 2008/0214239 A1* | 9/2008 | Hashimoto | G06F 3/0481 455/557 |
| 2008/0219654 A1* | 9/2008 | Border | H04N 5/23212 396/89 |
| 2008/0239170 A1* | 10/2008 | Klosowiak | G03B 37/06 348/744 |
| 2008/0303888 A1* | 12/2008 | Hansson | H04N 7/147 348/14.02 |
| 2009/0003630 A1* | 1/2009 | Kuroda | H04M 1/03 381/150 |
| 2009/0086015 A1* | 4/2009 | Larsen | F41G 3/165 348/46 |
| 2009/0153686 A1 | 6/2009 | Huang | |
| 2009/0186603 A1* | 7/2009 | Usami | H04M 1/274516 455/414.2 |
| 2010/0026720 A1* | 2/2010 | Hotta | G06F 1/1616 345/652 |
| 2010/0177111 A1* | 7/2010 | Abe | G09G 3/3406 345/589 |
| 2010/0214398 A1 | 8/2010 | Goulart et al. | |
| 2010/0245585 A1 | 9/2010 | Fisher et al. | |
| 2010/0270970 A1* | 10/2010 | Toya | H02J 7/0027 320/108 |
| 2011/0058052 A1 | 3/2011 | Bolton et al. | |
| 2011/0091195 A1* | 4/2011 | Goldberg | G03B 17/56 396/419 |
| 2011/0095999 A1* | 4/2011 | Hayton | G06F 1/1626 345/173 |
| 2011/0205340 A1 | 8/2011 | Garcia et al. | |
| 2011/0216166 A1* | 9/2011 | Takahashi | H04N 13/20 348/46 |
| 2011/0310243 A1* | 12/2011 | Fuhrmann | G01N 21/9036 348/92 |
| 2012/0090004 A1* | 4/2012 | Jeong | H04N 5/44513 725/39 |
| 2012/0212409 A1* | 8/2012 | Abe | H04N 5/23203 345/156 |
| 2012/0218379 A1* | 8/2012 | Ozcan | G01N 15/1475 348/40 |
| 2013/0057762 A1* | 3/2013 | Yoshida | G08C 17/02 348/552 |

OTHER PUBLICATIONS

Niftychic, Micro Security Camera, downloaded from https://niftychic.net/products/micro-security-camera?variant=8855162224701&gclid=EAIaIQobChMIvObs6t_74QIVkozICh3ekA5JEAQYBCABEgJRIPD_BwE.

Jim Morrison et al., Apple iPhone SE Teardown, downloaded May 15, 2019 from http://www.chipworks.com/ko/node/359.

Omnivision, OVM9724 CameraCubeChip, Product Brief, downloaded from https://www.ovt.com/download/sensorpdf/144/OmniVision_OVM9724.pdf.

Naneye/Naneye Stereo, Miniature Camera Module, Datasheet DS000501, 2018-)ct-05 dowloaded from https://ams.com/documents/20143/36005/NanEye_NanEyeStereo_DS000501_2-02.pdf/f46c15da-52fb-78fd-aea6-faf4cf784da2.

Dr. Ing. Janocha, Saarland University, Microactuators—Principles, Applications, Trends, dowloaded May 14, 2019 from http://www.lpa.uni-saarland.de/pdf/a2-1.pdf.

Squiggle Micro Motor Technology, Inside the M3 Module, dowlnoaded on May 21, 2019 from https://www.newscaletech.com/resources/technology/squiggle-micro-motor-technology/.

* cited by examiner

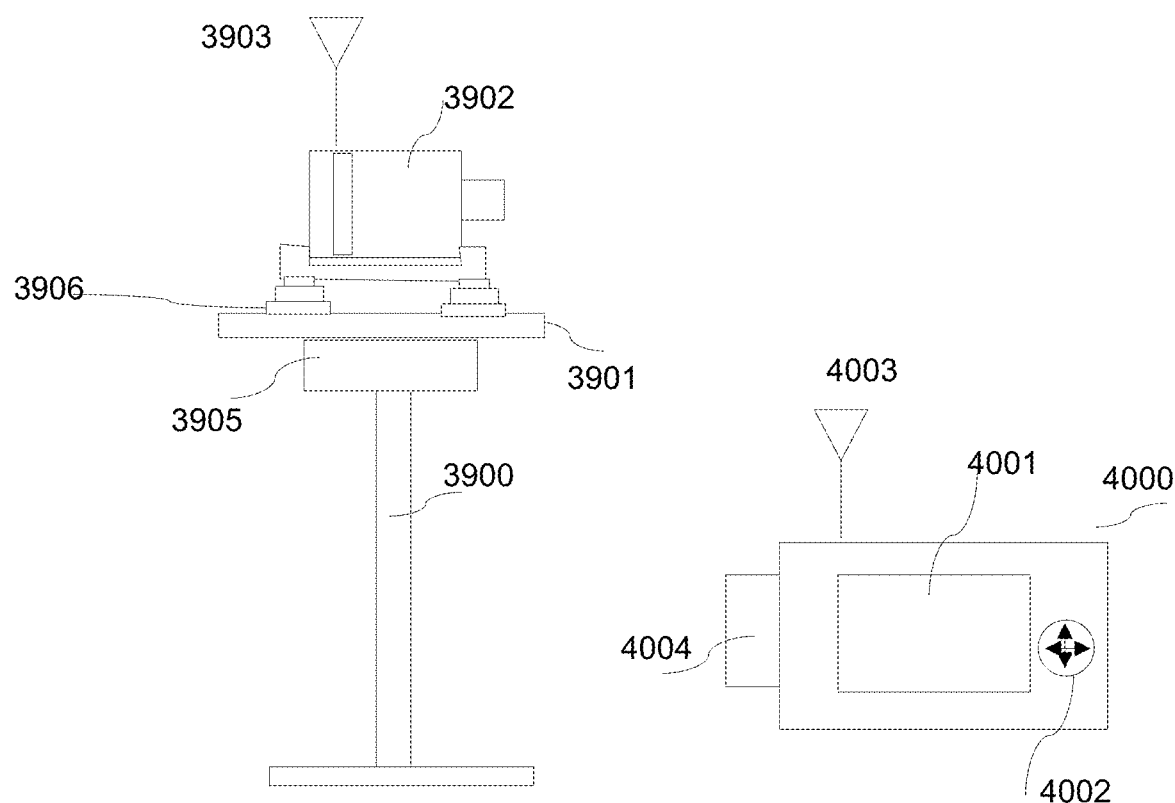
FIG. 37
FIG. 38
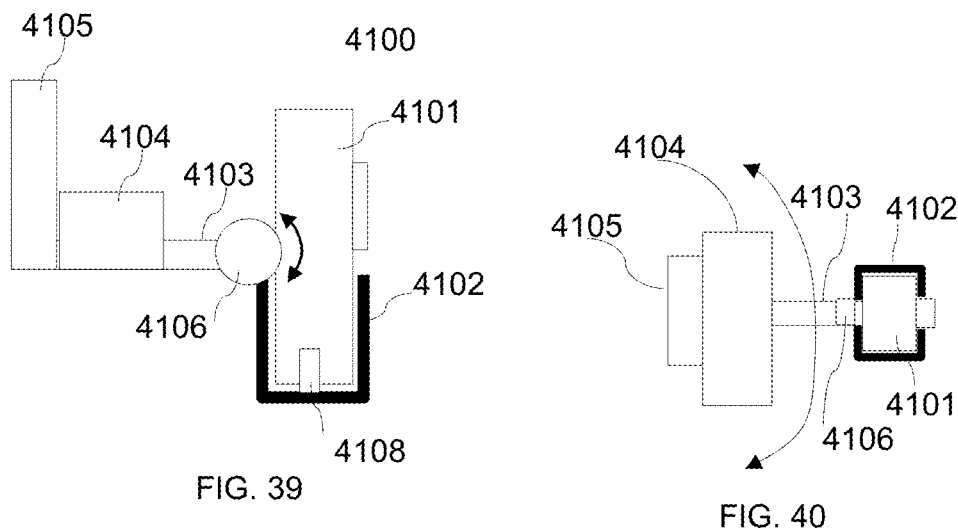
FIG. 39
FIG. 40

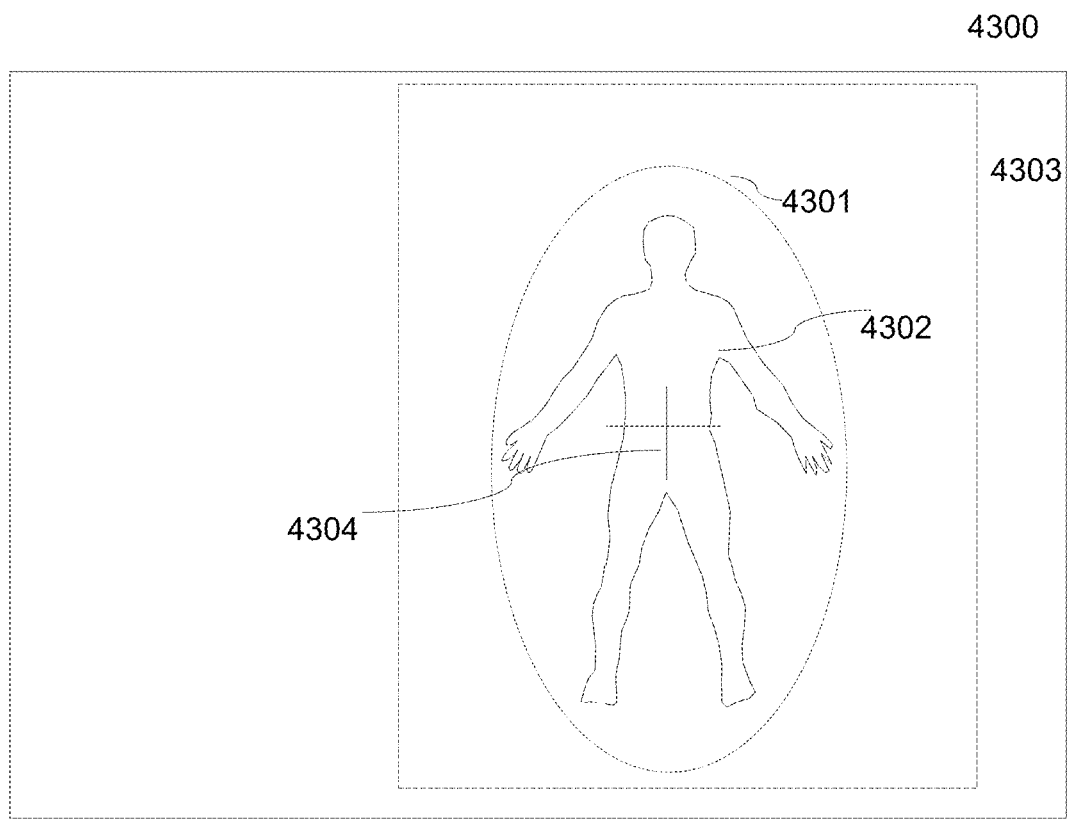
FIG. 41
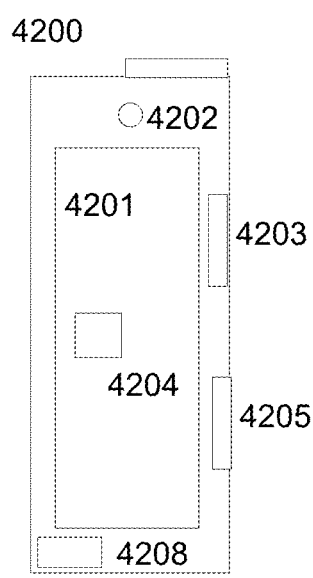
FIG. 42
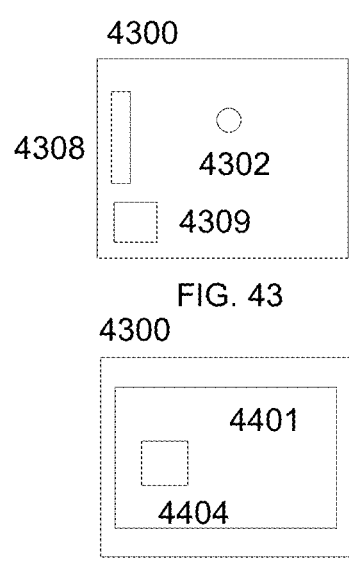
FIG. 43
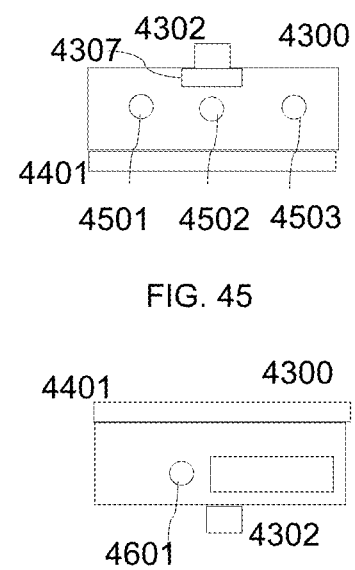
FIG. 45
FIG. 44
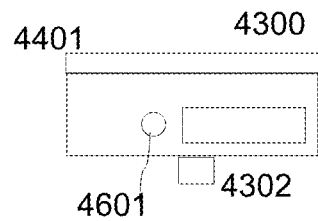
FIG. 46

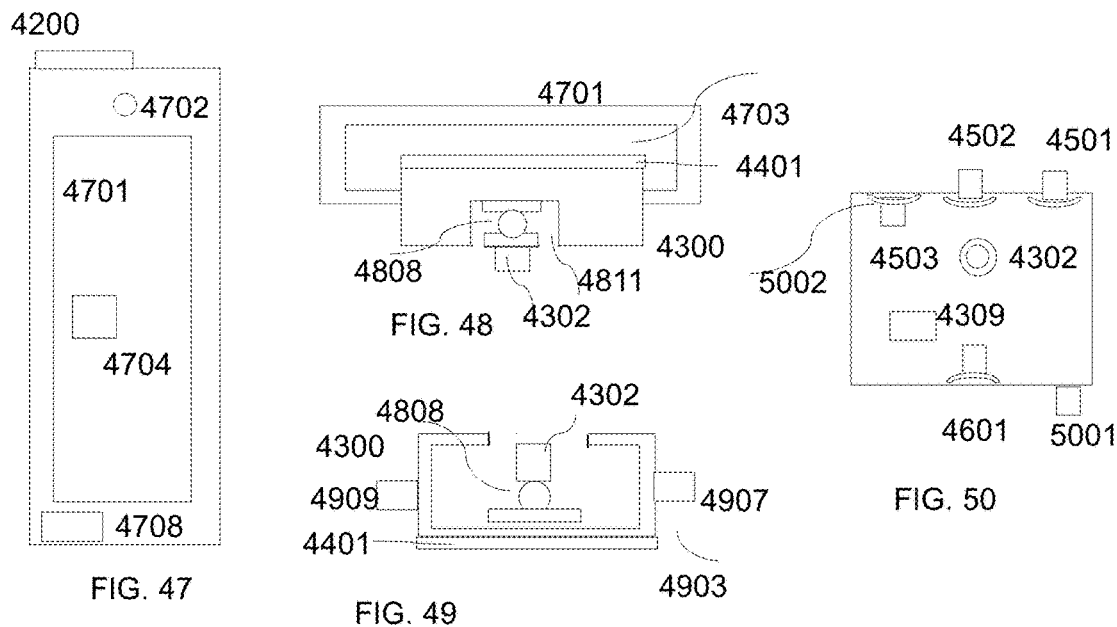
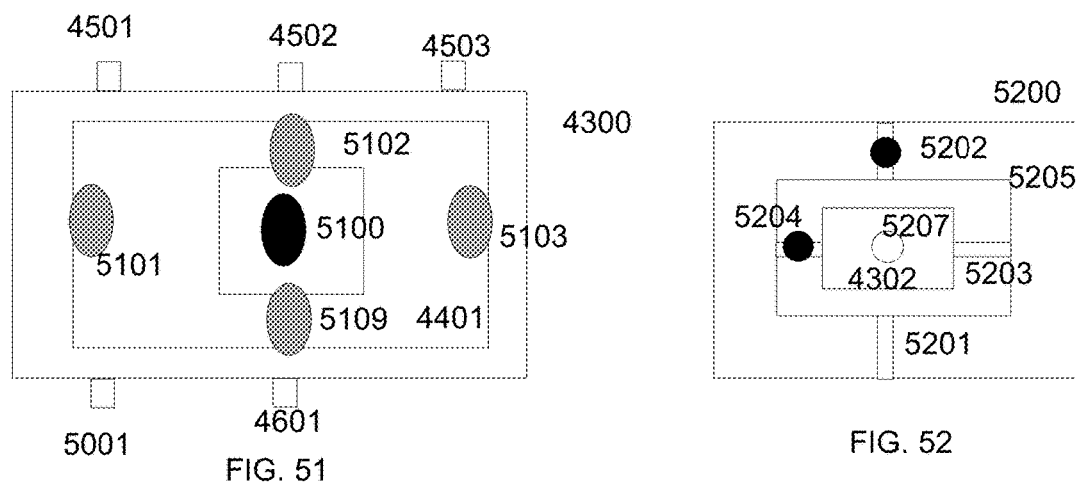
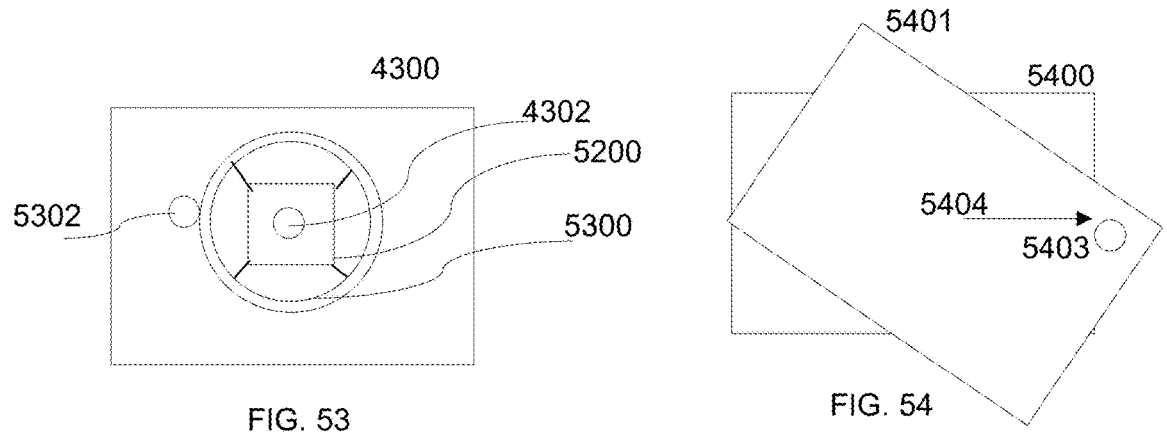

FOCUS CONTROL FOR A PLURALITY OF CAMERAS IN A SMARTPHONE

STATEMENT OF RELATED CASES

This application is a continuation-in-part and claims the benefit of U.S. Non-provisional patent application Ser. No. 15/836,815 filed on Dec. 8, 2017 which is incorporated herein by reference. U.S. Non-provisional patent application Ser. No. 15/836,815 is a continuation of and claims the benefit of U.S. Non-provisional patent application Ser. No. 12/983,168 filed on Dec. 31, 2010, which is incorporated herein by reference. Application Ser. No. 12/983,168 claims the benefit of U.S. Provisional Patent Application Ser. No. 61/365,347, filed on Jul. 18, 2010, of U.S. Provisional Patent Application Ser. No. 61/322,875, filed on Apr. 11, 2010, and of U.S. Provisional Patent Application Ser. No. 61/291,861, filed on Jan. 1, 2010, which are all incorporated herein by reference in their entirety. Patent Application Ser. No. 12/983,168 is a continuation-in-part of U.S. Non-provisional patent application Ser. No. 12/634,058 filed on Dec. 9, 2009, which is a continuation-in part of U.S. Non-provisional patent application Ser. No. 12/538,401 filed on Aug. 10, 2009, now U.S. Pat. No. 8,355,042 issued on Jan. 15, 2013, which are all incorporated herein by reference in their entirety. Application Ser. No. 12/538,401 claims the benefit of U.S. Provisional Patent Application Ser. No. 61/106,025, filed Oct. 16, 2008, and of U.S. Provisional Patent Application Ser. No. 61/106,768, filed Oct. 20, 2008, which are both incorporated herein by reference in their entirety. Patent application Ser. No. 12/983,168 is also a continuation-in-part of U.S. Non-provisional patent application Ser. No. 12/435,624 filed on May 5, 2009 now U.S. Pat. No. 8,164,655 issued on Apr. 24, 2012, which is incorporated herein by reference in its entirety. Application Ser. No. 12/435,624 claims the benefit of U.S. Provisional Patent Application Ser. No. 61/089,727, filed Aug. 18, 2008, and of U.S. Provisional Patent Application Ser. No. 61/055,272, filed May 22, 2008, and of U.S. Provisional Patent Application Ser. No. 61/054,290, filed May 19, 2008, which are all incorporated herein by reference in their entirety. All of the above cases are incorporated herein by reference.

BACKGROUND OF THE INVENTION

The present invention relates to digital image devices. More specifically, it relates to a portable display that is connectable to a portable computing device which has a digital camera. The camera being able to record single image in one embodiment and at least 2 images concurrently in a second embodiment and generate a stereoscopic image from those at least two images, or a panoramic image or a stereoscopic or panoramic image related to an existing image to be displayed on the connectable display.

Digital cameras in smartphones are increasingly popular. The digital images taken by these devices use a digital sensor and a memory which can store data generated by the sensor. Data may represent a still image. Data may also represent a video image. Images may be viewed on the device. Images may also be transferred to an external device, either for viewing, for storage or for further processing.

The processes of picture taking for creating a panoramic or stereoscopic image are processes that have many different technologies, apparatus and methods. Very common is the method of taking a first picture with a single lens camera, followed by taking at least a second picture at a later time, and followed by combining the pictures. This method is not very user friendly or requires complex cameras or complex camera settings. Furthermore, this method may be troublesome for creating video images.

Images taken by a small computing device can usually be displayed on a small integrated display screen on the computing device. The quality and the size of such integrated display screens is barely adequate and serves to provide feedback on reviewing an image, not for long time viewing of video or for high quality display of images. Furthermore, multiple cameras have to be controlled in order to take related pictures with these cameras and individually setting controls of each camera may be cumbersome.

Accordingly, novel and improved control of multiple cameras is required.

SUMMARY OF THE INVENTION

One aspect of the present invention presents novel methods and systems for recording, processing storing and concurrent displaying of a plurality of images which may be video programs into a panoramic or a stereoscopic image.

In accordance with an aspect of the present invention, an apparatus is provided for generating a combined image from at least a first and a second image of a scene with a camera having at least a first lens being associated with a first image sensor for generating the first image and a second lens being associated with a second image sensor for generating the second image, comprising an operational memory, enabled to store and provide data related to a first setting of the second lens including an active sensor area, the first setting of the second lens being associated with data related to a first setting of the first lens, a controller, applying data related to the first setting of the first lens for retrieving from the memory data related to the first setting of the second lens, the controller using the retrieved data for processing image data related to the active sensor area of the second sensor to create a stereoscopic image.

In accordance with yet another aspect of the present invention the camera system is provided, wherein the camera system is part of a mobile phone.

DESCRIPTION OF THE DRAWINGS

FIG. 37 illustrates a remote controlled platform for a camera in accordance with an aspect of the present invention;

FIG. 38 illustrates a display in accordance with an aspect of the present invention;

FIGS. 39-40 illustrate a remote controlled platform for a camera in accordance with an aspect of the present invention; and FIG. 41 illustrates a screen of a display in accordance with an aspect of the present invention.

FIG. 42 illustrates a computing device in accordance with an aspect of the present invention.

FIGS. 43, 44, 45 and 46 illustrate a computing device with a camera in accordance with an aspect of the present invention.

FIG. 47 illustrates a computing device in accordance with an aspect of the present invention.

FIGS. 48, 49, 50 and 51 illustrate a computing device with a camera in accordance with an aspect of the present invention.

FIGS. 52, 53 and 54 illustrate a mechanism for a camera in accordance with an aspect of the present invention.

DESCRIPTION OF A PREFERRED EMBODIMENT

Figure 1:
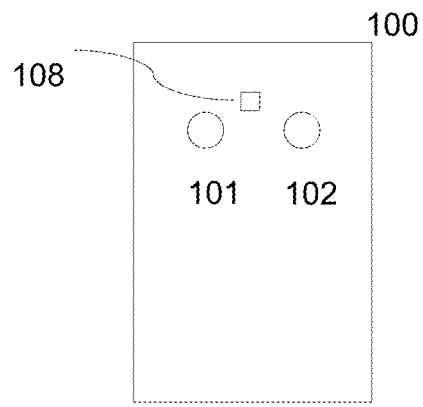
FIG. 1 is a diagram of a camera for panoramic and/or images in frontal view in accordance with an aspect of the present invention.

FIG. 1 shows in diagram a camera 100 having at least two lens/sensor units 101 and 102. A lens/sensor unit contains a lens that corresponds to an image sensor and the image sensor enabled to generate a plurality of signals generated by picture elements on the sensors.

An image sensor is associated with a lens. A lens may be combined with a sensor in a housing. The combination of a lens with its associated sensor is called a lens/sensor unit. A lens in one embodiment of the present invention is a fixed focus lens. In a further embodiment of the present invention a lens has a focus mechanism. A focus mechanism can be a manual focus mechanism, for instance by rotating the lens. In yet a further embodiment of the present invention, a lens has an auto-focus mechanism. Part of an autofocus-mechanism can be a distance sensor 108 as illustrated in FIG. 1. In one embodiment of the present invention, the multiple lenses are controlled by a single distance sensor and based on a measured distance all of the lenses of the at least two lens/sensor units are controlled via a single distance sensor. The distance sensor is shown as a sensor 108 outside the lenses. However, in one embodiment of the present invention, the distance sensor for focus setting is a through-the-lens distance sensor.

In one embodiment of the present invention the at least two lens/sensor units are applied to combine two images into a single three-dimensional or stereoscopic image. In that case the camera of FIG. 1 is a stereoscopic camera. In one embodiment of the present invention the at least two lens/sensor units are used to create a panoramic image of a scene. In that case there may be more than two lens/sensor units and the camera of FIG. 1 is called a panoramic camera.

During a calibration an active area of an image sensor can be defined, the active area being smaller than the actual pixel area of the sensor. Pixels are generally read in horizontal lines, called scan lines. A sensor can also be read in not horizontal lines, vertical lines, slanted lines or in a pseudo-random pattern. The sensor data can be stored in a memory. In accordance with an aspect of the present invention a processor processes only pixels or pixel data related to an active area of an image sensor. In one embodiment of the present invention a memory only stores pixels from an active sensor area. In a further embodiment of the present invention a part of the memory is defined that only stores pixels generated by an active area of a sensor. In a further embodiment of the present invention a processor is instructed to read and/or process only data from memory related to an active sensor area. In an embodiment of the present invention a processor is instructed to process data depending on its position in a sensor with regards to the active sensor area.

Figure 2:
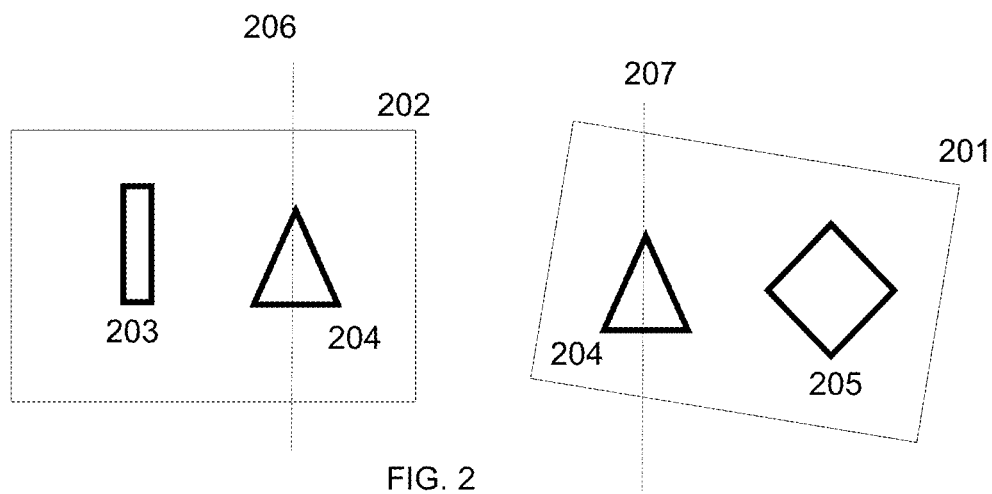
FIGS. 2 and 3 illustrate a panoramic image created in accordance with an aspect of the present invention.

It is known that more than 2 lens/sensor units may be applied to generate a panoramic image. For instance 3 or more lens/sensor units may be applied. To keep the explanation simple only 2 lens/sensor units 201 and 202 are shown in FIG. 2. Lens/sensor unit 201 corresponds to lens 101 and unit 202 corresponds to lens 102. In manufacturing it may be difficult to perfectly align the units 201 and 202 along their (usually horizontal) scan lines of the sensors. If one sensor is even slightly rotated compared to the other it will require additional measures to form an aligned panoramic image.

FIG. 2 shows three objects 203, 204 and 205 in a scene to be recorded by the camera as a panoramic image. The sensors 201 and 202 are in transformed positions relative to each other, including a translation and a rotation. In order to create a panoramic image during a calibration step that may include determining a distance of the lens to an object and a setting of a lens and/or the camera, for each of the sensors a merge line 206 and 207 is determined. These merge lines help define the active areas of the sensors. An active area of a sensor is the area of pixels that will be used to create and will appear in the panoramic image. The merge lines and thus the active area may change with camera setting and/or distance to objects or other imaging conditions.

Figure 3:
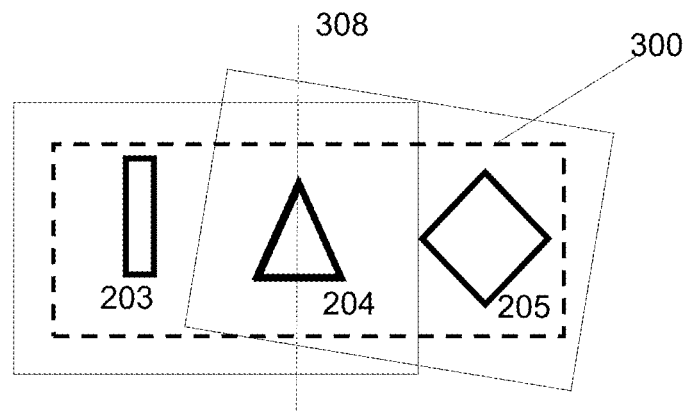

Both sensors have an area of overlap, so when their images are combined along the merge line 308, as shown in FIG. 3, a panoramic image 300 is formed. One has to address the rotation before images can be merged. One may adjust for rotation by for instance instructing a processor to read pixels in such a manner that the read pixel lines are aligned.

One may also create an adjusted scanning direction based on a measured rotational misalignment. These adjustments including interpolation take place preferably before demosaicing of the raw image data. In one embodiment of the present invention, areas and parameters in image data are defined to perform for instance smoothing and blurring and pixel equalization to create a smooth transition between two active pixel areas. In a further embodiment of the present invention the image data is stored and/or displayed as a panoramic image, or the processed or raw but aligned data is stored in such a manner that a panoramic image is formed by merging two images each created from active sensor areas. (keeping in mind that one may also use three or more lens/sensor units.)

In one embodiment of the present invention the camera with at least two sensor/lens units is calibrated for different conditions such as distance or focus setting, to associate a condition such as focus setting with all required settings to create an appropriate panoramic image and store those settings in a memory. When during operation of the camera a particular condition is present, a controller retrieves all associated settings from the memory and applies all the settings in processing image data to generate the panoramic image.

In accordance with another aspect of the present invention, a method is provided for creating a stitched panoramic image from at least a first and a second image of a scene with a camera having at least a first lens being associated with a first image sensor for generating the first image and a second lens being associated with a second image sensor for generating the second image, comprising setting the first lens in a first focus setting on the scene, associating a first focus setting of the second lens with the first focus setting of the first lens, storing data related to the first focus setting of the second lens in a memory, determining an alignment parameter related to an alignment of an area of the first image sensor with an area of the second image sensor, associating the alignment parameter with the first focus setting of the first lens, and storing the alignment parameter in the memory.

In accordance with yet another aspect of the present invention, a method is provided, further comprising placing the first lens in the first focus setting, retrieving from the memory data of a focus setting of the second lens by applying the first setting of the first lens, and driving a mechanism of the second lens under control of a controller to place the second lens in a position using the retrieved data of the focus setting of the second lens.

In accordance with yet another aspect of the present invention, a method is provided, further comprising retrieving from the memory the alignment parameter related to the focus setting of the first lens, and generating the stitched panoramic image by processing image data generated by the first image sensor and the second image sensor in accordance with the alignment parameter related to the focus setting of the first lens.

Figure 4:
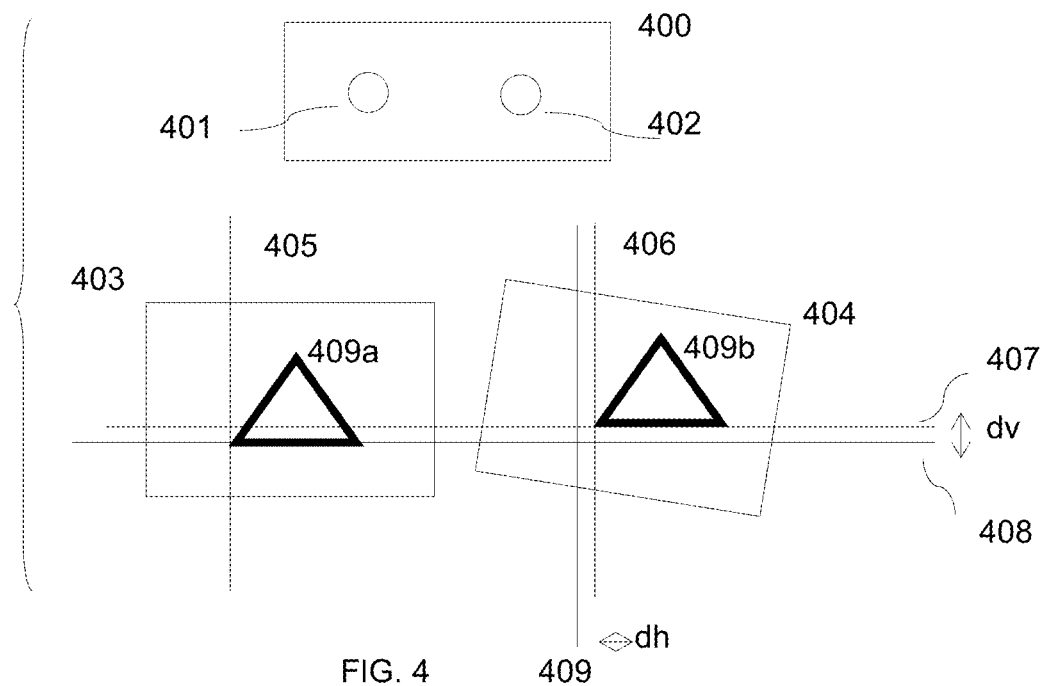
FIGS. 4, 5 and 6 illustrate a stereoscopic image created in accordance with yet another aspect of the present invention.
Figure 5:
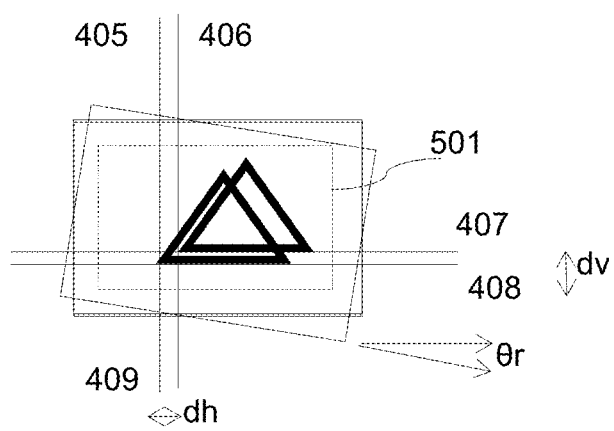

A similar but modified approach can be applied for creating stereoscopic images. This is illustrated in FIGS. 4 and 5. The issue here is also alignment of images. But rather than creating a wide image the issue in 3D images is to create two images with a predetermined amount of parallax, so that when displayed appropriately an impression is created of a 3D image. FIG. 4 shows a stereoscopic camera 400 with two lens/sensor units 410 and 402. In one embodiment of the present invention, camera 400 has at least one lens focus sensor. In a further embodiment of the present invention camera 400 has an autofocus mechanism that focuses both lenses 401 and 402. The distance between the lenses should be sufficient to create the appropriate stereoscopic image. One may also create a 'faux' stereoscopic image by combining two images that were taken with two lenses having a non standard parallax distance. The image sensors are shown as 403 and 404 and are in mirror image of the front view of the camera 400.

Lens/sensor unit 404 is shown to have a translation and rotation relative to 403. The rotational misalignment is an angle $\theta r$ and the vertical (translational) misalignment is dv. The vertical misalignment may be measured from an object 409 which is recorded as 409a by 403 and 409b by 404. In one embodiment of the present invention vertical alignment or merge lines 405 and 406 are defined in image sensors 403 and 404. For a stereoscopic image the objects need to be positioned on a display screen with a parallax displacement that is proportional to the distance of the object to the camera. It is assumed that the horizontal displacement of the images for the instant distance is dh which is defined by for instance the distance between the line 406 defined by a feature of the object and the parallax line 409. The images also have a vertical displacement dv defined by lines 407 and 408. In general one would like the vertical displacement to be close to 0.

FIG. 5 shows the aligned images to be appropriately displayed to create a 3D image. This may be done by a lenticular lenses display screen, by using parallax barriers, by using anaglyphs, by using alternately viewing left and right images by for instance using switching glasses or by any other appropriate 3D viewing system.

Figure 6:
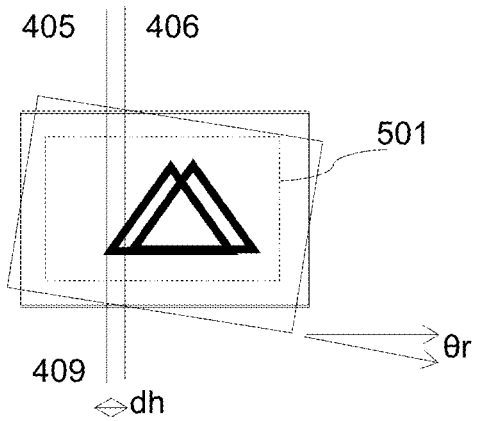

The rotational alignment is addressed as in the panoramic case. It is known that for most comfortable viewing by a viewer the rotational misalignment should be minimized. The horizontal and vertical alignment can be addresses by reading the appropriate pixel lines at the appropriate starting point. As in the case of the panoramic imaging one should calibrate the alignment for different conditions, for instance for different distances, zoom factors, light conditions and the like. FIG. 6 shows the combined images to generate a 3D image with appropriate horizontal parallax and no vertical displacement.

The camera, in one embodiment of the present invention, is calibrated for different conditions such as distance or focus setting, and a condition such as focus setting is associated with all required settings to create an appropriate 3D image and store those settings in a memory. When during operation of the camera a particular condition is present, a controller retrieves all associated settings from the memory and applies all the settings in processing image data to generate the 3D image.

The following 5 patent applications describe aspects of image alignment and calibration for stereoscopic and 3D images and are incorporated by reference herein in their entirety: U.S. patent application Ser. No. 12/435,624 filed on May 5, 2009, U.S. patent application Ser. No. 12/436,874, filed on May 7, 2009, U.S. patent application Ser. No. 12/538,401 filed on Aug. 10, 2009, U.S. patent application Ser. No. 12/634,058 filed on Dec. 9, 2009 and U.S. Provisional Patent Application 61/291,861 filed on Jan. 1, 2010.

Figure 7:
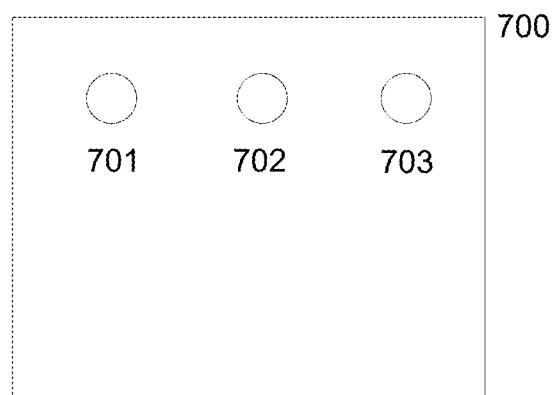
FIG. 7 is a diagram of a camera in frontal view in accordance with another aspect of the present invention.

In accordance with an aspect of the present invention a camera is provided with three lens/sensor units for creating panoramic pictures. This is illustrated in FIG. 7 with lens/sensor units 701, 702 and 703 in camera 700. In one embodiment of the present invention an autofocus mechanism, including a focus sensor is included. In one embodiment of the present invention the lenses are single focus lenses.

Figure 8:
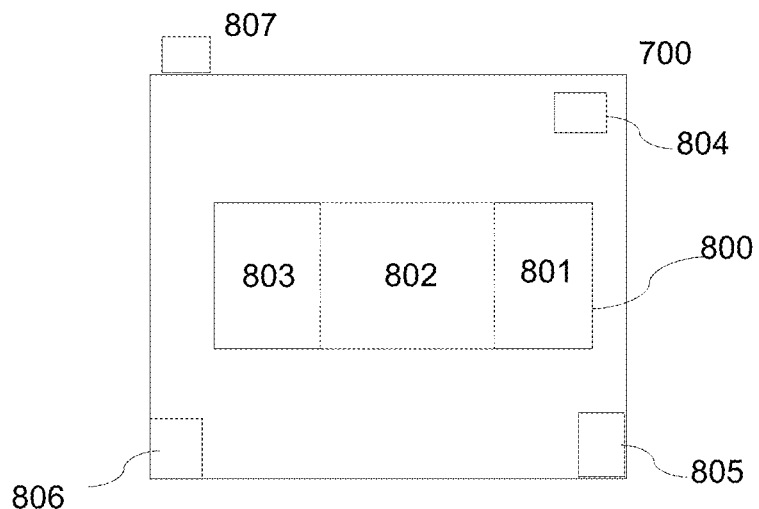
FIG. 8 is a diagram of a camera in rear view in accordance with a further aspect of the present invention.

Each of the images generated by these lens/sensor units can be combined to create a panoramic image. The camera may also have more than 3 lens/sensor units. The units 701, 702 and 703 are arranged in a row. One may apply a greater number of lens/sensor units and arrange these in different ways, such as multiple columns or multiple rows. FIG. 8 shows the back side of the camera 700 with a display screen 800 which in one embodiment of the present invention is divided in at least three segments 801, 802 and 803. One can select with a button 804 a first display mode which shows on one segment the complete image of one lens/sensor unit. For instance in the first mode segment 802 shows the image generated by lens/sensor unit 702. One may also display the image of other lens/sensor units in a display segment by selecting a display mode, for instance with button 804.

The camera 700 contains at least a processor to process image data and to control the settings of the camera and the display screen, wherein the button 804 for instance can be used to select a display mode. Such a button may take the camera through consecutive modes by pushing it briefly and a mode is selected by holding the button for a longer period of time. The camera also contains memory to store pre-set camera and display settings, which have been entered for instance during a calibration. The camera also contains a memory to store image data. The camera also contains a processor to process the sensor data according to preset settings and the memory can hold the processed image data, which can represent a still image or video images and can be a single lens/sensor unit based image or an image constructed from at least two lens/sensor units. The components such as controller for instance for controlling lens focus, lens aperture and shutter speed, memories, sensor data and image processor are connected internally for instance by a data bus. Such structures are known to one of ordinary skill in the art and are not shown in the figures to prevent obscuring the aspects of the present invention with known matter. Details of an internal processing and communication architecture of a digital camera is disclosed in for instance U.S. Pat. No. 7,676,150 to Nakashima issued on Mar. 9, 2010 and U.S. Pat. No. 7,667,765 to Turley et al. issued on Feb. 23, 2010 which are both incorporated herein by reference.

In a further embodiment of the present invention a control button enables a menu that is displayed on at least a segment of the display, allowing a user to select a mode of display and of taking an image. An image is recorded in a certain mode when the recording is activated by a button, for instance button 807. In one embodiment of the present invention all images recorded by the sensors are stored and the selected mode determines how the recorded image is displayed. For instance, in one mode only the image taken by the center lens/sensor unit is displayed. In another mode the created panoramic image is displayed.

In one mode the display screen functions as a view finder. The images (either single, or multiple single or panoramic) are shown in that mode, but are not recorded. In another mode the display acts as a view finder and an image is recorded. Often, for instance during performances or during meetings, people take pictures from a scene in front of them. To obtain an unobstructed view for a camera they lift the camera above their head. The display of the camera, acting as a viewer, continues to display the images thus acting as a light for a person on a distance behind the camera. In accordance with an aspect of the present invention a button is provided on the camera that switches off the display while keeping the camera in a recording mode. Such a button in a further embodiment switches the image display to a separate handheld display that shows the image recorded by the camera while the embedded display of the camera is switched off.

In a further mode an image is displayed on the display screen that is not being generated by one of the lens/sensor units but is for instance an archival image that is stored on the camera or that has been made available and transmitted to the display by another device. In one embodiment of the present invention the image is being displayed on the display screen that serves as a background to compare with an image from one or more lens/sensor units of the camera. For this purpose the image may be displayed in a low intensity. It may be enhanced with edges of objects in the image by an edge detector such as a Canny edge detector as is known in the art. The images viewed on the display screen that are provided by one or more of the lens/sensor units may be displayed in a transparent mode that overlays the archival or externally provided image.

In a further embodiment of the present invention one may also extract edges from the current image generated by a lens/sensor unit. Image registration by comparing edges and transformation of images is known. One may apply an image registration as is known to one of ordinary skill to match lens/sensor setting in such a way that the image generated by a lens/sensor optimizes a registration to the background image. Some aspects of using an archival image on a camera to improve an image are known and are described in U.S. Pat. No. 7,616,248 to Parulski et al. issued on Nov. 10, 2009 which is incorporated herein by reference.

The camera 700 also has an external port to dock to another device. Such a port may be a USB port, which allows the camera to be connected for instance to a computing device such as a computer for exchanging images. The port may also be used to connect the camera to a display having a large display screen to display the images taken by one or more lens/sensor units. The port may also be a wireless port.

In many cases a user may have a computing device such as a mobile phone that has a camera. Such camera may not be enabled to take images in a panoramic or a 3D mode. The camera 700 in a further embodiment of the present invention as illustrated in FIG. 8 has a communication port 806 that communicates directly with a mobile computing device such as a mobile phone. Such a port can be enabled to work in a wired mode. It may also be configured to work in a wireless mode. For instance, the camera may have a port 806 that is a Bluetooth port that can exchange data with a mobile phone. The mobile phone can provide camera 700 with an image that serves as an archival image. The camera 700 in one embodiment of the present invention provides the mobile phone with image data, for instance of a panoramic image. The cell phone may have a different resolution display screen than the camera 700. In a further embodiment of the present invention images are stored in a high resolution and are downsampled on a device to be displayed in an appropriate resolution on a display screen.

In accordance with a further aspect of the present invention one may import an image that is an image of an object that is segmented from its background. In a further aspect of the present invention the camera has processing capabilities to segment an object from its background. Such image segmentation algorithms are well known and are for instance described in an online lecture notes "Segmentation" by Professor Allan D. Jepson downloaded from <http://www-.cs.toronto.edu/~jepson/csc2503/segmentation.pdf> which is dated as Fall 2009 and which is incorporated herein by reference.

Figure 10:
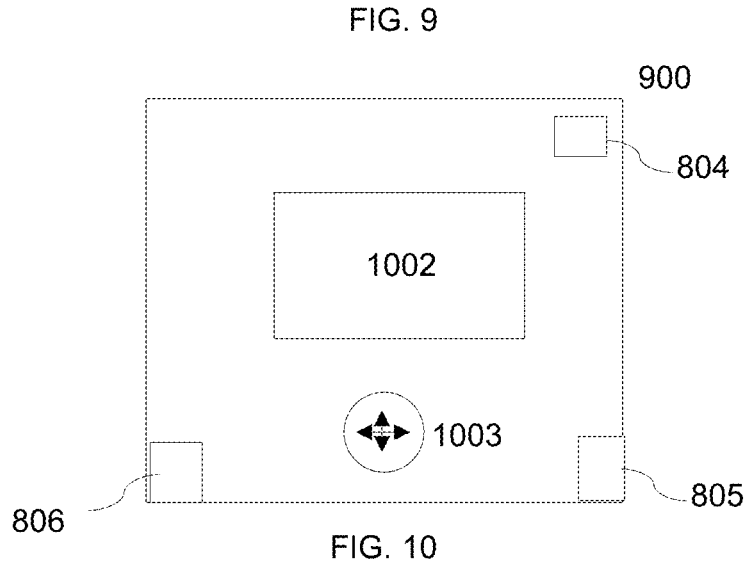
FIG. 10 is a diagram of a camera in rear view in accordance with yet a further aspect of the present invention.

Combined with the above disclosed method and device of overlaying an image, in one embodiment of the present invention the segmented image is inserted into an actual image being taken by a lens/sensor unit in the camera. One may modify the size of the inserted image by opening a menu on the camera to be shown on the display screen 1002 as shown in FIG. 10. An input device 1003 with different button modes can be used to activate a menu and select a menu option. Device 1003 may also act as a mouse to move a cursor over the display screen, to draw and select areas of interest which may contain an object and activate a menu option, which may be an object segmentation. One can thus select to be segmented object for instance by drawing a box around the object, which may be a person. One can also activate a segmentation program to segment the object from its background. The result, being an image of a segmented object, can then be selected by either drawing again a box around it or by clicking on 1003 after selecting it with a cursor. One can select a menu option to resize the selected segmented object. One can also move the selected segmented object on the display screen by moving a cursor with multi-directional control button 1003. The segmented object may be displayed as a transparent image over the actually imaged scene by a lens/sensor unit. When satisfied with the size and position a user may confirm a position of the object on the display screen by button 1003 and change the image from transparent to opaque. One has thus placed a segmented object in the current image that can be recorded with the camera.

In a further embodiment of the present invention, even when the object was not originally recorded in 3D, the inserted image is synthesized into a 3D image from a 2D image. Methods and apparatus there to are known and are for instance disclosed in U.S. Pat. No. 6,445,833 to Murata et al. issued on Sep. 3 2002 which in incorporated herein by reference. Preferably, a 2D image is synthesized into a 3D image with a parallax that reflects a desired distance from a point of view on the display screen.

In accordance with a further aspect of the present invention one may import a plurality of objects from different sources. For instance, the camera may be connected to a network, and receive a plurality of images from different sources via the network. In a further embodiment of the present invention, each image has an identifier that allows the camera to determine its relative size and earlier positions a particular segmented image had on the display screen. This allows the camera to position the image on a location and at a size that it had in a previous image. In a further embodiment of the present invention a display with a display screen is separate from the camera. For instance the camera may be connected via a communication port to a computing device having its own display screen, such as a PDA or a cell phone. This allows a user to position the camera out of reach, focused on the user. In a further embodiment of the present invention control of the camera is provided to the computing device such as cell phone. In yet a further embodiment of the present invention the computing device can open at least one menu on the display screen of the computing device that enables control of the separate camera. This allows a user to be part of an image taken by the camera while retaining control of the camera. In one embodiment of the present invention the display and camera are physically separate and are connected through a wired connection. In a further embodiment of the present invention the display and camera are physically separate and are connected through a wireless connection.

In another embodiment of the present invention a plurality of users have a camera with remote control and display screen as provided above. Each camera is trained and focused on the user and generates a segmented image that is shared with at least one other camera.

Figure 9:
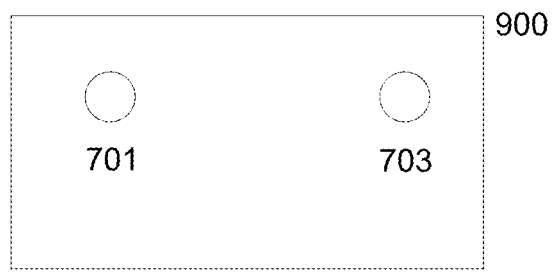
FIG. 9 is a diagram of a camera in frontal view in accordance with yet another aspect of the present invention.

In a further embodiment of the present invention a camera 900 is provided for creating a 3D image from at two lens/sensor units 701 and 703 as shown in FIG. 9. While the camera may look the same as a 2 lens/sensor units panoramic camera, there are differences. In both the panoramic and 3D cameras the sensors have to be aligned appropriately. However, in the 3D case the lenses (or lens optical axis) should be substantially or almost parallel. In the panoramic case the lens optical axes should be positioned at a slight angle to create a broader field of vision.

Figure 11:
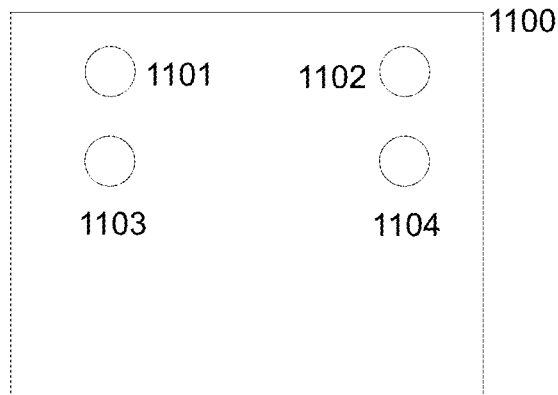
FIGS. 11-13 are diagrams of a camera in frontal view in accordance with one or more aspects of the present invention.

A camera, in accordance with an aspect of the present invention, is a 3D camera having at least 2 lens/sensor units. A camera, in accordance with another aspect of the present invention, is a panoramic camera having at least 2 lens/sensor units. A camera, in accordance with an aspect of the present invention, is a combined 3D and panoramic camera having at least 4 lens/sensor units. One embodiment of the present invention 1100 of such a combined 3D/panoramic camera is shown in diagram in FIG. 11. A combination of two lens/sensor units 1101 and 1102 may be dedicated to 3D images and the optical axes of the lenses are parallel or almost parallel. This allows one lens/sensor unit of 1101 and 1102 to be dedicated to generate a single reference image. The distance between the lenses of 1101 and 1102 is in one embodiment of the present invention preferably a human parallax distance. At least two additional lens/sensor units 1103 and 1104 in 1100 may be dedicated to taking panoramic images. To create a wide field of view the optical axes of the lenses are positioned at an angle. One may select the distance of the two lenses of 1103 and 1104 to be similar to 1101 and 1102 for aesthetical reasons. The distance may also be different.

Figure 12:
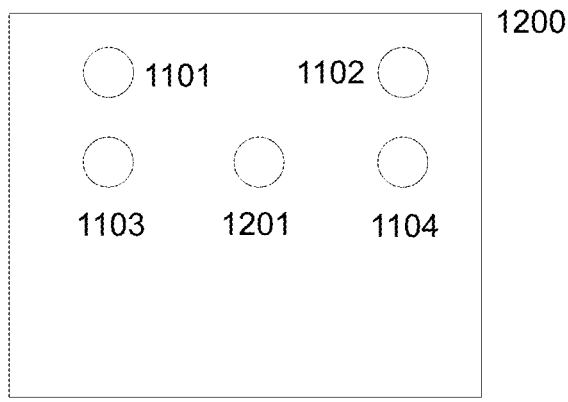

In another embodiment of the present invention an additional lens/sensor unit 1201 is placed between 1103 and 1104 as is shown in a diagram of a camera 1200 in FIG. 12. This allows for a higher quality panoramic image. It also allows for using an image generated by 1201 to generate a neutral or reference image.

Figure 13:
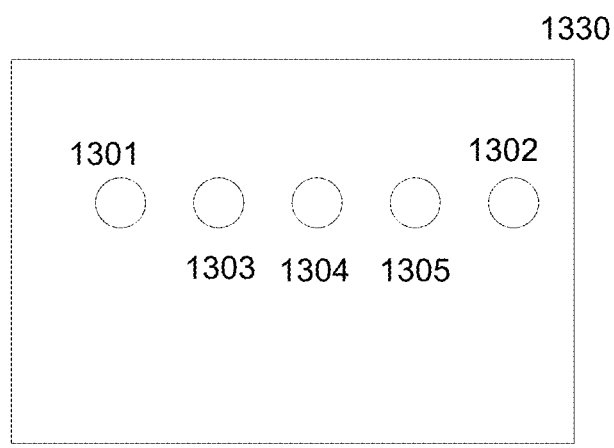

In yet another embodiment of the present invention as is shown in diagram in FIG. 13 of a camera 1330 all lenses for 3D and panoramic image generation are placed on a single line. The lens/sensor units 1301 and 1302 are for instance for generating 3D images, while 1303, 1304 and 1305 are used for generating a panoramic image.

Figure 14:
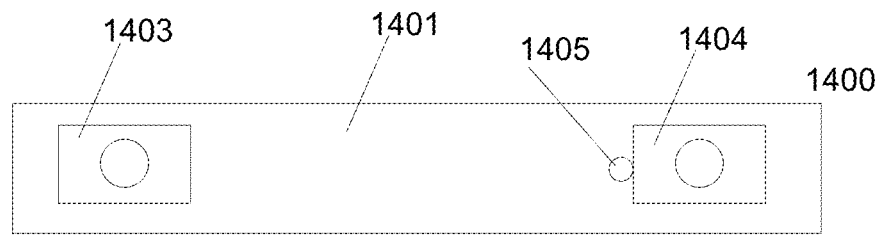
FIG. 14 is a diagram of a carrier of lens/sensor units for a camera for stereoscopic and or 3D images in accordance with an aspect of the present invention.

FIG. 14 illustrates another aspect of the present invention. It shows a lens/sensor carrier 1400 with lens/sensor units aligned attached. It was explained above that sensors have to be rotationally aligned to create appropriate panoramic images and to diminish negative effects on 3D images. One way to assure alignment is to attach at least two lens/sensor units 1403 and 1404 to a rigid carrier material 1401. The lens/sensors units can be aligned during manufacturing and/or assembly of 1400 and should be fixed in their aligned position. Material 1401 should be rigid with negligible bending and distortion over the life-time of the camera. This requires that the carrier will also not be bent or distorted after being assembled into a camera. Alternatively, one may fix at least one lens/sensor unit in an aligned position after the carrier is fixed into the camera. As another alternative, a motor 1405 that can rotate the lens/sensor unit can be included on the carrier 1400. This allows for motor driven alignment of the lens/sensor unit. The motor can be a stepping motor with a mechanism that significantly reduces the rotation angle of the lens/sensor unit per step. Per motor step the rotation of the lens/sensor unit is well below 1 degree in one embodiment of the present invention, and smaller than 1 minute in yet another embodiment of the present invention. A motor may be an actuator such as a piezo-electric actuator. Piezo-electric actuators are available that has a minimum displacement that is below 1 micron, thus allowing rotational displacement of a sensor that is in the single pixel range.

Figure 15:
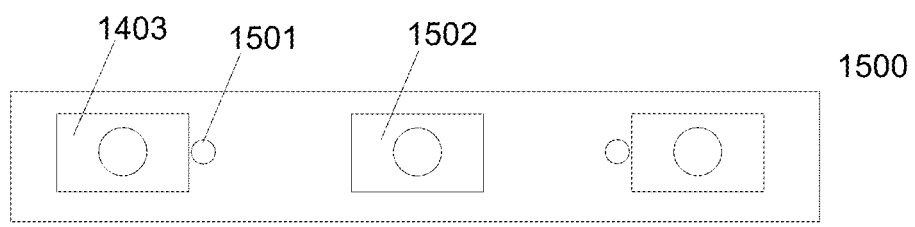
FIG. 15 is a diagram of a carrier of lens/sensor units for a camera for stereoscopic and or 3D images in accordance with another aspect of the present invention.

FIG. 15 shows a further embodiment of the present invention of a lens/sensor assembly 1500 with 3 lens/sensor units. Herein an additional lens/sensor unit 1502 is provided. Also lens/sensor unit 1403 is provided with a motor or actuator 1501 to allow mechanical alignment of the sensors.

Figure 16:
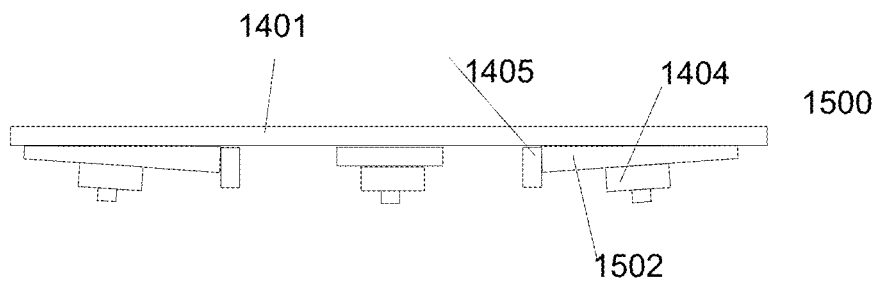
FIG. 16 is a diagram of a carrier of lens/sensor units for a camera for stereoscopic and or 3D images in accordance with yet another aspect of the present invention.

FIGS. 14 and 15 illustrate the carriers 1400 and 1500 in front view. FIG. 16 shows in diagram the carrier 1500 in side view. FIG. 16 shows that the optical axis of 1404 is rotated by a slanted support wedge 1502. The rotation angle effected by the support in one embodiment of the present invention is less than 10 degrees. The rotation angle effected by the support in another embodiment of the present invention is more than 10 degrees but less than 30 degrees. The rotation angle effected by the support in another embodiment of the present invention is more than 30 degrees In yet a further embodiment of the present invention, lens/sensor units may be placed on a carrier and bonded to the carrier in a high precision environment. For instance, at least two sensor units may be accurately placed on the carrier and at least rotationally aligned relative to each other. One can align the sensors in a calibration environment by providing an alignment image and using a mechanical or robotic high precision placement mechanism. After fixing the sensors in at least rotational alignment one may place a lens mechanism over a sensor. In that sense a carrier becomes an integrated panoramic and/or 3D imaging unit that is robust and can be placed in a housing of a camera. Electronic components and communication connection may also be placed on the carrier. The most sensitive stage, which is probably the rotational alignment can take place in a manufacturing or laboratory environment that accommodates this type of high precision positioning and bonding. Such high precision environment is for instance present in semi-conductor processing and is known in semiconductor steppers.

In an additional step one may also provide translational alignment of the sensors or the lens/sensor units.

Once the carrier unit with lens/sensor units fixed in aligned position one may install additional components such as lenses, zoom lenses, auto-focus mechanism, focus mechanism for the lenses if required (when the lenses are not fixed focus lenses, which is also possible in a further embodiment of the present invention) and zoom lenses, aperture setting mechanism, shutter mechanism, light and distance sensors and the like which are all known components in photographic imaging. One may also provide the correct dimensions, fixtures, buttons, controllers, processors, memory and other electronic components on the carrier. In a further embodiment of the present invention the carrier with at least the lens/sensor controllers and supporting electronics and connectors may be in a shape and completeness that allows a camera manufacturer to obtain a complete either panoramic, 3D or 3D/panoramic unit that can be assembled with housing, buttons and knobs, and a display screen into either a complete panoramic, 3D or 3D/panoramic camera.

In a further embodiment of the present invention the carrier may include an external communication link or may be attached to a communication link or device in the housing that allows communication such as the exchange of data, which may be image data or control/instruction data with the outside world, such as a computing device.

Preferably, the calibration steps that were already disclosed as an aspect of the present invention are performed during or right after an initial power up of the electronics on the carrier with the lens/sensor units attached and the settings stored in for instance a memory, such as a ROM memory. If one achieves a reliable level of accuracy and repeatability of creating the carrier with lens/sensor units attached one may skip the actual calibration step for the mass produced carriers, and replace this by downloading the calibration settings from an external memory or implement them in an electronic device on the carrier. The calibration steps are determined from a mother or standard carrier, which may be used to test the performance of mass produced carriers against.

In a further embodiment of the present invention the camera may also have a connection directly with a display screen wherein a display screen is enabled to display image data but is not enabled to run general purpose computer programs. Devices to display stored documents are known, for instance as eReaders from for instance Sony® and Amazon's® Kindle®. Apple's® iPAD® has its own display screen, but has additional computing capabilities and is in fact its own computing device. Computing devices with a display screen are another embodiment of the present invention with which the camera as provided as one or more aspect of the present invention can communicate with to display image data in real-time or substantially in real-time. Some minimal transmission delay and buffering delay may create a somewhat delayed real-time experience. It is pointed out that real-time or substantially real-time display of an image, graphics, text, or an interface generated by a computing device herein is different from a computing device completing an image, text, document or otherwise completed file, transmitting it to a display and the display processing the file to a display screen.

Figure 17:
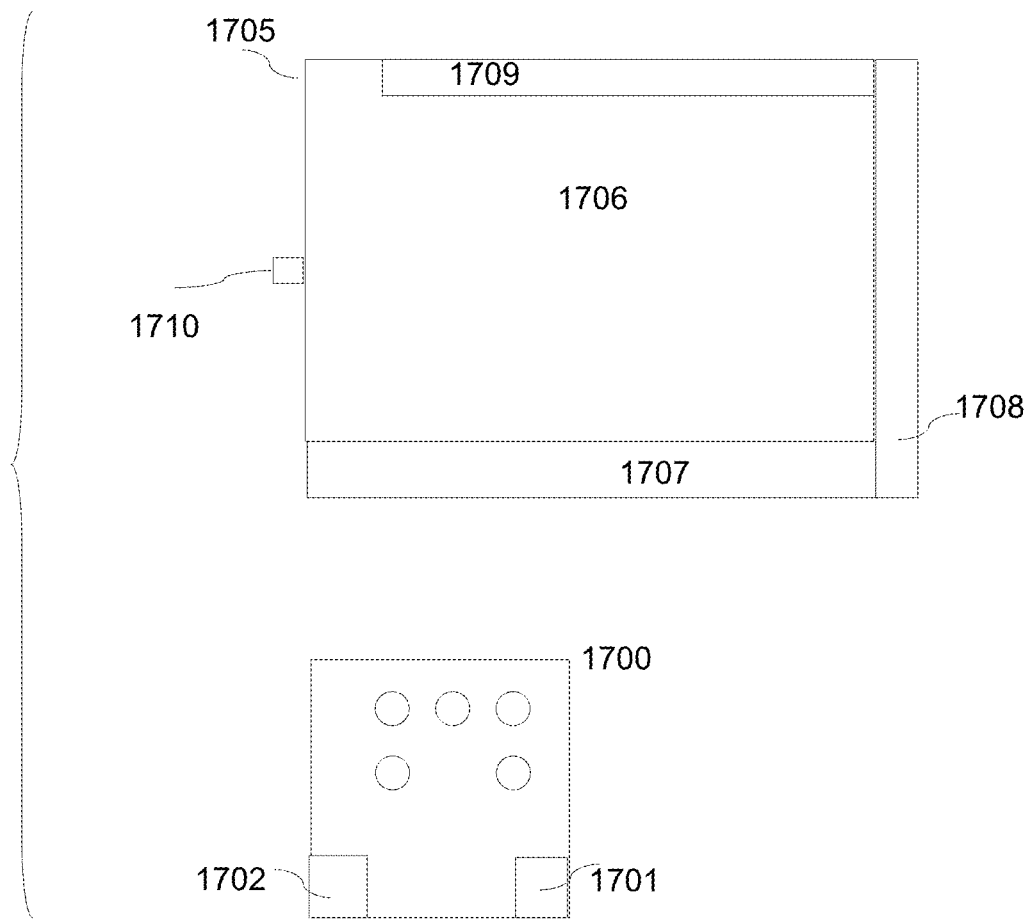
FIG. 17 is a diagram of a system having a camera and a display in accordance with an embodiment of the present invention.

FIG. 17 illustrates a display embodiment of the present invention. The camera 1700 which may be a panoramic/3D camera in accordance with an aspect of the present invention has a communication port/interface 1701 to communicate with a communication port 1708 of a display 1705. The display 1705 has a display screen 1706 which may be enabled to display 3D images. The display has display screen controls 1707 to allow a user to provide instructions related to an image. The controls may be used to adjust contrast, intensity, size of images, instructions to move forward, back ward in a series of images, zoom, capture, store recall images and the like. In one embodiment of the present invention, the display 1705 also has a processor and memory/storage to allow processing of an image and storage and retrieving of images. In one embodiment of the present invention storage capabilities are temporary and limited to a session, for instance lasting for a period of time that the camera 1700 is connected to the display 1705. In one embodiment of the present invention processing capabilities of the display 1705 are limited to image processing and do not provide general computing capabilities.

Figure 18:
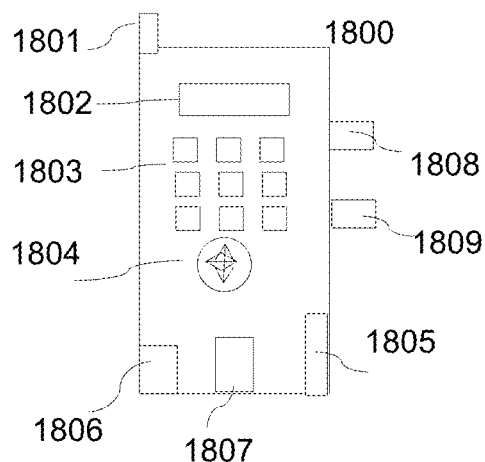
FIG. 18 is a computing device in accordance with an aspect of the present invention.

In yet a further embodiment of the present invention, the display is connected to a mobile computing device 1800 as illustrated in FIG. 18. The mobile computing device 1800 may include a cellphone with a dial pad 1803 a display screen 1802 a pointing device 1804 cellphone capabilities and an antenna 1801 to connect to a communication network. It also has a communication interface 1805 which allows communication with display communication interface 1708. Device 1800 also may have a communication interface to communicate with camera interface 1702. Communication between device may be wired or wireless communication links.

The device 1800 has a powerful processor 1806 enabled to run an operating system such as Microsoft Windows® or Linux or any other operating system and applications such commonly used on a computer such as a wordprocessor, presentation software, communications, e-mail, browsers, spreadsheets, games, scientific software and the like or any other computer program that can run on a computing device. The device 1800 also has mass storage capabilities 1807 to store programs and data and the like. In a further embodiment of the present invention the device 1800 has a projector 1808 which is enabled to project on a screen or a wall an image. It may also have a projector 1809 which is enabled to create a virtual keyboard or input device, such as disclosed by U.S. Pat. No. 7,340,077 to Gokturk issued on Mar. 4, 2008 which is incorporated herein by reference.

The size of device 1800 is very small, and can be carried in a jacket or trouser pocket or a purse and is significantly smaller than present day laptop computers such as manufactured for instance by Hewlett Packard® or Apple®. Such a complete computer can be so small because they do not have bulky input and output devices or storage media such as large magnetic disks.

In a further embodiment of the present invention the device 1800 has included the camera 1700.

The problem of lacking input/output devices can be solved with locally positioned display devices 1705, which may be eReader devices as disclosed above. The devices may have a keyboard or a virtual keyboard for instance created with screen 1706 being a touch screen or a projector 1710 which may project a virtual keyboard.

In common situations where people are known to use a computer, such on an airplane, in one embodiment of the present invention a display is part of an airplane seat. A keyboard may also be part of a seat. The display and keyboard have communication ports to connect to a computer 1800 of a passenger.

In yet a further embodiment of the present invention a camera is part of an eReader. This is shown in diagram in FIG. 19. The term eReader, herein is used as a term for a thin, large, lightweight display that acts as a true display, enabled to provide still and video images in full color in real-time, but which is much thinner than a tablet such as the Apple iPAD®. An eReader in its known form displays a content of a file. The term eReader as an aspect of the present invention includes the capability to show screens and images in real-time.

Figure 19:
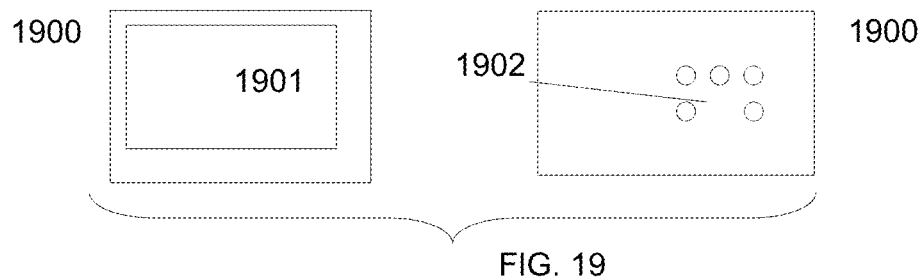
FIGS. 19-21 are diagrams of a camera with a thin large sized display screen in accordance with one or more aspects of the present invention.
Figure 20:
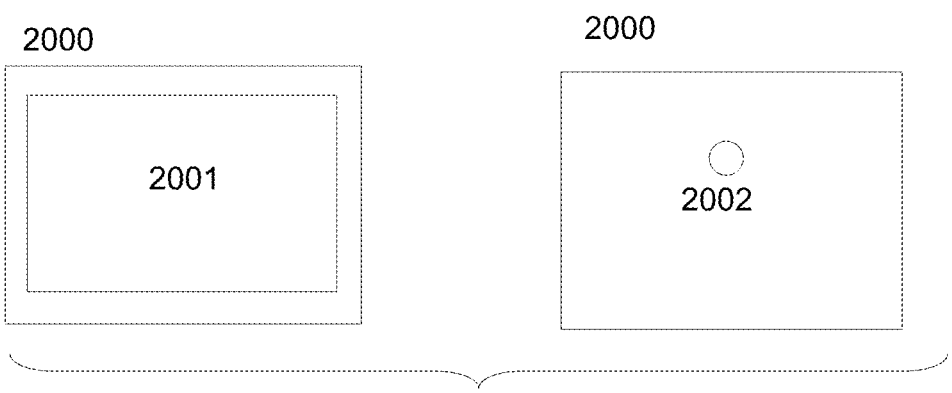

The novel eReader 1900 has a screen 1901. Such a screen is larger in surface than a standard camera display screen. A lens 1902, which may be a plurality of lenses as discussed above, each lens associated with an optical sensor is/are captured or manufactured into a housing of the eReader or other portable device 1900 that has a screen. Though many eReaders currently have a black/white screen which is known as ePaper or eInk, manufacturers at the time of this invention have indicated to move into the area of color display screens. There are different technologies that can be applied in high quality large color display screens. One embodiment is by the technology of Organic Light Emitting Diode or OLED display screens. Another is a color electrophoretic display screen such as disclosed in U.S. Pat. No. 7,167,155 to Albert et al. issued on Jan. 23, 2007 which is incorporated herein by reference. In one embodiment of the present invention one creates an eReader with a multi-lens camera as shown in FIG. 19. In a further embodiment of the present invention a single lens camera as is shown in FIG. 20 is part of an eReader. Its shows an eReader housing 2000 with a screen 2001. Incorporated in the housing is a single lens/sensor unit 2002. In an embodiment of the present invention of FIG. 19 an eReader is provided that is also a 3D camera or a panoramic camera or a 3D/panoramic camera. These cameras are contemplated to have one or more aspects of the cameras as already described herein.

The advantage is that the display has a large display screen and is portable and preferably has a light weight. The size of a screen in one embodiment of the present invention is not smaller than a diagonal measurement of 6 inches. In another embodiment of the present invention a size of a screen is not smaller than a diagonal measurement of 10 inches. In another embodiment of the present invention a size of a screen is not smaller than a diagonal measurement of 15 inches. In one embodiment of the present invention the length and width of a display screen is the same. In another embodiment of the present invention the length is greater than the width.

In one embodiment of the present invention, devices 1900 and 2000 are any portable computing device with a display screen, with a lens or plurality of lenses associated with an image sensor or a plurality of image sensors 1902 captured or manufactured into a housing of the device 1900. FIG. 19 shows how lenses 1902 are provided at the opposite side of the housing related to the screen or display. One may provide a housing with lenses that is hinged to a housing of the display, so one can swivel the lenses in relation to the display.

In one embodiment of the present invention, the devices as shown in FIGS. 19 and 20 are only a camera with a very large display screen and memory to store data and processing capabilities to display images from an image sensor or from memory on the display and a control to control the camera and the screen. In one embodiment no other functionality is required and the devices are just digital cameras with a very large viewing screen. In a further embodiment other capabilities are added. In a further embodiment these cameras with very large screens have a communication port to off-load data such as image data, for instance to a computing device. In a further embodiment these device are also enabled to receive data through a communication port. In yet a further embodiment, these large display screen cameras have additional processor and programming capabilities. Research into display housing and camera housing at the time of the present invention has not turned up existing, completed or ongoing research to create such a camera, which is believed to be novel and non-obvious.

The camera with large display screen is characterized by its format and its light weight and being thin. It is portable and easy to carry and to store for instance in a briefcase or portfolio. It has a format that provides a large display screen, that is thin and low weight. For instance the display screen has a diagonal that is larger than 10 cm in one embodiment of the present invention, larger than 15 cm in another embodiment of the present invention, larger than 20 cm in yet another embodiment of the present invention and larger than 30 cm in yet another embodiment of the present invention. The thickness in one embodiment of the present invention is less than 3 cm, less than 2 cm in another embodiment of the present invention, less than 1 cm in yet another embodiment of the present invention and less than 0.5 cm in yet another embodiment of the present invention. The weight in one embodiment of the present invention is less than 20 ounces. The weight in another embodiment of the present invention is less than 15 ounces. In yet another embodiment of the present invention the weight is less than 10 ounces. The weight and thickness will be determined by power supply, housing, and display screen and the way of selecting, modifying and combining these elements into a device.

The construction and assembly and its components of an eReader is for instance disclosed in a Kindle II teardown described in 5 articles on a website which includes <http://techon.nikkeibp.co.jp/english/NEWS_EN/20090421/169102/> dated May 12, 2009; <http://techon.nikkeibp.co.jp/english/NEWS_EN/20090422/169162/> dated May 13, 2009; <http://techon.nikkeibp.co.jp/english/NEWS_EN/20090424/169296/> dated May 14, 2009; <http://techon.nikkeibp.co.jp/english/NEWS_EN/20090427/169398/> dated May 15, 2009 and <http://techon.nikkeibp.co.jp/english/NEWS_EN/20090428/169498/> dated Mar. 18, 2009 which are all incorporated herein by reference.

The lens/sensor unit may be an integrated lens/sensor unit for instance as available from Omnivision of Santa Clara, Calif. of which one example is the CameraCube. Samsung of Korea also manufactures very thin and powerful camera modules. For instance on URL <http://www.engadget.com/2008/03/18/samsung-announces-worlds-thinnest-8-megapixel-cellphone-module/> on Mar. 18, 2008 a small ultrathin camera module was shown that was about 8.5 mm thin and has a 5 Megapixel sensor and a lens. It is about 1.5 by 3 cm in width and length. Such a module can be incorporated in a thin housing of a large display or of a reader. The module has internal processing capabilities. It is also provided with a connector that makes it easy to connect to other components of a camera, to a processor, to a controller, to a bus or other communication devices and to a display. In fact several of these modules can be incorporated in the housing to enable a camera as disclosed herein in accordance with one or more aspects of the present invention. A copy of the article/website is incorporated herein by reference.

Camera controllers are also known and are for instance disclosed in U.S. Pat. No. 6,727,941 to Coleman, issued on Apr. 27, 2004 which is incorporated herein by reference.

A large display screen system with a controller is the iPAD® of which a teardown is provided in <http://www.isuppli.com/News/Pages/User-Interface-Focused-iPad-Changes-the-Game-in-Electronic-Design-iSuppli-Teardown-Reveals.aspx> which is incorporated herein by reference.

In another embodiment of the present invention a large display screen portable device, such as a novel eReader, is enabled to communicate with a camera, such as a camera phone, by wired or wireless communication and is enabled to display an image or video taken by the camera.

A large display screen camera such as provided in FIGS. 19 and 20 in a further embodiment of the present invention are provided with a communication device to communicate with another device or with a network. One example of such an interface is a Bluetooth interface, of which an extensive description is available on <http://www.bluetooth.com/English/Technology/Building/Pages/Specification.aspx>. An example of a network communication interface is the Wi-Fi interface of which a specification is available on <www.wi-fi.org>.

In another embodiment of the present invention a camera records images at a lower than 60 fps rate. For instance a display screen of the camera may be the main display screen for displaying images. No higher quality fps display in such an embodiment of the present invention is envisioned, and only a reduced video frame rate is implemented. In one embodiment of the present invention the recording rate is less than 10 fps. In another embodiment of the present invention the video rate is lower than 25 fps but higher or equal than 10 fps. In another embodiment of the present invention the video rate is equal to or higher than 25 fps.

Figure 21:
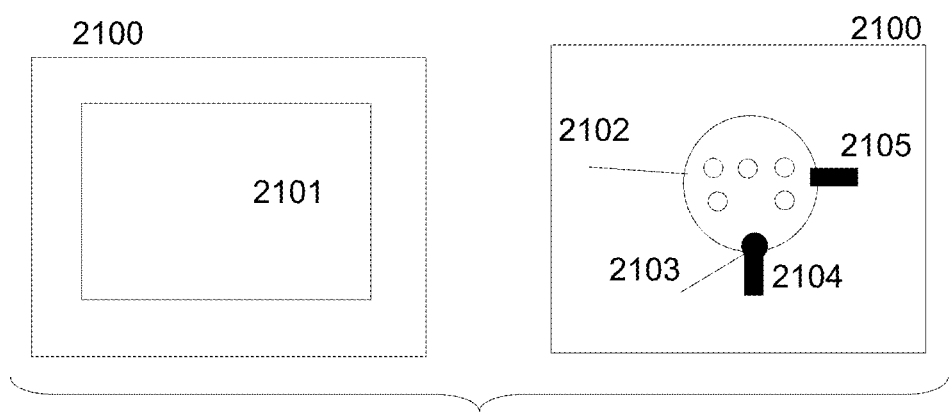

In one embodiment of the present invention a thin camera device 2100 with a large display screen 2101 as shown in diagram in FIG. 21 has a large display screen that is rectangular but not square. One preferred way to display an image such as a still image or a video is in landscape format as shown in FIG. 21. In another embodiment of the present invention the device 2100 is a multi-purpose computer or an eReader for instance. As an eReader the device can be used in portrait mode. A multi-lens unit 1902 as shown in FIG. 19 in the shown position can take 3D and panoramic images in landscape mode. One may want to take images in landscape mode even if the display screen is oriented in portrait mode. This is shown in an embodiment of the present invention as shown in FIG. 21. The multi-lens unit 2102 is part of a rotatable housing. This housing can be rotated by pushing for instance a protrusion 2103 from position 2104 (in landscape position) to position 2105 (in portrait position). In position 2105 the image can be shown in diminished size as a landscape image on a display screen in portrait orientation. The image can be stored and be displayed as a landscape image on the display screen in landscape orientation also.

Figure 22:
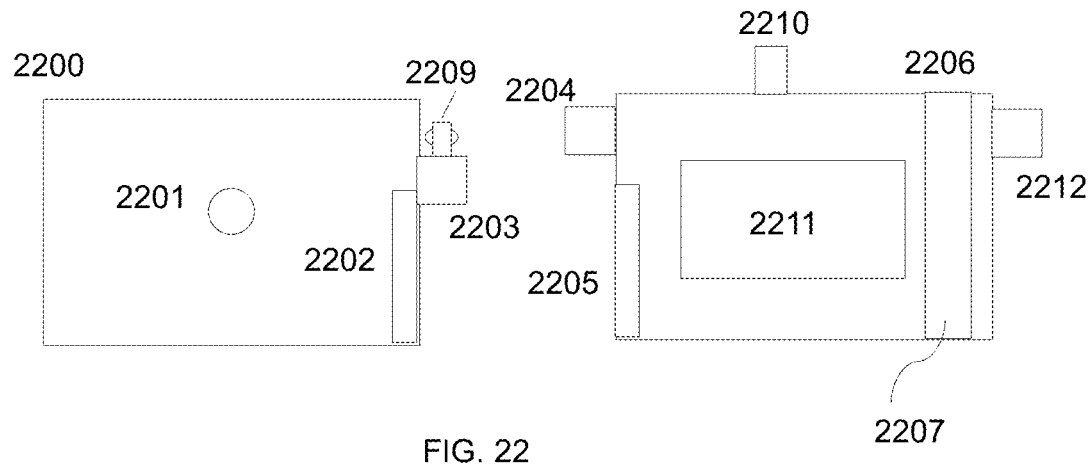
FIGS. 22-24 illustrate detachable displays in accordance with an aspect of the present invention.

In a further embodiment of the present invention a display screen of a portable and self contained computing device is part of a detachable portable and self contained display. This is illustrated in FIG. 22 with a computing device 2200 and a detachable display 2206 with a screen 2211. The computing device 2200 communicates with the display 2206 through a port 2201 in the computing device with a communication port 2205 in the display 2206. The communication ports 2201 and 2205 may communicate in one embodiment of the present invention in a wired manner. This may be for instance a wired USB connection. In one embodiment of the present invention the communication ports 2201 and 2205 are wireless communication ports that include wireless circuits and antennas to communicate. For instance the connection may be a wireless Bluetooth connection. It is emphasized that in one embodiment of a large display screen in an ultra-thin and ultra-light connectable display the display capabilities are in real-time. In a further embodiment of a large display screen in an ultra-thin and ultra-light connectable display the display capabilities are document or file based. It is further pointed out that a display screen herein is preferably a computer display screen, wherein an image is treated as an image of pixels and thus can be processed by a digital processor and can be stored in a memory or a buffer for temporary storage. A wireless connection between a display and a computing device is disclosed in US patent Application Publ. Ser. No. 20060061951 to Hara published on Mar. 23, 2006 which is incorporated herein by reference.

In case the computing device 2200 and the display 2206 are detached and are both self contained, they both require their own power source, which may be a battery. A battery 2207 to power the display 2206 has been identified in FIG. 22. In a further embodiment, the display 2206 has an inductive receiver 2207 to power the display. Inductive power in that case will be provided from an external source and enables the display 2206 to receive inductive power with power receiver 2207. This aspect of inductive power has been disclosed in U.S. Pat. No. 7,741,734 to Joannopoulos et al. issued on Jun. 22, 2010 which is incorporated herein in its entirety.

The wired connection such as the USB wired connection can be used to have the power source of the computing device power the display. A USB connection is preferably a real-time USB connection and not a file oriented connection. A separate wire to a power source in another embodiment can also be used to power the display. It is noted that in a wired connection with a USB connection the USB mini-A or mini-B connector can be used. The actual receptacles and plugs therein are 3.1 mm and are sufficiently small to be used in a display housing that is 5 mm thick. However, the housing of the USB mini receptacles are about 8.1 mm thick. In accordance with an aspect of the present invention a mini USB receptacle is modified to fit in a display housing that in one embodiment is 7 mm thick or smaller. In accordance with an aspect of the present invention a mini USB receptacle is modified to fit in a display housing that in one embodiment is 5 mm thick or smaller. In one embodiment the receptacle of a USB Micro may be used, if needed modified to fit the needs of connecting the display with the computing device and allowing the computing device to power the display. In a further embodiment the housing of the receptacle is part of the housing of the display. The state of the art is sufficient to enable a wired connection between a computing device and a display with a receptacle in the display wherein the display thickness is smaller than 5 mm down to a display thickness of 3 mm and wherein the receptacle is part of the housing and the actual connector is about 1 mm thick.

In one embodiment a battery is an ultra-light and ultra-thin battery made of nanocomposite paper as disclosed in the article "Flexible energy storage devices based on nanocomposite paper" by Pushparaj et al. in Proceedings of the National Academy of Sciences (PNAS) Aug. 21, 2007 Vol. 104 no. 34 pages 13574-13577 downloaded from its website www dot pnas dot org and US Patent Publication Ser. No. 20100050779 to Pushparaj et al. published Mar. 4, 2010 which are both incorporated herein by reference. A very thin battery not thicker than 1 mm is disclosed in U.S. Pat. No. 6,696,198 to Okahisa et al. issued on Feb. 24, 2004 which is incorporated herein by reference.

In one embodiment of the present invention the computing device 2200 and the display are combined as one apparatus. In such a configuration the computing device 2200 and the display 2206 are connected and combined, for instance through a separable hinge with male part 2203 with an axis and spring loaded ball connector 2209 and a female hinge part 2204 on the display 2206 that is enabled to receive and lock the spring loaded ball connector axis 2209. A user may separate the display 2206 from the device 2200.

The separated display in one embodiment of the present invention enables a display to collaborate with the computing device within at least 1 meter distance from the computing device of each other. In a further embodiment of the present invention the display can collaborate with the computing device in a distance not exceeding 3 meter of each other. In yet a further embodiment of the present invention the display can collaborate with the computing device in a distance not exceeding 10 m. In yet a further embodiment of the present invention the display can collaborate with the computing device in a distance exceeding 10 meter of each other.

In a further embodiment of the present invention the computing device has at least one lens/sensor unit 2201 which allows the device to record an image which may be a video image. In yet a further embodiment of the present invention the computing device 2200 is a camera phone or a wireless phone with a camera. In yet a further embodiment of the present invention the computing device 2200 is a camera.

The detachable display has several advantages. One advantage is that one can hold up the camera in a position for instance above one's head where it would be almost impossible to conveniently view its display. By detaching the camera, one can hold up the camera above one's head and still view the to be recorded scene on the detached display. In yet a further embodiment of the present invention, the display 2206 has a local control 2210 that activates the camera part of the computing device 2200. This also allows a person to make an image from himself/herself.

Figure 23:
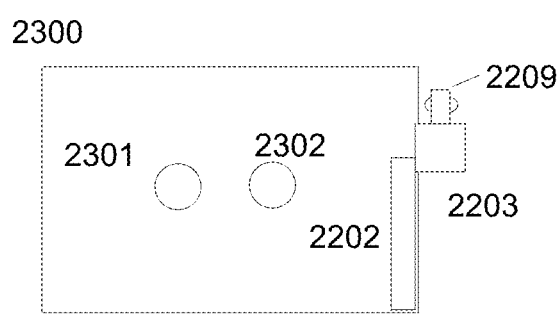

In a further embodiment of the present invention a computing device 2300 as illustrated in FIG. 23 has at least two lens/sensor units 2301 and 2302, which may be applied to generate a panoramic image or a stereoscopic image, which can be a video image. The display 2206 in FIG. 22 is illustrated from it's a view when it is folded open when attached. When folded closed a screen 2211 is visible. One may also modify this embodiment, by having a screen visible when the display is folded open.

However, when taking an image without detaching the display but with the display folded open, the screen is not visible by the user in one embodiment. One may address this by using a ball type hinge that allows the display to be rotated so the screen becomes visible to the user. In a further embodiment a hinge part 2112 may be provided to the display that allows the display to be hinged on the computing device so it faces the user. One may also provide an additional display screen on the computing device that is not detachable, so that the computing device has a detachable display and a fixed screen.

Figure 24:
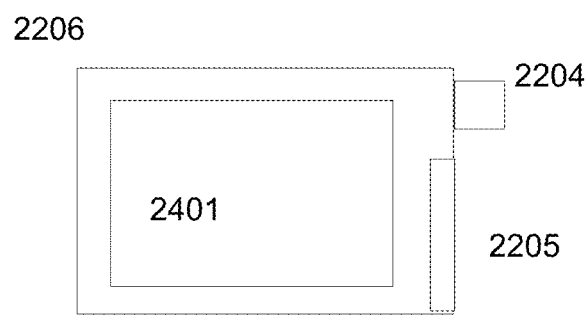

In a further embodiment of the present invention, the detachable display has a screen at both of its sides, as is illustrated in FIG. 24 with a screen 2401. In yet a further embodiment a computing device has an integrated screen that cannot be removed and a detachable display that has at least one screen. The detachable screen in a further embodiment has two screens, one at each large flat side.

There is a desire to view images and other data on a larger screen. This creates a conflict with the desire for ultra small and ultra portable devices. One solution to that issue is to provide a small portable computing device which may include at least one lens/sensor unit with a very portable thin and light weight detached display with a large display screen. Such a display in accordance with an aspect of the present invention is separate, portable and self contained. The computing device display is able to recognize the display or vice versa the display is able to at least receive and use signals from the computing device. In one embodiment of the present invention, signals to the display from the computing device are provided via a wired connection. In a further embodiment of the present invention signals from the computing device are received by the display via wireless communications, for instance via radio signals such as via a Bluetooth or a wireless USB protocol, or via any other wireless communication that allows the display screen to show images generated by the computing device in real-time and not merely as files.

Figure 25:
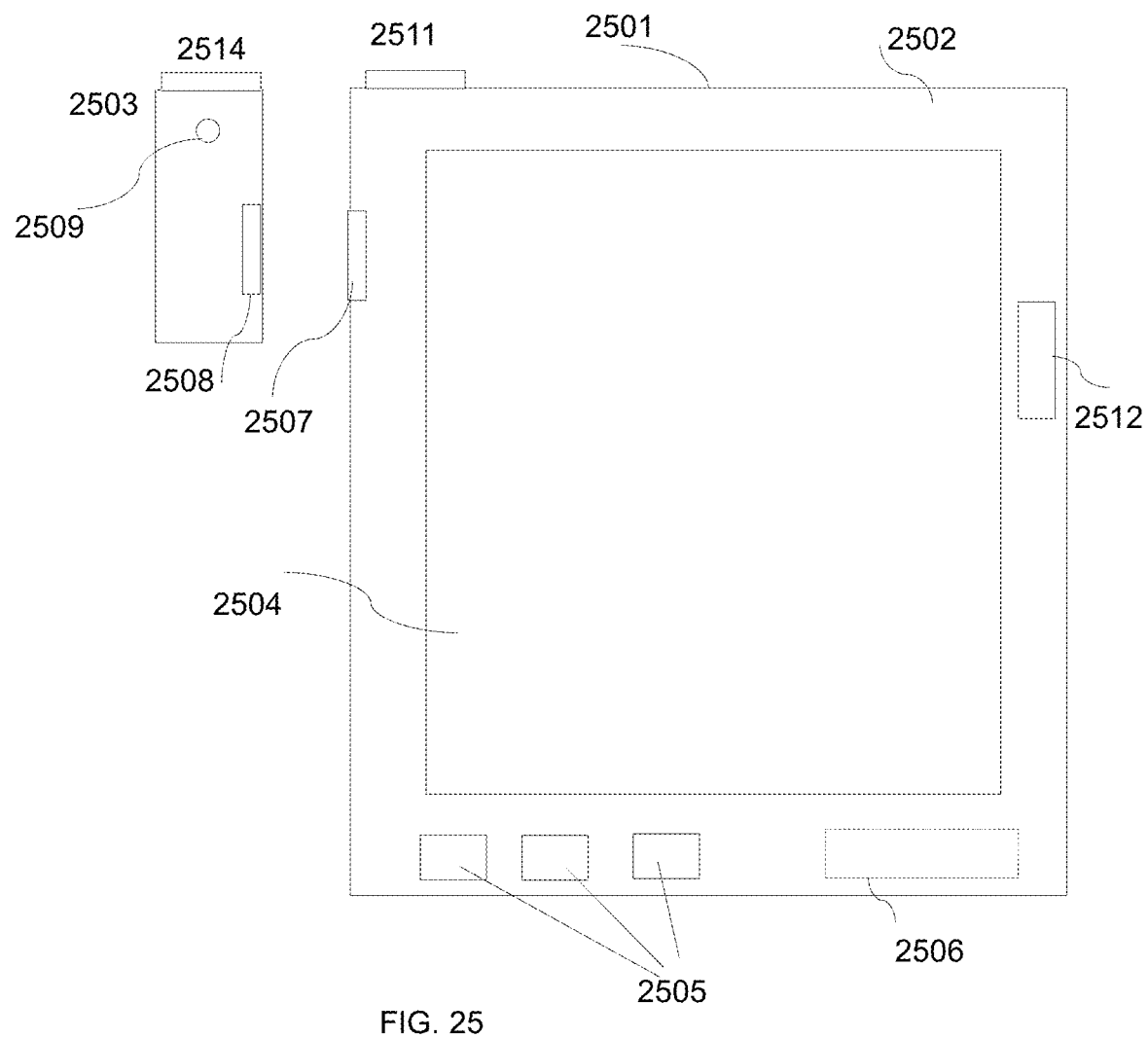
FIGS. 25-30 illustrate connectable large displays in accordance with an aspect of the present invention.

FIG. 25 illustrates such a display and the system it may be part of. The display 2501 has a housing 2502 and at least one screen 2504. The display with all components and housing is preferably ultra-tin and light and does not consume much energy, preferably a minimum amount of energy that can be provided by an inductive source that can be received by the display to power the screen or by an ultrathin battery that is not thicker than 1 mm and preferably thinner than 1 mm. Preferably the inductive power receiver or ultrathin battery 2506 (and which may not have been drawn to scale) is integrated in the housing 2502. The display is provided with a communication device 2507 that communicates with a corresponding communication device 2508 in a portable computing device 2503 that includes at least one lens/sensor unit 2509. In one embodiment the computing device 2503 is a mobile phone or smart phone. In another embodiment computing device 2503 is a stand-alone camera, preferably a digital camera.

In one embodiment of the present invention a portable and mobile computing device such as 2503 and a portable and mobile display such as an ut/ul display 2501 even though separate form a system, wherein the computing device generates at least one signal that is strictly designated to be processed by the display and displayed by a screen of the display. The display is then uniquely configured and/or authorized to correctly process such a signal to create an appropriate image. A configuration or authorization can be achieved by encoding or encrypting the signal by the computing device and only provide an authorized display with the corresponding decryption or descrambling circuitry or program. In a further embodiment of the present invention the signal is modulated in a unique way, for instance by frequency or time-slot hopping, which can only be demodulated in an authorized way by the display or its embedded receiver. The above applies more specifically to a wireless connection between a computing device and a display. A unique and authorized connection can also be achieved by using a single and exclusive wired connection between the computing device and the display wherein the computing device is only connected with the display. The above embodiment clearly excludes any broadcasting application for connection to a plurality of displays.

In one embodiment of the present invention a computing device connects in real-time with a plurality of displays, which may be ut/ul displays to provide a real-time image generated by the computing.

In one embodiment of the present invention a system is provided that contains at least one camera, such as a device 2503 and a plurality of displays 2501 which are configured and authorized to process a signal generated by the camera to display the image. In a further embodiment of the present invention each display contains a processor that is enabled to be programmed to be authorized to process the image signal generated by the camera. In yet a further embodiment of the present invention a coding processor generates a code or a program that is applied to a processor in a display to become authorized to process the image signal generated by the camera. In yet a further embodiment of the present invention the image signal generated by the camera is distributed by a network to a display, which may be the Internet or a mobile telephone network.

A stand-alone camera in this case is defined as a portable device that is strictly limited to taking or recording images, which may be still images in one embodiment and video images in another embodiment of the present invention. A digital camera is a camera with at least one lens/image sensor combination. An example of a stand-alone digital camera is an DSRL (digital single lens reflex) digital camera or any other digital camera for consumer or professional use. A stand-alone camera is not part of any other computing device such as a smart-phone or a mobile phone. In one embodiment of the present invention a stand-alone camera has real-time communications means such as a wireless WiFi connection or Bluetooth or real-time wired or wireless USB. This communication means in case of the stand-alone camera is mainly used to receive instructions and or image data and to transmit status date and/or image data. In another embodiment of the present invention the communication means is exclusively used to receive instructions and or image data and to transmit status date and/or image data. In a further embodiment of the present invention a stand-alone camera is used to also record sound related to a scene. In that case the communication means is also used to transmit and receive instructions and data related to an audio signal. A stand-alone camera in a further embodiment of the present invention has processing capabilities, for instance in image processing or other tasks to generate image data that represents a desirable image that may be provided with an audio signal. It is believed that a stand-alone camera that is connectable to a display as disclosed herein is novel. In a further embodiment of the present invention a stand-alone camera is connected to an ultra-thin, ultra-light display via a wired connection. In yet a further embodiment of the present invention the wired connection also provides power to the ultra-thin, ultra-light display.

In one embodiment of the present invention a computing device stand 3900 as illustrated in FIG. 37 is provided with a platform 3901 enabled to hold the computing device 3902 containing at least one lens/sensor unit, the computing device having at least a wired or wireless communication device to communicate with a display 4000 illustrated in FIG. 38 with a screen 4001 which may be an ut/ul display. In case of a wireless communication connection the computing device 3902 has an antenna 3903 and the display has an antenna 4003. The stand 3900 further has a rotatable or movable platform 3905. The platform 3905 has at least one remotely controlled actuator such as an electrical motor, which may be a stepping motor or any other remotely controllable motor or actuator, which enables the platform 3901 to be rotated in a remotely controlled fashion. The actuator is either bi-directional based on a control signal allowing it to move in a direction and a reverse direction, or an actuator contains at least two actuators, one working in a direction and the at least other one working in the reverse direction.

In one embodiment the platform itself has a receiver to receive a control signal for an actuator in the platform, for instance from the computing device or from the display. In yet a further embodiment of the present invention a rotating control signal is provided via computing device or camera 3902 to a motor or actuator controller in the platform. For instance, both the platform and the computing device as well as the display are Bluetooth enabled.

In one embodiment of the present invention the platform, for instance device holder 4102 has a connector 4108 to make a connection with device 4101 as illustrated in FIG. 39, wherein an actuator controller in the platform receives a control signal via 4101. Thus, by applying a remote controller a device holder attached to a platform which in one embodiment contains a computing device with a lens/sensor unit is instructed from a computer display to follow an object. In one embodiment of the present invention a computing device on a platform moves substantially in one plane. In a further embodiment of the present invention a computing device on a remotely controlled platform is also enabled to move in a vertical plane, for instance by using a vertical actuator such as a telescoping actuator 3906, or any other actuator that can change the orientation of the platform.

The use of a specific connector such as 4108, in one embodiment of the present invention requires that a device and a device holder on the platform having matching or corresponding features, and allows to create a platform or at least a device holder of the platform that is proprietary to a certain device.

In one embodiment of the present invention a remote controller 4002, which may be a joystick, is incorporated in the display. In a further embodiment of the present invention one or more sensors such as accelerometers 4004 are attached to the display or are incorporated in the display. Such a display with accelerometers is disclosed in U.S. Pat. No. 7,688,306 to Wehrenberg et al. issued on Mar. 30, 2010 which is incorporated herein by reference. The purpose of the sensors is to determine a position or a change of position of the display. Based on the detected change in position a signal which is associated with the difference of position of the display is generated and is used to control or drive a motor or an actuator in the platform. Positional sensors and positional difference sensors are known and include accelerometers, magnetic sensors, MEMS with mechanical components, gyroscopes such as optical fiber gyroscopes, Hall sensors, inertial sensors, vibrational sensors and any other sensor that can be applied to determine a positional or angular difference or angular rate change or angular velocity or a linear rate change or linear velocity change of the display. These sensors will be called a positional sensor herein. Many of these positional sensors are available in very small formats, for instance integrated on one or more chips, which can easily be fitted inside a display, even in an ut/ul display. A change in position or angle of the display causes the actuator in the platform to be activated.

In one embodiment of the present invention, the actuator in the platform is activated based on the amount of change in the display from a neutral position. To stop the actuator from being activated the display has to be returned to its neutral position. A larger change in position by the display from its neutral position can create a faster activity by the actuator. In a further embodiment of the present invention, activity of the actuator depends on the rate of change of the position of the display. Also because the sensors are directionally sensitive and the actuator is, in a further embodiment of the present invention, a control element such as a button is provided on the display, which allows the actuator to respond or stop responding to a change of position of the display. This allows a user to return the display to a neutral position without activating the actuator.

In a further embodiment of the present invention the display has a control element, such as a button, to reverse the moving direction in a substantially horizontal plane based on a movement of the display. When a display is moved from left to right the platform also moves from left to right. This is useful when a user of the display and the camera in the device holder face in the same direction. By activating a control on the display a user can reverse the direction of the platform, so that when the display moves from left to right the camera, seen from the direction a lens is facing, moves from right to left. This is useful when the camera and the user are facing each other. Activating the control again reverses the direction of the actuator as a result of a movement of the display.

A user confirms in a certain position a zero position which corresponds with a zero position of a computing device. By moving the display with the positional sensors, the user can cause the movement of the platform and thus of the computing device with a camera and track an object or pan an area. In one embodiment of the present invention a fixed tracking plane for the platform can be set or programmed. In a further embodiment of the present invention the platform can be provided with a third movement, for instance in a vertical plane.

The display can be one of a ut/ul display, a portable computer display, a tablet PC, a mobile phone, a smart phone, a PDA (personal digital assistant) or any other device including a display screen, at least one accelerometer, and a communication device to connect to a remote camera and a remote motor controller which is preferably a wireless connection but can also be a wired connection. One advantage of the above embodiments is that a user can track an object via a display rather than having to look through a viewer. In yet a further embodiment of the present invention a display has a processor that is programmed to instruct a motor controller to follow a pre-programmed track. In yet a further embodiment a tracking path of the platform is recorded and can be repeated by the display or the computing system.

Cameras nowadays can be very small and are used in for instance computer gaming. The remotely controlled platform 4100 for a computing device for instance including a small camera can also be small as is illustrated in FIG. 39. For instance a movable platform has a bracket or fixture 4105 that can be fixed, for instance temporarily, against or on an object or a wall. Fixed on the bracket or structure is a motor or actuator holder 4104 which contains the motor or actuator controller and the motor or actuator that can move an axis or arm 4103 in a first plane which can be a horizontal plane. Also contained in 4100 is a receiver to receive actuator control instructions from the display. A camera/computing device holder 4102 attached to the arm is enabled to receive and tightly hold a computing device 4101. In a further embodiment of the present invention a motor or actuator 4106 is attached between 4102 and 4103, enabling the holder 4102 to be rotated in a different plane for instance perpendicular to the first plane.

In yet a further embodiment of the present invention yet another actuator is included in the platform that allows the holder 4102 to be rotated in a plane perpendicular to the horizontal plane in which arm 4103 can move and perpendicular to arm 4103. This allows in effect a rotation of the field of view of the camera in computing device 4101 and allows for a remote correction of the horizon in the image taken by the camera of 4101 if the orientation of the platform is not aligned with an orientation of an object.

FIG. 40 illustrates the platform viewed from above. The actuators in one embodiment of the present invention are provided with electrical power. A power source, such as a battery, in one embodiment of the present invention is included in the platform. In a further embodiment of the present invention, a battery in the computing device powers the platform, for instance via a power connection. In yet a further embodiment, power is provided from an external source, for instance via a power cord. In one embodiment of the present invention a platform 4100 is fixed against a wall, a structure or an object with a removable adhesive such as Scotch® Wallsaver™ Removable Mounting Square of 3M Corporation. Other attachment means such as magnets, Velcro® fasteners, pins, screws, straps, clips or any other fastening mechanism that allows the platform to be fixed to an object or structure are fully contemplated. This allows a computing device with a camera to be positioned, preferably in a removable manner on a non-intrusive location, for instance during a performance and allow a user to pan, track, focus and zoom on part of a scene or a performance. In one embodiment of the present invention a stand like a portable camera stand is provided. In one embodiment of the present invention a camera remote control is provided, which may be incorporated in the display. A touch type screen in the display in one embodiment of the present invention is enabled to display a camera control to control one of camera focus, camera zoom in/out, camera aperture, camera on/off and any other camera control.

In one embodiment of the present invention, after a platform has been positioned and camera settings have been provided a confirmation signal from the display keeps the camera platform and/or the camera in its preferred settings.

In one embodiment of the present invention the camera platform and the camera in the computing device and the display collaborate to track an object or a person in a scene. This is illustrated in FIG. 41. A screen 4300 contains an image of a person 4302 recorded by the camera in the computing device on the platform. Preferably, a user provides an identifier 4301, such as an ellipse, around the image on a screen of the display and a processor in the computing device or the display is trained to learn characteristics of the object. This may be a segmentation learning, a statistical distribution learning, specific characteristics learning such as head and legs, or detection of a provided characteristic such as a colored tape or patch on the object or any other object image learning that allows an object to be detected in an image. After analysis or learning, in an operational mode the processor is enable to recognize or track the object or person in a scene. The processor in one embodiment determines a tracking center 4304 of the object. A user may provide a tracking box 4303 on the screen which determines a part of the screen wherein the object's or person's image has to appear on the screen. For instance one may want to have the object appear at the right side of the screen. The size of the box 4303 determines the activity of the platform. If a person moves inside an area corresponding to 4303 the platform will not move, creating a relatively stable screen image. However, when the person or object moves outside the area corresponding to the box the platform will move. The location of for instance the tracking center 4304 determines the control signals provided via the processor to the motor controls of the platform. Image tracking is well known and is disclosed for instance in U.S. patent application Ser. No. 11/284,496 to Zhang et al. filed on Nov. 21, 2005 which is incorporated herein by reference.

A processor in one embodiment of the present invention is provided that is programmed to track a moving object from an image generated by a lens/sensor unit on the mobile platform. Based on the location of a tracking point in the image of the object a processor controls a motor or actuator in the mobile platform that allows a lens/sensor unit in a device held on the platform to keep the object in its field of vision.

In one embodiment of the present invention the mobile platform is compact and light. For instance a holder of the mobile platform is about the size of a mobile phone, but made of light strips or a web of rigid or semi-rigid material. Combined with the motor(s), actuator(s), control and communication circuitry, arm and bracket the weight is preferably less than 500 grams, more preferably less than 250 grams and most preferably less than 200 grams. The mobile platform should be mobile and portable. Its size in should be able to fit in a box of a volume preferably less than 1000 cm3 in volume, more preferably about or less than 500 cm3 and most preferably with a volume of about or less than 250 cm3.

Returning to FIG. 25, in yet another embodiment of the present invention the computing device 2503 has no lens/sensor unit and is a router or a router like device. The display 2501 has at least one control 2505 to control the display screen, including but not limited to an on/off switch, a contrast control, a brightness control and the like. In a further embodiment the control 2505 is a touch screen that is either separate or part of screen 2504. The display 2501 also contains control logic and memory 2512. The device 2512 may also contain a processor for processing image data that is to be displayed. In one embodiment device 2507 receives a signal that contains image data. Device 2507, which may be a wireless device such as Bluetooth device or a WiFi device, or with a wired connection such as a USB port, can demodulate the received signal, for instance from 2508, into for instance a base-band signal that represents a displayable image that is provided to 2512 where it may be stored, if necessary only temporarily, to be processed and to be displayed on the screen 2504. In one embodiment a demodulator demodulates the signal and an extractor extracts from the demodulated signal the image data. In a further embodiment the image data is arranged in a frame structure that allows the image data to be displayed on the display screen. In a further embodiment 2512 may contain a mass storage chip to store a series of images, such as consecutive video images.

In a further embodiment of the present invention display 2501 also contains a power inlet 2511 that allows it to be connected to a power outlet, for instance to a power outlet 2514 on device 2503 to power the display screen 2501. In a further embodiment of the present invention the power connection between 2511 and 2514 includes a communication connection and may be a USB connection or a WiFi connection. This allows the display to be powered by 2503 while also taking care of the communication that otherwise would be taken care of by 2507 and 2508.

In one embodiment of the present invention the computing device 2503 is a very small device that fits easily in a clinched first of a mature person. For instance such a device may have measurements of about $8*3*2$ cm$^3$ in volume such as for instance the Samsung® SCH-U470 model mobile phone or smaller. In yet another embodiment is larger than $8*3*2$ cm$^3$ but smaller than $10*3*3$ cm$^3$ in volume. In yet another embodiment is smaller than $10*4*4$ cm$^3$ in volume. The device has a screen for display of about $3*2$ cm, or larger or smaller which is adequate for viewing information, but of course provides only a limited quality view of images. The advantage of such a small device or even smaller, is that it is extremely portable. Even smaller devices can be made with imaging, processing, communication, audio and storage capabilities or any combination thereof. The advantage of such a small or even smaller device with at least one lens/sensor unit is that a user can hold it in virtually any position to take an image. Unfortunately, a user can only review an image on the device after it has been recorded on the device. A display 2501 that shows images taken by 2509 of 2503 in real time allows the display 2501 to be used as a real-time viewer. In one embodiment at least one lens/sensor unit 2509 on a device 2503 records an image, which may be a video image, and provides the related image data to a communication device 2508 which transmits it to a receiving device 2507 of display 2501 to be processed by 2512 to be displayed in real-time or close to real-time on screen 2504. In a further embodiment device 2503 has at least 2 lens/sensor units from which device 2503 creates a 3D or a panoramic image which is provided for transmission on 2508. The screen 2504 may be a 3D enabled screen to display 3D images.

In one embodiment of the present invention wherein a computing device is connected to a single display wherein a screen 2504 of the connectable ultrathin, ultralight display is at least 1.5 the size in area and preferably at least 2 times the size in area of a display screen that is an integrated part of the computing device. In yet a further embodiment of the present invention the connectable ultralight ultrathin (ut/ul) display is preferably at least 5 times, more preferably at least 10 times, yet more preferably at least 20 times, yet more preferably at least 40 times and most preferably at least 100 times the size of the integrated display of the computing device.

In one embodiment the screen 2504 works as a real-time viewer of lens/sensor unit 2509. In general a camera unit creates and stores an image. Such an image can be transferred to another device in the form of a file, including a RAW file. However, in at least the one embodiment of the present invention of this paragraph, the screen 2504 shows the same image, which may be a video image as one would see on a viewer on the device. One should keep in mind that a camera viewer on the computing device in one embodiment is significantly smaller than the screen 2504. This may mean that screen 2504 can show an image in a higher resolution than the integrated viewer on the computing device. This issue can be addressed in several ways. In one embodiment of the present invention the computing device recognizes the device 2501 and the display screen requirements. This may include the type of display screen and the signals formats required to display an image correctly on the screen 2504. For instance a screen 2504 can show four times as many pixel lines than the integrated viewer. This recognition may be achieved for instance by an identifying code that is transmitted by device 2501 during initiation of a connection and that is recognized by 2503. Device 2503 may have a memory that stores different display protocols for a possible connected screen 2504. When a specific identifying code is recognized an image processing application is activated that processes image data generated by 2509 into the required format required by 2504. In one embodiment that processed data is transmitted as a signal to the display 2501 for display on 2504. In one embodiment the signal is provided to a driver of the screen 2504 to generate the image on the screen. In a further embodiment additional signal processing, for instance amplification, is required to condition the signal for the driver. In yet a further embodiment, especially when the signal is transmitted wirelessly, the signal is a modulated signal, such as an RF (radio frequency) or infra-red signal. A wired connection may also require a modulated signal. In the case of modulation the display 2501 has a receiver to receive the signal, and to condition the signal for demodulation, demodulates the signal, extracts the image data and processes it to be provided in the required format for the driver and provides the image data to the driver to drive the screen to show the image. Intermediate steps may be required to enhance a signal and to remove extraneous data that were used for correct communications, including but not limited to handshake data and data error correction data.

In a further embodiment the device 2503 transmits image data to 2501 in a standard format such as JPEG or RAW. In that case the device 2503 has a processor that is programmed to transform the image data from its standard format to the format required by a screen 2504 and its related driver. While this is a possible embodiment of the present invention it is a less preferred embodiment with a small and low power processor on the device 2501 that can achieve this. It is preferred to have most power intensive processing being done by the device 2503 and limit power intensive processing on device 2501.

In a further embodiment of the present invention, the device 2503 stores at least one image or a video image. The device 2503 is enabled to play for review stored images. In a further embodiment the device 2503 provides stored images for review on 2508 to be transmitted to 2507 to be reviewed on 2504.

One disadvantage of a display is its weight and bulk if not appropriately dimensioned. This is currently demonstrated by available eReaders and tablet like computers such as the Apple iPAD®. First of all these devices do not have the advantages or aspects of the present invention. Secondly, they have bulky batteries. Even an advanced eReader such as the announced QUE proReader™ by Plastic Logic Ltd. of Cambridge, UK has some disadvantages as is disclosed on the fact sheet as released by Plastic Logic which is incorporated herein by reference. It displays still images, in grey shade colors, and has a thickness over 7 mm, with a weight over a pound. Seiko Epson reported an eReader in a 18 cm by 12 cm housing of 3 mm thick of 57 gram in 2007 at Embedded Technology 2007, an exhibition event in the Pacifico Yokohama convention center. The device has a USB port. However the device displays grey color and not video enabled images as was reportedly has a refresh of 0.8 sec. It was also not disclosed how data exchange was used. It appears that it supports document type transfer.

While being portable, current devices that are on the market or that have been announced appear not to meet the requirements of being ultrathin, light and having a large display screen. A display screen that meets the requirements as an aspect of the current invention would be like a magazine or a paper notepad for instance of A4 format or larger. Such a notepad is extremely portable of light weight and only noticeable by its size, not by its weight or bulk and is very transportable without being intrusive.

In one embodiment of the present invention the computing device connects directly with the display. This means that the computing device generates and transmits a signal that is received and processed by the display. No intermediate signal processing between the two apparatuses is required in case of wireless transmission. In a wired transmission only a single wire between the computing device and the display is used for a direct connection. In a further embodiment of the present invention a direct connection is autonomous and no other devices than the computing device and the display in a wireless connection are required. In a direct autonomous wired connection only the computing device, the display and the wire are required. The wire may contain circuitry, such as amplification circuitry. However, the wire is also portable and mobile, so that the computing device is enabled to be connected to the display with the wire without any further supporting infrastructure.

One question arises: why would someone carry yet another device? It is believed that one will be enticed to do so with a display that offers the advantages of aspects of the invention. It is believed that the display will be an attractive must-have device that is currently not available if it meets functional aspects of the present invention as well as one or more dimensional and weight requirements. It appears that the upper limit of weight for an external display to be carried along is about 1 pound, with a screen size of at least 10 by 15 cm, preferably 15 by 23 cm and more preferably 8 by 11 inches and yet more preferably greater than 8 by 11 inches. The upper weight limit for all the preferred screen sizes is about 1 pound, more preferably 12 ounces and even more preferably 8 ounces or less. Even more preferable is a weight of 6 ounces.

Sizes as provided herein, are sizes equivalent to an area that is defined by an area of a rectangle with one side L and one side W. The area is then L*W. So if a size is preferably larger than 15 cm by 10 cm then it means that a size is preferably larger than 150 cm². In one embodiment one may prefer a rectangular shape. In another embodiment one may prefer a square shape. In yet another shape one may prefer an ellipsoid shape.

Figure 26:
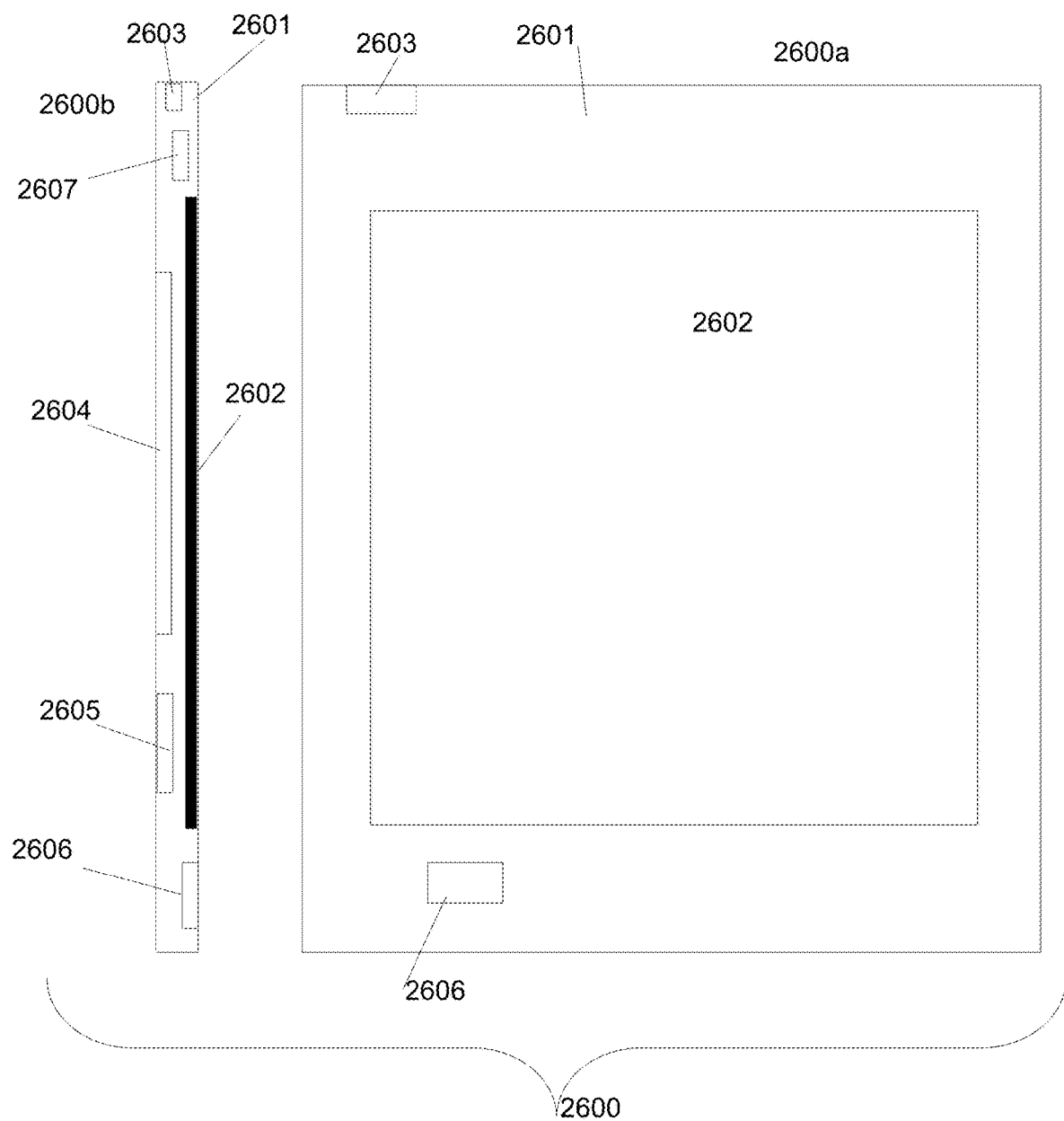

FIG. 26 illustrates one embodiment of an ut/ul display 2600 both in front view 2600a and a cross sectional side view 2600b. The display has a body or housing 2601 with a thin screen 2602 as was discussed above. Also included in an embodiment is an at least one control element 2606 which may be an on/off switch. In a further embodiment the ut/ul display has a connector 2603 for connecting an external power source. In the cross sectional view also at least one embedded IC or chip 2607 is shown. Chip 2607 is a further embodiment is representative for at least a power control chip, a display control chip (including a driver), and any other ICs that are required to enable the display. A device 2605 which is included in the housing in an embodiment represents a communication device, including an antenna in a further embodiment, to receive and process signals from a computing device that transmits signals representing an image. These signals are processed into further signals that can be processed by 2607 to be provided to 2602 for display of an image, which can be a video image. In a further embodiment, image signals may be provided through a wired connection. Device 2605 in such an embodiment can be configured to connect to a wire to receive the required signal. A wire may be an electrical wire or an optical wire such as an optical fiber. In a further embodiment it is preferred to use only one wired connection. In that case 2603 is for instance a USB port enabled to transmit power as well as signals such as an image signal.

In general a battery causes much of the bulk and weight of a computing device. Preferably, screen 2602 is a low power consumption screen as is known in the art. In that case an ultrathin battery 2604 which has a thickness of 1 mm or less and preferably of 0.5 mm is applied. Very thin Li batteries using Lithium Phosphorus Oxynitride (LiPON) as electrolyte in a FET configuration are known. Ultra-thin batteries are disclosed in U.S. Pat. No. 7,389,580 to Jenson et al. issued on Jun. 28, 2008 which is incorporated herein by reference. In a further embodiment, power is provided by inductive transmission as discussed above and 2604 represents such an inductive power receiver.

Figure 27:
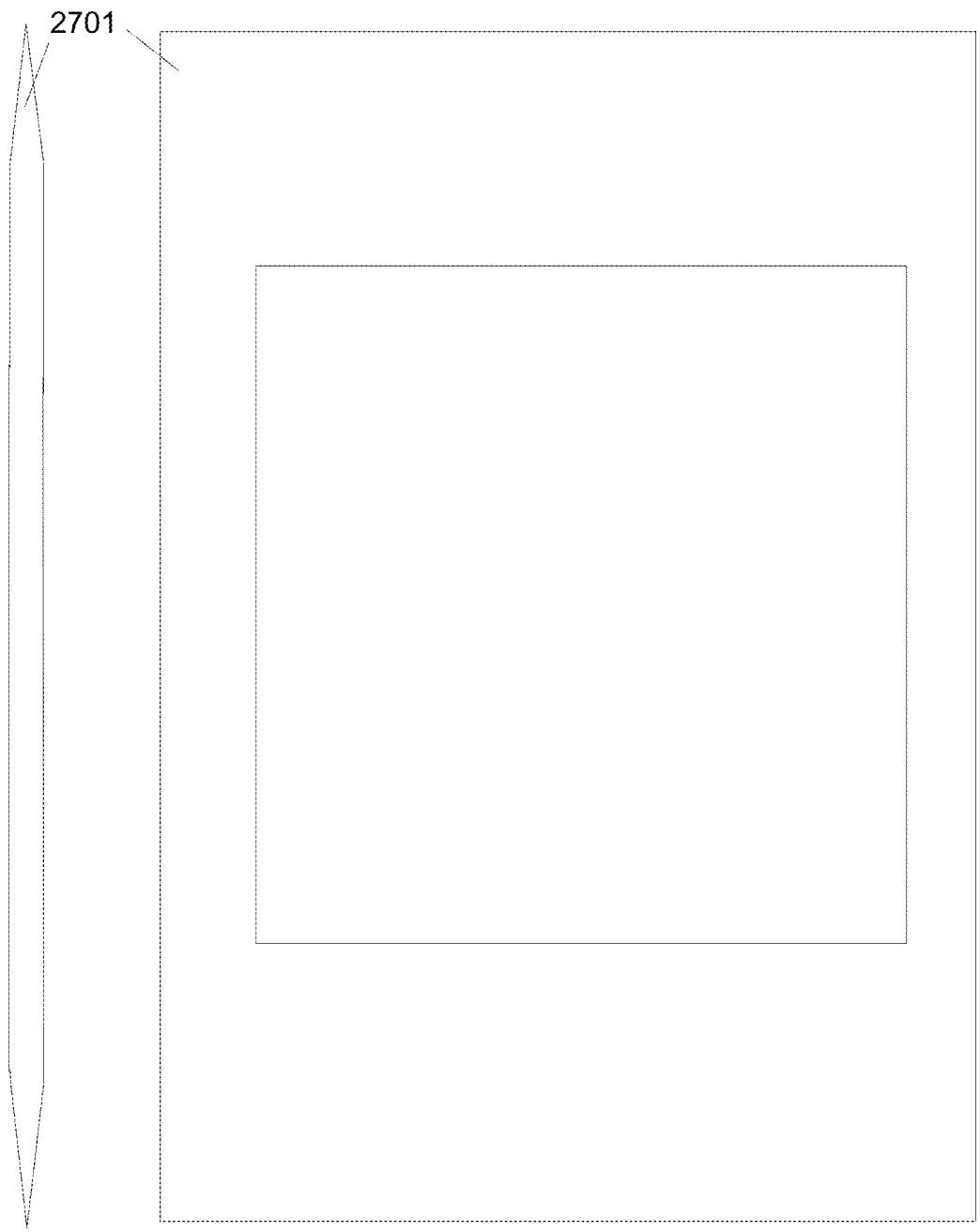

The housing serves to hold the screen and all the supporting electronics and provide stiffness to the display. It also serves to provide a user with the ability to hold the display at the edges. In a further embodiment of the ut/ul display the edges of the housing are tapered as shown in FIG. 27 by 2701. This provides a user with a sense of thinness and saves in weight.

In one embodiment a portable display is provided that has a screen that is larger than a screen of the computing device it is connected to. In one embodiment the display has a thickness that is not greater than 5 mm. In a further embodiment it has a thickness that is not greater than 7 mm. In yet a further embodiment it has a thickness that is not greater than 1 cm. In yet a further embodiment it has a weight that is less than 12 ounces. Because the thickness and weight are not as restricted as in the above disclosed embodiments, one may use cheaper technology including batteries and connections and display screens and the like. It is currently possible to create very small and compact computing devices with camera capabilities, and with integrated storage, processing, rechargeable power and communication capabilities. Such devices can be fitted with a small display screen to provide minimal status information and with limited input controls. These devices can easily be about or smaller than 6 by 3 by 2 cm. However, in such a small size the use as a smart phone or computer is limited. Especially some form of convenient input and display device are missing. However, integrating a small computing device with a convenient keyboard and display screen will nullify its small footprint. In accordance with an aspect of the present invention a portable and connectable display is provided that has a screen size that is at least larger than the integrated display screen on the computing device. In a further embodiment a screen of such a display device is provided with touch screen capabilities, allowing it to be operated as an input device to a separate computing device.

The computing device is enabled to work independently from an external display. It has its own input controls and a display screen. In accordance with an aspect of the present invention an external portable display is provided that can be connected to the computing device. In a further embodiment, the display has a screen that is at least partially or in its entirety a touch screen. The display is connectable to the computing device either wirelessly, for instance by using a Bluetooth, WiFi or other wireless communication connection. In such a case the connectable display should be provided with its own power source, which may be a battery. In a further embodiment of the present invention, the display is connectable with the computing device by wire, for instance with a USB connection. In that case the display may have its own power source or it may be powered by a power source that is provided to the computing device. In one embodiment a connection is a real-time connection. This means that the display screen displays an interface, an image or a document as generated or as being processed by the computing device and not as a completed and stored document. Potential delays or interruption in transmission of data between computing device and display can be addressed by applying a buffer at the display in one embodiment of the present invention and at the computing device in another embodiment of the present invention and in both the computing device and the display in yet another embodiment of the present invention. This allows to temporarily store data that is to be displayed but has not been done so.

In one embodiment, a computing device recognizes when an external display is connected to it. Such a computing device may for instance use a simple, menu driven interface to a user on its own integrated screen. It is known that a computing device can be under control of an operating system. Such an operating system in one embodiment of the present invention is operational on a processor in a small footprint computing device. The operating system is programmed to recognize the connection of an external display device. Such recognition capability is for instance known for USB devices. When an external ut/ul display is recognized the operating system through the processor generates a graphical user interface (GUI) for the external display screen, while the integrated display screen on the computing device maintains its own interface. The GUI on the external display screen may be controlled by a control on the computing device. The external ut/ul display may also have its own user control, which may be a touch screen which communicates through the connection with the processor on the computing device.

The computing device in one embodiment of the present invention has wireless phone and other capabilities such as camera capabilities and/or document processing capabilities. In one embodiment of the present invention the wireless phone capabilities can be independently switched on and/or off without switching on/off the other capabilities.

In one embodiment of the present invention, the screen is of a connectable ut/ul display is a screen with touch screen capabilities. This allows the screen to support full video in color while also having touch screen capabilities. Such a light weight display with touch screen capability has been disclosed in US Patent Application 20100171708 to Chuang published on Jul. 8, 2010 which is incorporated herein by reference. It is to be understood that an embodiment of a ut/ul display that uses touch screen technology and/or a control that communicates with a processor on the computing device is enabled to receive and process signals from the computing device and to send signals to the computing device.

Figure 28:
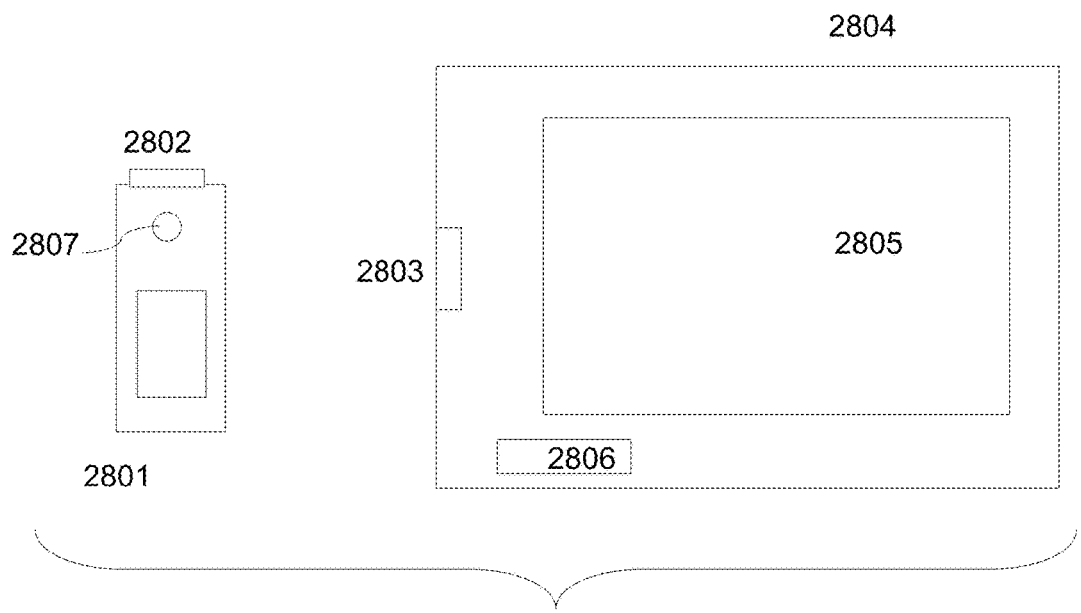

FIG. 28 is a diagram of an embodiment of the present invention. It shows a portable and connectable display 2804 with a screen 2805. The display 2804 has a connecting device 2803 which allows the display 2804 to be connected with a connecting device 2802 of a computing device 2801 which preferably is a small footprint computing device. The computing device 2801 in one embodiment has at least one lens/sensor unit 2807. In a further embodiment computing device 2801 in one embodiment has at least two lens/sensor units for creating panoramic and/or 3D images as disclosed herein. In one embodiment these panoramic and/or 3D images are created by a processor on 2801 and are transmitted to portable display 2804 to be displayed on screen 2805. In a further embodiment the constituting images are being generated by the at least two lens/sensor units on 2801 and are provided with control data that allows a processor on 2804 to combine the images to form a panoramic and/or 3D image by applying the control data and to display the panoramic and/or 3D image on screen 2805. The portable display 2804 has a control 2806 which may be an on/off switch or one or more controls to control screen functionalities such as brightness, contrast and the like, and which may also contain a mouse or pointer like control to control for instance a cursor or pointer type graphic on the screen 2805.

In a further embodiment the computing device has at least 2 lens/sensor units of which one, which is 2807 is shown facing the viewer of the FIG. 28 and at least one facing the opposite site. This allows the device 2801 to record images in the direction of a user and an image in the viewing direction of the user. In a further embodiment a lens/sensor unit in the above embodiment is at least a plurality of lens/sensor units that allows to creating panoramic and/or 3D images in each direction.

Figure 29:
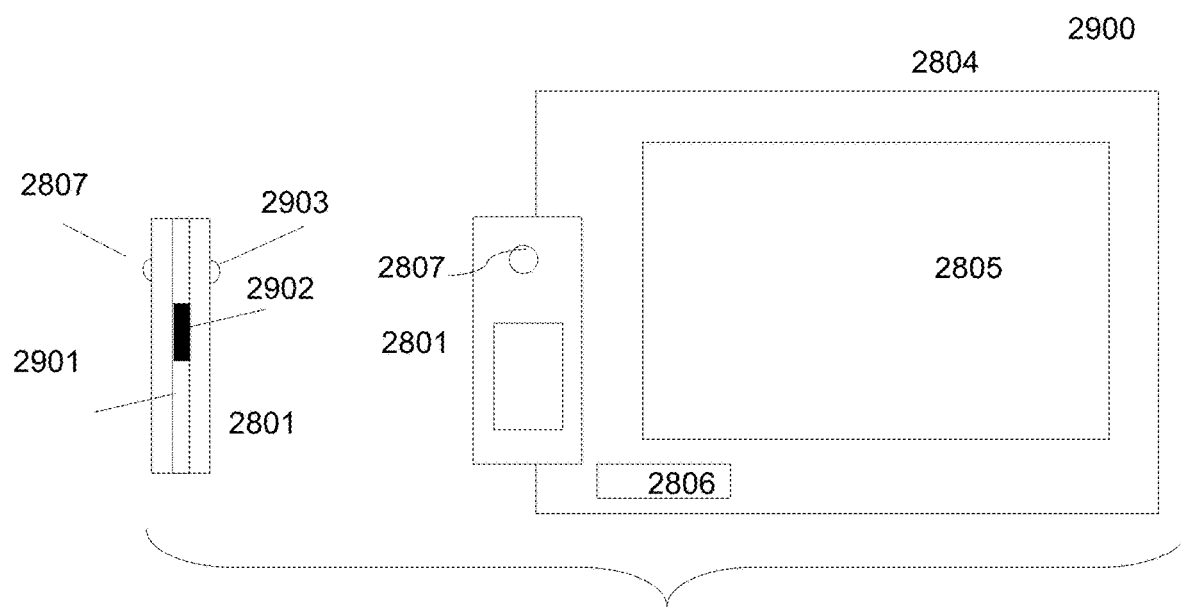

FIG. 29 shows a diagram of one embodiment wherein the computing device 2801 has a slot 2901 which contains connecting device 2902 which can receive and clamp to an edge of 2804 over the connecting device 2803 to create a single device consisting of 2801 and 2802. The computing device 2801 with slot 2901 is shown in side view in FIG. 29. A lens of lens/sensor unit 2807 is shown in the side view. A lens 2903 in an opposing direction is also shown. It is to be understood that in one embodiment of the present invention that either 2807 or 2903 or both 2807 and 2903 are a plurality of lens/sensor units.

FIG. 29 also shows a diagram of the combined devices 2801 and 2804. This allows 2900 to act as a complete portable computer. However 2900 can easily be separated again in 2801 and 2804 as separate devices. Combined device can act as a camera that applies screen 2805 as a direct viewer of either lens/sensor unit 2807 or 2903. In a further embodiment combined device 2900 records and shows images taken both by 2807 and 2903 at the same time on 2805. This may be done by displaying each respective image in a separate window on 2805. One may also show at least one image which may be a video image received by the phone device in device 2801 from a network, which may be the Internet on 2805. One may also receive a plurality of different images at the same time through the phone device. One may open separate windows for each received image and display the images which may be video images on the screen. One may also transmit an image taken by device 2801 through the network to recipients. In a further embodiment at least one window on the screen may be a window related to an application that is being processed by a processor on 2801. This window may also be transmitted through the phone device on 2801 over the network which may be the internet to one or more recipients. Accordingly, 2900 can be used as a portable teleconferencing device. It is to be understood that the functionality of 2900 can also be performed by 2804 and 2801 when not combined but in communication through connecting devices 2802 and 2803.

It is also to be understood that while 2801 in FIG. 29 is shown being clamped on 2804 on the left edge that other configurations are possible, including the computing device being clamped on the right edge, on the top edge, one the bottom edge and on the back side of the display 2804.

Figure 30:
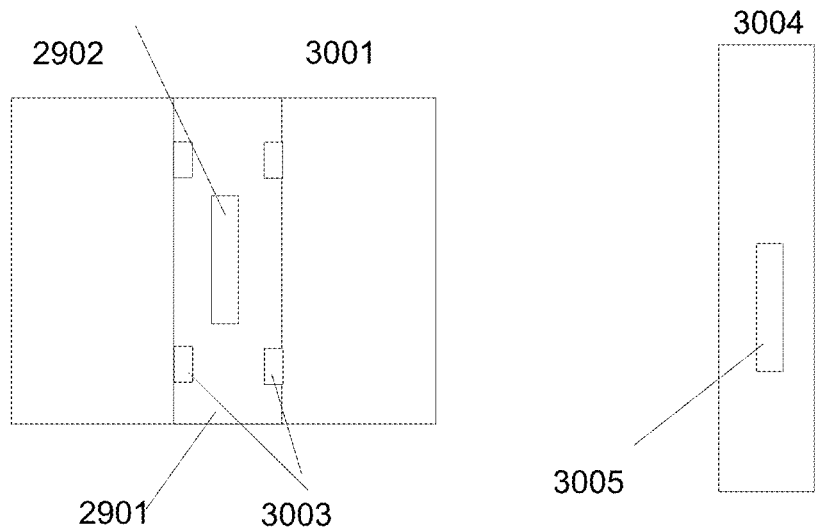

FIG. 30 shows in side view diagram one embodiment of a computing device 3001 that can be clamped onto a connectable display 3004 able to connect with computing device 3001. Computing device 3001 has, as was disclosed above, a slot 2901 which can receive the side of the display 3004. In one embodiment of the present invention, computing device 3001 has a connector 2902 which was also disclosed above and display 3004 has a connector 3005. Connectors 2902 and 3005 in one embodiment are matching male/female connectors that can be connected in a unique way. In a further embodiment of the present invention 2901 and 3005 are matching USB connectors. This allows the computing device 3001 to power the display 3004. In one embodiment the power to a display is exclusively provided externally and the display does not have a battery. The slot 2901 may be equipped with springs 3003 which further secure the display in the slot. Other means to secure the display in a slot, including alignment slots are fully contemplated. Side clamping with a slot has been provided as an illustrated example. Other means for connecting and fixating a computing device 3001 to a display 3004 are fully contemplated. For instance the display may receive the body of the computing device on the blind side. In another illustrative example the computing device may have a hook shaped connector that hooks over and edge of the display housing, with a connector inside the hook shape of the computing device and a connector on the edge of the display. In a further embodiment of the present invention 3001 and 3004 exchange data via a wireless connection.

The computing device and the connectable ut/ul display are two different devices that can be connected and/or combined. One way to not exclusively describe a combination of a computing device and a display is by size of their screens, wherein the screen of the display is larger than of the device it connects to. Another way to not exclusively describe an aspect of the invention is that no dimension in size of the computing device matches or is equal or substantially equal to the dimensions of the display with the condition that the screen of the display is larger than the screen of the computing device. The computing device housing has a length Lc (its longest dimension) a width Wc (its width) and a thickness Tc wherein all dimensions refer to the housings. These can be referred to as (Lc,Wc,Tc). A display, in a similar way, has housing dimensions (Ld, Wd, Td). In a first embodiment none of the corresponding dimensions (Lc,Wc,Tc) and (Ld, Wd, Td) are equal (Lc≠Ld) etc. In a further embodiment none of the dimensions (Lc, Wc,Tc) are equal to any of the dimensions (Ld, Wd, Td). In a further embodiment Lc<Ld and Wc<Wd. In a further embodiment Tc>Td.

In a further embodiment the display can connect preferably wirelessly with any computing device, including communication type devices such as routers to receive a signal with image data to be displayed, that is authorized. Such an authorization may be established by an authorization code or a way of coding or modulation as is known to one of ordinary skill in the art that allows an apparatus to be identified to be authorized. In a further embodiment, the display is enabled to send a probing signal wirelessly that can be recognized by a computing device. The computing device is programmed to recognize a specific signal, associate the specific signal with a specific authorization and transmits data, including image data to the display in response to a recognized probing signal. In a further embodiment the process starts with a computing device sending a signal that can be received and interpreted by the display. This signal tells the display that a computing device is present and ready to receive a probing signal from the display. This allows a display to be traced by a computing device when it is being moved and keep providing the display with appropriate data, which may include image data.

In a further embodiment a plurality of displays are static in location and placed in different positions and a first computing device is mobile, with a moving user for instance. A user may for instance be watching a video program that is stored on a second computing device on a first display and that is provided over a network to the first display. Relevant data about the video program is provided and stored on the first computing device. The user may move to a different location with a second display. The first computing device in communication with the second display communicates the presence of the user and provides the second display with the required data for the second display to show the program that was being watched on the first display with the correct timing and status data. This allows a user to move around a house and follow a video program continuously on different displays at different locations.

One may also apply a similar approach to computer applications. That is: a user may be working on one computer application at one display. All status information may be stored on a mobile first computing device that moves with the user or on a second computing device which is a server connected to a network. A status may be assigned a code which is stored on the first mobile computing device. The user, when moving to a different location with another display brings the first computing device. The first computing device interacts via the network with the second computing device and interprets the code associated with the status that is provided by the first computing device. When the application is processed from the server or second computing device it now automatically displays the correct interface associated with the status of the application. If the application is processed from the first computing device the second display starts displaying the correct interface based on the last status of the application.

In one embodiment the large connectable ultra-thin display is provided with a lens/sensor unit. In one embodiment the display has a thickness of 7 mm or less and has a weight of less than 16 ounces, preferably a weight of 12 ounces or less and a size of about 25 cm by 20 cm or larger. The lens/sensor unit can be a lens/sensor unit as disclosed by for instance Aptina Imaging of San Jose, Calif. in a wafer level camera form and with a claimed thickness of 2.5 mm. Another company offering a similar wafer level camera called NemoCAM-02AVG is Nemotek of Morroco. Its website describes the unit having a thickness of 2.6 mm. The datasheet of the NemoCAM-02AVG is incorporated herein by reference. A wafer level camera is also taught in US Patent Appl. Publ. Ser. No. 20090309177 to Jeung et al. published on Dec. 17, 2009 which is incorporated herein by reference. By using reflow soldering it is claimed by manufacturers that the wafer level camera can be soldered to a flexible PCB. This may add about 0.5 mm at least to the thickness of the camera. It is believed that the Nemotek camera module can be installed in a display that is 7 mm thick, as a housing can be created that has about 5-6 mm space if an ultrathin housing is created, for instance made from a high strength nanocarbon fiber reinforced shell. The shell can be reinforced with a structural foam.

It seems that an ultrathin display of about 5 mm thick or less may have trouble accommodating the wafer level camera module. This can be alleviated by forming a hole in the shell that receives the upper part of the wafer level camera. It appears from the literature and disclosures that are available at the time this aspect of the invention was made that no device having a thickness of 5 mm or less has been contemplated to incorporate a camera that is embedded completely inside the housing that is not thicker than 5 mm. Clearly, one can incorporate a larger camera, if it is allowed to stick out of the housing. In one embodiment of the present invention a ut/ul display having a thickness or less means that its greatest thickness at any location is not greater than 'd'. In such an embodiment if its general thickness is 'a' and a part sticks out by an amount of 'b,', then the thickness is determined to be 'a'+'b'. So, with a thickness of 5 mm or less in such an embodiment the camera module has to fit within a housing that has not greater thickness than 5 mm anywhere.

Figure 34:
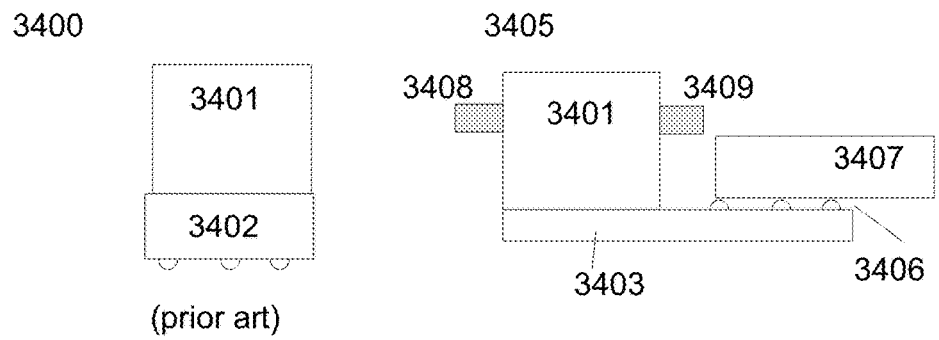
FIGS. 34-36 illustrate small thickness cameras to be integrated with a large thin display in accordance with an aspect of the present invention.

In accordance with one aspect of the present invention one may provide such a wafer level camera module with a much smaller backplane rather than a Ball Grid Array (BGA). This is shown in FIG. 34 wherein a module 3401 is attached to a BGA connector 3402 in a unit 3400. This connector still has to be soldered to a PCB, all adding to the thickness. In one embodiment of the present invention all connections, including power are provided through a thin backplane 3403 of about 0.5 mm thick in a first embodiment, but not thicker than 1 mm in a second embodiment. The backplane 3403 may have a BGA connector 3406 or any slim connector facing to the top of the camera module. Assuming that the thickness of the shell of the housing of the display is about 0.5 mm the connector 3407 can be about 2 mm thick without interfering with the shell. In one embodiment one applies wireless chip-to-chip communication between the sensor of the camera module and a connector chip 3407. Wireless chip-to-chip communication is enabled in for instance US Patent Application Publ. Ser. No. 20090175323 to Chung published on Jul. 9, 2009 and in the article RF/Wireless Interconnect for Inter- and Intra-Chip Communications by Mau-Chung Frank Chang et al. Proceedings of the IEEE, Vol. 89, no. 4, April 2001 pages 456-466 which are both incorporated herein by reference. This requires that the sensor chip of module 3401 is expanded with the communication part, which increases the size of the die. However, in this case the area of the chip is not as critical as the thickness of the chip or the backplane. By using the wireless connection, the backplane can be drastically reduced in size. The module 3401 can be provided with power through a very thin power rail 3403. The receiver chip is located in 3407. While the same diagram of FIG. 34 is applied it is noted that specific components in this embodiment have a different function from the earlier provided embodiment in diagram of FIG. 34.

Figure 35:
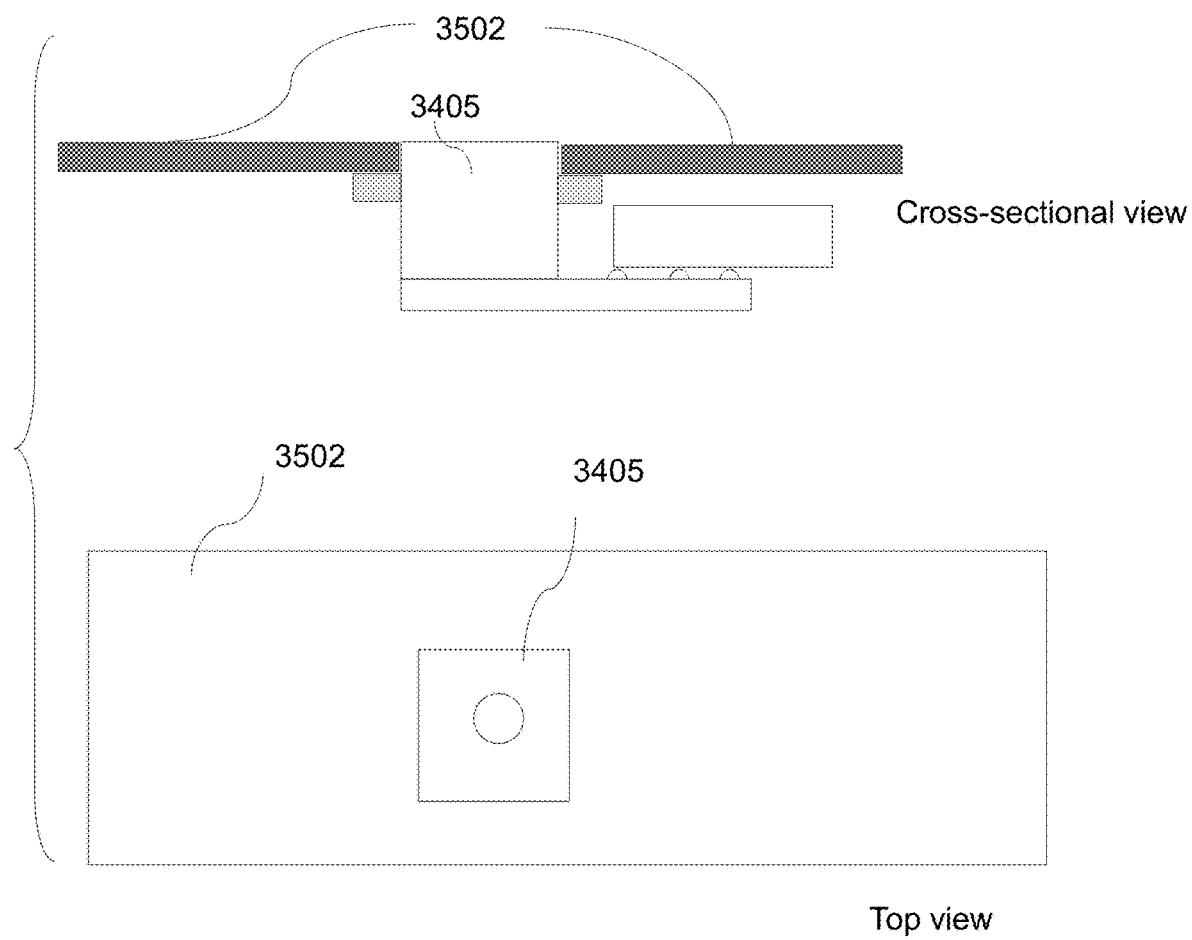

In a further embodiment of the present invention, if space allows it thin flanges 3408 and 3409 are attached to the housing of the camera module. This allows a precise fitting of the module 3401 against the surface of the housing. Preferably the flanges are 0.5 mm or less thick. FIG. 35 shows in diagram how the camera unit 3405 in one embodiment is fitted against the underside of the surface 3502 of the shell of the housing of the display. FIG. 35 shows a diagram both in cross-sectional view and in top view.

Figure 31:
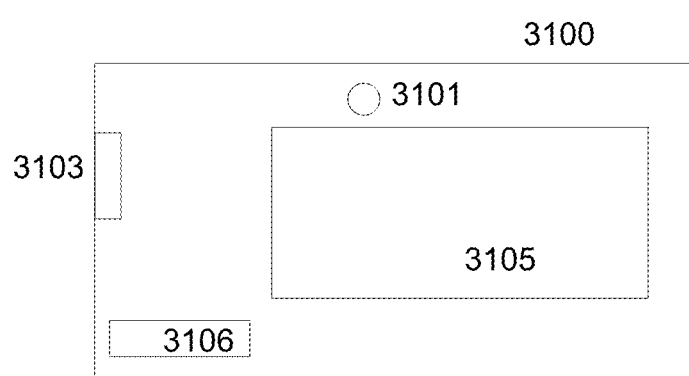
FIGS. 31-33 illustrate large displays with embedded lens/sensor units in accordance with an aspect of the present invention.
Figure 32:
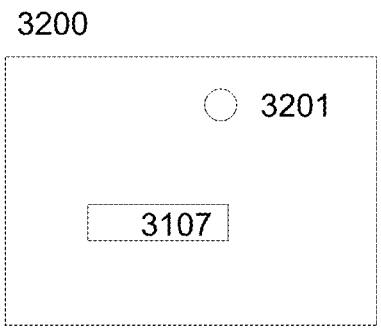
Figure 33:
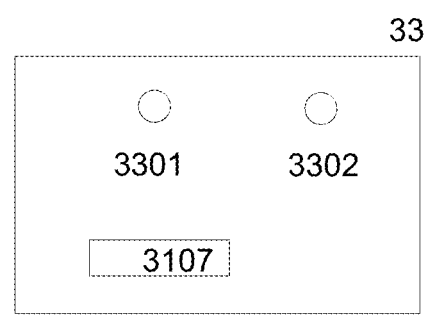

FIG. 31 shows in diagram one embodiment of a display body 3100 with a screen 3105 and a control 3106 and at least one lens/sensor unit 3101 and a connector 3103 to connect the display to the outside world. It is to be understood that related and required circuitry and connections as is known to one of ordinary skill are included in the body. In a further embodiment at least one lens/sensor unit 3201 in a display body 3200 is fitted into the body at the side of the display at the other side of the screen. A control 3107 may be included on that side. In a further embodiment of the present invention the display includes at least one lens/sensor unit 3101 at one side and at least one lens/sensor unit 3201 on the other side of the body of the ut/ul display. In a further embodiment of the present invention the ut/ul display includes at least two lens/sensor unit 3101 at one side and/or at least two lens/sensor units 3201 on the other side of the body of the ut/ul display. In a further embodiment of the present invention both at least one lens/sensor units are operated at the same time to create an image which may be a video image. It should be clear that if a body of the display has a thickness of about 5 mm or less then lens/sensor units 3101 and 3201 are positioned not opposite each other in the body as there is not enough room for that. FIG. 33 shows a diagram of an embodiment wherein one side of the display 3300 has at least two lens/sensor units 3301 and 3302 which may be enabled to create a panoramic and/or 3D image. The opposite side of the body may also have at least two lens/sensor units. Both at least two lens/sensor units in a further embodiment may be operated at the same time.

Figure 36:
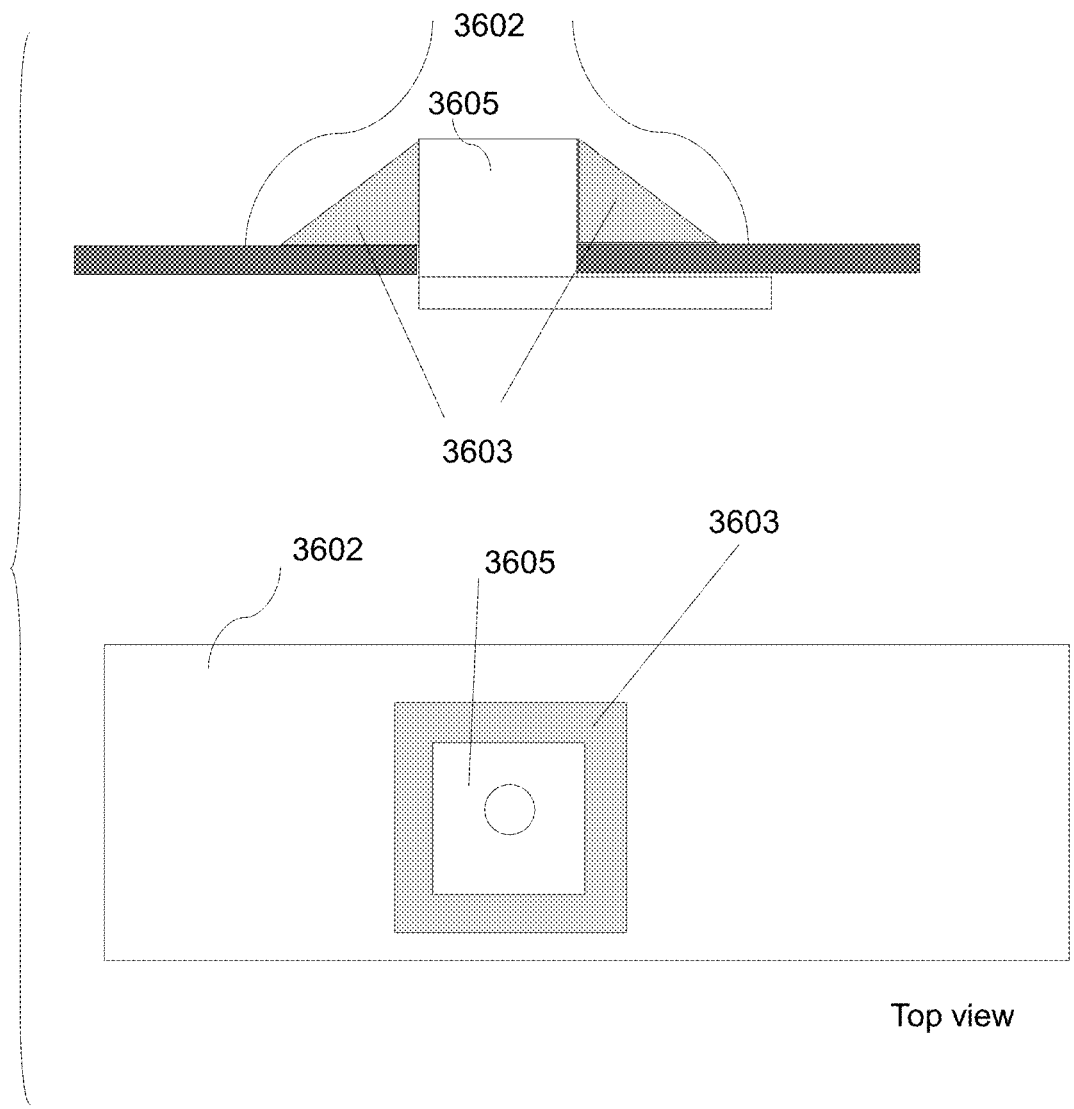

One can accommodate a lens/sensor unit of a thickness, complete with connectors of about 3 mm in a display with a thickness of 3 mm if part of the camera is allowed to stick out of the housing. This is illustrated in FIG. 36. A wafer level camera 3605 is fixed with its lens barrel through the wall 3603 and fit tightly with its backplane against the inside of the wall. Protective material 3603 to protect the barrel may be applied.

It is to be understood that an ut/ul display as provided herein, be it a detached, attached or detachable display displays images as generated by the computing device in real-time or close to real-time, with a delay that is in general not significantly noticeable by a user. One may use in one embodiment of the present display screen or screen material that has no or limited latency and can show images such as video in real-time with a speed of at least 12 images or frames per second in one embodiment, at least 20 images per second in a more preferred embodiment, 30 images per second in an even more preferred embodiment and at least 50 images or frames per second in a most preferred embodiment and shows images in full color. Accordingly, real-time video in one embodiment is video displaying at least 12 frames per second.

In a further embodiment of the present invention one may use material such as ePaper or eInk that has considerable latency and may show images at a speed of 10 images or frames per second or even less. Images may be shown in one embodiment of the present invention in shades of grey. It was already described previously that different materials to display images in accordance with an aspect of the present invention are available.

To be convenient the ut/ul display must be fairly large to serve its purpose as a large screen, thin and ultra light. It is believed that if a display does not meet certain dimensional criteria it will not serve its purpose as a detached portable large screen. It should have a screen of diagonal dimension of at least 10 cm, more preferably have a screen of diagonal dimension of at least 15 cm or preferably larger and preferably have a diagonal dimension of 20 cm, preferably even larger. Preferably it has a thickness of not more than 10 mm, more preferably not more than 7 mm, more preferable not more than 5 mm. Further, preferably a thickness should be less than 5 mm, preferably 3 mm or less, preferably 2 mm. The weight of the display should be preferably be less than 300 gram, in a further embodiment of the present invention less than 200 gram and in yet a further embodiment less than 100 gram. Preferably, the portable and self contained ut/ul display should be of the size, weight, and thickness of a magazine that one would carry without being bothered by its weight. One should be able to carry the ut/ul display in a bag or brief case, such as one would carry a magazine during travel. In one embodiment the ut/ul display has a screen that is a touch screen and wherein the display can communicate in a two way manner with the computing device. In a further embodiment the ut/ul display is connectable to a small footprint device that in a stand alone mode is mainly a mobile phone, but when connected with the display provided with touch screen capabilities is a full blown operational computing device, enabled to perform computing applications such as the full Microsoft Office® Suite of applications (Outlook, Word, Powerpoint, Excel, and Access), games, Internet browsing and the like.

Such a computing device in one embodiment has at least a processor, mass storage, display processing capability, communication capability, input and output capabilities and a minimal display, with an operating system and application software stored on the device while measuring not over 2 cm by 3 cm by 10 cm3 in volume, preferably not more than 2 by 3 by 6 cm3 in volume.

At the time that this invention was made one available display would be an eReader. However, eReaders currently are not available as a separate portable display for a computing device with preferably at least one lens/sensor unit. In fact, one can conclude that eReaders (such as the Kindle II marketed by Amazon) are too small, too thick and too heavy to meet the requirements of the ut/ul display as defined above. eReaders are also not geared to display images in real-time, such as video images, generated from a lens/sensor unit in the computing device, which may be a smart phone with a camera.

One can find reviews of commercially available eReaders on the Internet. Such a review may be found at for instance <http://ebook-reader-review.toptenreviews.com/>. The eReaders are relatively small, thick and heavy. The battery as used in these eReaders cause the eReaders to be heavy and thick.

An external and separate mobile and portable display as disclosed herein works with a mobile and portable computing device. A computing device has at least a processor, memory, it has preferably but not necessarily a display that is smaller than an external display and a transmitter to send a signal to the external display and least one lens/sensor unit enabled to record a digital image and transmit the image to the external display in real-time or close to real-time, allowing a user to watch in real-time or close to real-time a video image in color recorded by the computing device. In one embodiment of the present invention the computing device with at least one lens/sensor unit is a general computer working under an operating system and enabled to execute standard computer application software such as word-processing, e-mail, browsing, games and the like. In one embodiment of the present invention the computing device with at least one lens/sensor unit is a mobile phone, enabled to connect wirelessly to a mobile phone network. In one embodiment of the present invention the computing device with at least one lens/sensor unit as at least a mobile phone, enabled to connect wirelessly to a mobile phone network and a camera and is called a mobile camera phone. In one embodiment of the present invention the computing device with at least one lens/sensor unit is a tablet PC with a screen smaller than the external display. In one embodiment of the present invention the computing device with at least one lens/sensor unit is a smart phone, or PDA, enabled to connect wirelessly to a mobile phone network. In one embodiment of the present invention the computing device with at least one lens/sensor unit is a stand-alone camera. In a further embodiment of the present invention a computing device has at least two lens/sensor units and is enabled to create in real-time a single image such as a video image that is created from at least two separate images.

In one embodiment of the present invention a portable and mobile computing device 4200 as illustrated in FIG. 42, which may be a phone, a smartphone, a tablet computer or any other mobile computing device, is provided that is configured to uniquely connect to a second device 4300 as illustrated in FIG. 43. Such a connection may be a wired connection, for instance using a USB wired connection, for instance a micro-USB connection as in known in the art. The devices 4200 and 4300 are similar and in certain cases expanded versions of devices disclosed earlier herein, for instance as devices 2501 and 2503. Device 4200 may be configured to provide power to device 4300 via the USB connection. The connection may be wireless, such as a Bluetooth connection or any other wireless connection. Device 4200 has connection equipment 4203 to connect with connection equipment 4308 in 4300. The connection equipment is configured to enable two-way communication between 4203 and 4303. The communication equipment may include: antennas, receivers, transmitters, modulators, demodulators, error-correcting coders and decoders, encryption and decryption equipment, amplifier and anything else that enables substantially error free signal transmission and reception between 4200 and 4300, as is known in the art. Device 4300 has a processor 4309 which may include memory or storage to store instructions and data. processor 4309 controls and manages all processes between devices on 4300 and processes data generated by these devices. For instance a processor 4309 manages communication with device 4200, controls and manages camera 4302, display 4401, actuators on 4300 and collects and processes data generated by sensors such as gyroscopes, accelerometers, compass, GPS and other sensors on 4300 which may not be individually shown as to not overcrowd the drawings. It is noted that all devices on 4300 are at least connected to a processor, for instance with a direct connection or a communication bus. These connections are not drawn as to not overcrowd the figures, but they should be assumed.

Both 4200 and 4300 are computing devices and each has at least a processor configured to execute computer instructions, memory and data storage and a display. These elements are known to be part of a computing device and are not shown in the drawing as to not to obscure other elements in the drawing. However all these elements are present. Device 4200 has a display screen 4201 which is preferably a touch screen to provide interactive control to the device and prevent or limit the use of physical knobs and switches. The processor of 4200 is enabled to generate controls 4204 on screen 4201 to provide control elements for the device. Furthermore 4200 contains at least one camera 4202. The device 4200 may have more than 1 camera. For instance 4200 may have 2 or more cameras at one side. Device 4200 may also have one or more cameras at the other side (opposite side) of 4201. Device 4200 may also have a display screen at the opposite side of 4201. This allows a device 4200 to have one display screen to be used in one mode, for instance to display recorded images and the display at the other side of the device a screen to control functionality of the device 4200. This is illustrated in FIG. 47 which illustrates device 4200 in a view opposite of screen 4201. The other side may have one or more cameras 4702 (even though only one lens is drawn). The screen 4701 is preferably also a touch screen with menu elements or touch screen controls 4704.

Mobile computing devices such as tablet computers and smartphones are often used for different purposes and often at the same time. For instance a video may be viewed or a video game is being played, while a phone call interrupts that activity or an urgent phone call has to be made. Or data has to be retrieved, while a GPS map is being displayed. Processors nowadays are quite powerful and are able to perform 2 or more different tasks at the same time. However, for display purposes, with only one screen, one application (like the game or the display of the video) has to be interrupted or pushed to the (invisible) background while another application takes over the display screen. This switching between applications is prone to mistakes as it requires one, two or more control activations. A mistake is easily made and one may easily interrupt or even stop one or more applications that are desired to continue running. This then requires re-starting the application and one may have lost data that has to be re-entered or a time-line in an application, such as a video playing, has been lost and has to be determined again.

The use of a second screen alleviates some of the problems that may occur during an interruption or by performing multiple tasks on a computing device. In one embodiment of the present invention, a single processor or a processor with multiple cores runs all the applications on the computing device 4200. This is a processing unit 4208 enhanced with memory and inter-element connections that executes programs and manages all equipment on device 4200. To keep the drawings simple no connections and sub-systems are drawn in the figures, for instance between the processor that has the drivers of the equipment and the equipment elements such as the screens. Certain applications such as playing a video are assigned a screen, for instance screen 4201 or 4701 and are assigned a screen priority. An application with a high screen priority will be assigned a constant display, which may be on a pre-assigned screen, such as 4201. The priority may also be that the application will play on a screen uninterrupted. So, if a phone call comes in during displaying a video, a control or alert 4204 appears on the screen. Activating that control has as effect one of two actions: 1) the new application opens on the alternate screen 4701 if the video was playing on 4201, while the video continues to be displayed on 4201. One may of course pause the video; or 2) the new application opens on 4201 while the playing of the video is seamlessly transferred to screen display 4701. After activating the new application, one can continue viewing the video on 4701. While device 4200 may use one processor, one may also use 2 or more processors. An additional processing unit 4708 is illustrated in FIG. 47. Some applications require significant processor power. In such a situation it is beneficial to assign one of two or more processors to a processing intensive task, such as image processing, while another processor manages for instance a phone call. In case of a single processor, the device operates as a multi-tasking processor. But, instead of having one screen, the processor now has two screens available and assigns a screen on the basis of a priority. That means that still some applications may be pushed to the background. However, an application among a plurality of applications may be provided with a priority level, for instance there are 10 applications running each being provided with a unique priority ranging from 1-10 with 1 being the highest. A priority 1 in one case means that this application is always provided with a screen. From the remaining applications, the application with priority 2 is assigned the other screen. Based on conditions, priorities may be re-assigned. For instance screen 1 shows a video with priority 1, screen 2 has an open data base with priority 2. A phone call comes in and based on a priority list the incoming call may be provided with priority level 2 and pushes the database display to the background. In one embodiment of the present invention an application requires access to a screen while 2 applications are operational. A message is displayed on at least one screen but preferably on two screens on 4200 and requests input from a user to make a selection what to do: open new application in the background or push an operational application with an assigned screen to the background which may mean to stop or interrupt that application and allow a new application to take control of a screen. The user may select which application is pushed to the background.

In one embodiment of the present invention data generated by an application, such as a game or video or sound are displayed on device 4200 of which images are shown on a screen of 4200. In addition, signals generated by an application are provided to a connecting device 4205, which may be wired or wireless, to an external device such as a computer and/or speakers and/or a screen display or any other external device. For instance device 4200 is generating video images on one of the screens of 4200 which is transmitted via 4205 to a remote viewing device. When a call comes in on 4200 being a smartphone, activating control 4204 or 4707 activates the phone application on one of the screens of 4200, while in one configuration the device 4200 continues to generate the video image and transmit the image substantially without interruption via 4205 to the remote display screen or device. This allows a user to take a call and hold the phone against an ear while watching the video image uninterrupted on the remote display. The use of at least 2 processors, which may be coordinated in managing screens and other devices on 4200, facilitates uninterrupted use of at least 2 different applications on a single device. A processor may also be a very powerful single processor or a processor with multiple cores as currently marketed by AMD (Advanced Micro Devices, Inc of Santa Clara, Calif.) and Intel (Intel Corporation of Santa Clara, Calif.).

It is well known that a device 4200 that is a smartphone, a cellular phone, a computer tablet such as an iPAD and other portable/mobile computing devices may have additional equipment, including microphones, a mouse or other pointing device, network equipment to connect to a local network, the internet or to a cellular network. This equipment is assumed in 4200 and if needed in 4300, but not illustrated in the drawings as to not obscure other elements.

Smartphones and tablet computers are nowadays very powerful and often replace desktop computers as well as devices such as stand-alone cameras. Because of the demands placed on smartphones and tablets, they begin to suffer from the same properties that make a laptop computer less mobile. That property is its size. In order to facilitate certain applications including the display size, the smartphones and tablets are becoming bulky and carrying and manipulating such a device becomes cumbersome in certain situations. One limitation of a smartphone and tablet is that its one or more cameras are fixed in the body of the device. This makes rapid and unobtrusive use of the cameras a bit cumbersome. It was already identified earlier above that use of a smartphone as a camera during a meeting or concert, especially when it is held in a position above the head of a user may have adverse effects, for instance for people who are bothered by the light of the screen of the smartphone, which almost acts like a flashlight.

In one embodiment of the present invention two smartphones, or two tablets or a smartphone and a tablet or a smartphone and a laptop or a laptop and a tablet are used in connection. Herein, one device with a camera, for instance the smartphone, is used as a camera, such as a video camera to record an image, such as a video image of a scene. The device with the camera is configured to provide a real-time image of the scene on the screen of the camera containing device. The camera containing device is uniquely connected to the second device which is enabled to also display the image such as video image on its display. This is convenient when the device with the camera is held in a position, for instance above the head of its user, that does not allow to view the image recorded by the camera on the display screen of the camera containing device. A display of the image recorded by the camera on the screen of the camera containing device serves no purpose and may form an annoyance for people who are facing this screen.

In accordance with an aspect of the present invention, a control is provided on the camera containing device that shuts off the display and thus prevents the annoyance of other people. This control may be a hard button on the device or a control element on the touch screen. This control only switches off the display screen, or rather puts it in sleep mode, but leaves at least the camera function in an operational mode, which continues to transfer image data in real-time or substantial real-time to the connected second device which displays the image. In accordance with a further aspect of the present invention. the display screen of the camera containing device is switched off from the connected second device. In accordance with an aspect of the present invention, the second device controls operation of the camera in the first device. That is start/stop and pause of the camera, zoom and all other controls of the camera can be conducted from the second device, preferably from the touch screen on the second device. The display screen of the second device can also be switched off from the screen of the second device while all other functions, such as storing image data and phone functions for instance, stay operational. The display screen of the second device can also be switched off from the screen of the camera containing device while all other functions, such as storing image data and phone functions for instance, stay operational. The switching-off the screen in both devices is preferably a sleep-mode. Touching a screen will lighten up the screen and allow it to function as an active touch screen.

The one or more cameras 4202 and 4302 can take photos and/or video images which can be displayed in real-time or substantially in real-time. For instance video images recorded by 4201 can be displayed on screen 4201 or on a screen on the opposite side of 4201.

Devices 4200 and 4300 each have a housing that contains equipment to make the devices operational, including a power source such as a battery or a connector that allows the device to be connected to a power source. Device 4200 and 4300 in one embodiment have an on/off switch that switches on and off power.

In one embodiment, device 4200 controls functionality of device 4300 via the connection which may be wired or wireless. In one embodiment, device 4300 controls functionality of device 4200 via the connection which may be wired or wireless.

FIG. 44 illustrates device 4300 with camera 4302 in rear view, showing screen 4401, preferably a touch screen and control 4404, which is preferably a control activated on screen 4401. However, device 4300 may also have other physical controls, such as buttons and switches, which are not shown as to not overcrowd the drawing. A user may hold a device 4300 with camera 4302 in an elevated position, for instance above the user's head or in any other position where it is hard or difficult or undesirable to view the image generated by 4302 on 4401. In one embodiment a user may view the image in real time on screen 4201 on device 4200 and adjust a position of device 4300 in a manner so an object that is a target of camera 4302 is in view of the camera on screen 4201.

Two problems can arise with a small camera directly held in a hand hard to view and/or control position. The first problem is that there is no direct visible feedback from the image to stabilize the handheld camera. The only way to do have visible feedback is to watch screen 4201 on another device and to try to hold 4300 in a stable position. Over time, more than 30 seconds or more than 60 seconds of recording becomes difficult to hold 4300 stable while not directly viewing 4300 or screen 4401. Image stabilization is a known technique with different possible implementations and realizations. An overview of these techniques is provided in Image_stabilization.pdf from Wikipedia, downloaded from https://en.wikipedia.org/wiki/Image_stabilization on May 7 2019 and which is incorporated herein by reference. Stabilization takes place by determining or estimating a neutral position of a camera element (lens or sensor), determining a movement of the lens or sensor, for instance with movement sensors, such as gyroscopes and accelerometers and effectuating a countermovement such as a shift or rotation of a lens and/or image sensor by voice coils or MEMS devices so the recorded sequence of video images appears to be stable or centered in a frame. Another technique is digital image stabilization, wherein the recorded images are transformed (by translation or rotation or other warping) so the resulting sequence of video images appears as being stable.

One may also stabilize an entire camera body on a platform or tripod to record a stable video image. Embodiments of image stabilization devices and position estimators are taught in a) U.S. Pat. No. 10,284,782 to Yamazaki on May 7, 2019, b) U.S. Pat. No. 10,205,879 to Segapelli on Feb. 12, 2019; c) U.S. Pat. No. 10,274,129 to Saika et al on Apr. 30, 2019; d) U.S. Pat. No. 10,281,737 to Park et al. on May 7, 2019; e) U.S. Pat. No. 10,203,515 to Liu et al. on Feb. 12, 2019; f) U.S. Pat. No. 10,277,858 to Kankaanpaa et al. on Apr. 30, 2019; and g) U.S. Pat. No. 10,277,821 to Shigeoka on Apr. 30, 2019, all of which are incorporated herein by reference.

Image stabilizers are generally not intended for object tracking, even though tracking of an object with a camera may also suffer from image shake and jitter that can be addressed by image stabilizers. FIG. 45 illustrates an embodiment of device 4300 in accordance with an aspect of the present invention. The camera 4302, which is one of one or more cameras in device 4300 has an image stabilizer 4307 which counters hand jitter and shaking. Because 4300 may be used in a position that is not directly visible to a user, device 4300 may drift out of a preferred stable position because a user holding 4300 in a hand, shifts position, moves a hand and/or arm and does not place or keep 4300 in its neutral position. FIG. 45 illustrates 4300 from a top view and illustrates three elements (4501, 4502 and 4503) that are part of 4300. These elements may be bars of about 1 or 2 mm in diameter, preferably made of metal or a plastic material that can be detected or felt by the fingers of a user, by being able to stick out above the surface of 4300. Another bar 4601 is shown in a bottom view of 4300 in FIG. 46.

In one embodiment of the present invention a little bar can be extended up from the body by a motor or actuator in the body of 4300. For instance a bar can stick out for a length of 1 mm up to for instance 5 mm. It can also be withdrawn into the body of 4300. When the bar is extended from the body by an actuator, a user notices pressure from the bar on the skin of for instance a fingertip. When the bar is withdrawn inside the body of 4300, the pressure on the skin disappears. In a further embodiment of the present invention, the little bar is placed in a vibration mode by an actuator and the user feels a vibration on the skin of a fingertip. All three bars 4501, 4502 and 4503 and bar 4601 can be activated (extended, withdrawn or vibrated) individually. A bar is activated when camera 4302 experiences a movement of its center (optical center) that is too large to keep an object or scene within the camera's field of view. The processor, based on data generated by gyroscopes or accelerometers or other sensors may determine that the optical center of camera 4302 has moved too far from its optical center and threatens to move a scene or object outside a field of view (FOV) of camera 4302. How and when a scene or object disappears from a FOV depends on how close an object or scene is to the camera. An object fairly close to a camera disappears faster from a FOV at small rotation of the camera than a scene or object that is farther away.

In accordance with an aspect of the present invention, a distance between a scene or object and the camera is determined, for instance from a focal setting by an autofocus mechanism in the camera. A rotation table may be stored in a memory that is accessible by processor 4309. For instance a focus on an object/scene within 1 meter of the camera generates an alert when a rotation is greater than 5 degrees. While a focus on a scene that is far away 10-15 meters or more, generates an alert when a rotation from an initial point is 15 degrees. For a distance over 1 meter it may not make a lot of difference where the object is. So, in that case a rotation of 20 degrees, preferably of 15 degrees and more preferably of 10 degrees and most preferably of 5 degrees from a set neutral position will activate one of the bars. This is illustrated in FIG. 51 as device 4300 is viewed from the rear looking at display screen 4401. A control or button 5001 on 4300 when activated sets the neutral position which is indicated by point 5100. This is not an object but a point from which movements (rotations and translations) of 4300 are determined by sensors for instance. Control 5001 may be a control on screen 4401 or a real button on 4300. Button 5001 is drawn at the current position, allowing a right handed user to activate 5001 with a push of the right hand thumb. However, control 5001 may be placed anywhere on 4300 where it is convenient to be activated. The setting of the neutral point may also be performed from device 4200. In that case an instruction or signal is provided from 4200 to 4300 to set the neutral point. However, it seems more convenient for a user to activate 5001 on 4300 when camera 4302 is active and transmits real-time video images to 4200 and a user determines based on the image on 4200 that camera 4302 is in a neutral position.

Image 5109 represents a drift or movement of the camera too far up and bar 4601 on the housing is activated indicating that the housing should be rotated in the direction of 4601 (up) and when the camera is moved in the neutral position 5100 bar 4601 is deactivated. When 5100 is in position 5103 bar 4503 is activated and the camera has to be rotated in the direction of 4503 (counter clockwise), when 5100 is moved to 5101 bar 4501 is activated and the camera has to be rotated clockwise (around axis 4502-4601) to move back to the neutral point. When 5109 is reached 4601 is activated. The bars thus help a user to keep the camera within a preferred range. Image stabilization either with actuators or digitally helps to suppress jitter and shake. However, this is different from tracking an object.

For tracking an object, a broader movement of a camera may be necessary. Preferably a rotational movement in x and y direction of the camera relative to a base is enabled. The rotational movement of at least 10 degrees each way from a neutral point is preferable, more preferably a maximum rotation of at least 20 degrees each way, even more preferable a movement of 25 degrees and even more preferable a movement of 45 degrees and even more preferable degrees a movement of 60 degrees each way relative to a neutral point. It was disclosed earlier above that a platform may be used to hold a camera. In accordance with an aspect of the present invention a housing that holds the camera and encapsulates it partially from 3 sides as shown in FIG. 48 is the platform. Attached to the housing is a mechanism that allows rotation of 4302 in two planes (up and down and left to right when 4302 is viewed from the front as in FIG. 50 where a double circle indicates 4302. The outer circle indicates open space that allows 4302 to rotate within its limits. This is further illustrated in FIG. 48 and FIG. 49. Camera 4302 is attached to the platform (housing of 4300) via a mechanism 4808. Mechanism 4808 may be a micro gimbal mechanism or any other mechanism that allows 4302 to be rotated in two planes. The body of 4300 has an opening 4811 allowing camera 4302 to rotate and/or move freely within the body of 4300 as moved by one or more motors.

This is shown in FIG. 52 wherein in part 5200 of the body of device 4300 a frame 5205 is fixed on rotatable axis 5201, so that frame 5205 can rotate in an out of the plane of 5200, moving the camera 4203 when viewed in position as shown in FIG. 50 from left to right and from right to left. A processor controlled micromotor 5202 rotates frame 5205 based on instructions from the processor. Inside frame 5205 is carrier 5207 holding camera 4302, carrier 5207 is fixed on axis 5203 which is rotatable by micromotor 5204 controlled by a processor, so that 5207 and thus camera 4302 can be rotated up and down and down and up based on processor instructions. This is just one possible illustrative embodiment as other embodiments are possible and contemplated. Existing microgimbals and servos, also called micro pan-tilt are usually designed for being fixed on an external platform. But micromotors exist that allow the microgimbal or micro pan-tilt to be constructed inside a body of preferably less than 2 cm deep and more preferably less than 1.5 cm deep. Stepper motors with a diameter of 1 cm or even less are available on the market and can easily be fitted in a housing of 4300. The housing of 4300 is preferably not thicker than 2 cm. The housing of 4300 is preferably not longer than 7 cm. The housing of 4300 is preferably not wider than 5 cm. Preferably, motors and/or actuators are bi-directional.

FIG. 49 illustrates an embodiment of device 4300. The housing of 4300 has been constructed so that the lens of 4302 is below the surface of the housing. In one embodiment of the present invention brackets or pinholders 4907 and 4909 are fixed to the side of the housing of 4300, to where a band like a watchband or strap as known in the art of arm wrist watches is attached. This allows 4300 to be used as a smartwatch such as Device 4300 has a power source, which may be a battery or is powered via a cord such as with a micro-USB connector, controllers for the motors and sensors to detect and measure displacement and rotation of the device.

Device 4300 can be held by a user between 3 fingers on the top and a thumb on the bottom and being directed by the bars for movement as is explained above. The camera in 4300 may be used for manual tracking. The camera is held above a user's head by a user for instance and an image generated by 4302 is viewed on device 4200. Based on viewed images, the user adjusts the hand position to track a moving object. One assumption may be that fast movement around a neutral point of the camera is unwanted shake or jitter. Servo software that controls camera movement by the motors may automatically correct any movement that can be characterized or approximated by a vibrational frequency above preferably 1 Hz and more preferably above 5 Hz. The software filters out these vibrations and establishes a preferred neutral point, for instance on the centerline through the body of 4300 and the camera. The motors thus operate like an image stabilizer.

In one embodiment of the present invention a position of the camera, for instance by activating 5001, is set as a tracking point of the camera. The sensors in 4300 are used to determine departure (in degrees) of the camera position relative to the set tracking point. The servo software on the processor controls the motors to keep the camera directed to the set tracking point. Rather than a specific object the camera tracks a preset point. For instance somebody running down a street may want to record a view of the street rather than an object in the street. The up-and-down movement of the body and thus the hand or head of the runner is compensated by the software controlled motors. The user may be guided by the bars in the camera, as described above, if the camera starts to depart too much from the desired tracking point, allowing the user to adjust a position of the camera.

In one embodiment of the present invention, a user identifies an object in an image generated by the camera 4302 and marks the object in the image. Preferably that is done on a screen of 4200. For instance software on either 4200 or 4300 generates a mark, like an ellipse, circle or rectangular box and a user places the mark over an object on the screen. The software extracts or segments the object contours from its background and establishes characteristics (contours, statistical properties, shapes, edges) that allows the software to recognize the object in the image and to track the object as the conditions and other characteristics of the image change. Based on the power of the processor and the allowable delay in tracking, the image tracking is done on 4300 or is done of 4200 and control signals are provided from 4200 to 4300 to control the motors of the tracking mechanism. Once an object is identified in an image, it is made the center of direction for the motor controls. That is, the servo software and the image tracking software work together to keep the object in or close to the center of the lens or of the image. If the position of the camera makes the object to be too close to the edges of the image, software will activate one or more bars, as described above, to assist a user in adjusting a position of the camera to keep proper track of the object. The tracking software updates the properties of the object as conditions, such as background and light conditions change. Accordingly, a small and handheld camera has been provided that creates a stable image on a remote screen and the handheld camera has a housing that is its own platform for a tracking mechanism.

In accordance with an aspect of the present invention, the camera can be attached to an object through its brackets or belt or other attachments through brackets or other attachments on the housing of 4300. The object tracking can be activated on 4300. In general the camera is able to move relative to the body within a cone with a top of 120 degrees as described above. For many applications object tracking requirements fall within this capability. Fixed at a pole for instance, or in other circumstances, device 4300 can generate an alert on 4200 when the limits of rotation are reached or 4300 can generate a visible alert. For instance a light or LED may be part of the bars that light up when a limit is reached. This allows a user to take action and for instance manually rotate or adjust the device 4300. When rotation limits are reached and no action is taken while the object leaves the field of vision of the camera, the motors may place the camera in its neutral and centered position in device 4300.

In one embodiment of the present invention the mechanism 5200 that rotates camera 4302 horizontally and vertically (or in x and y direction) is placed on a rotatable motorized platform 5300 which may be a ring to which 5200 is fixed as illustrated in FIG. 53. Other configurations that provide the range of motion of camera 4302 as illustrated in FIG. 53 are possible and contemplated. The configuration of FIG. 53 is for illustrative purposes and should not be considered to be limiting. The platform 5300 may be rotated by a micromotor 5302, a micromotor being an electrical motor, preferably a stepper motor that fits inside the housing of 4300 and preferably when it has a circular shape has a diameter smaller than 10 mm and a length smaller than 10 mm. Such motors, for instance piezo-motors, are known. Micromotor 5302 allows camera 4302 to be rotated around its optical axis inside the body of 4300. In accordance with an aspect of the present invention, the micromotor 5302 is controlled by the processor or by a controller based on sensors, such as accelerometers and/or gyroscopes inside 4300 which provide orientation data to the controlling processor. Image sensors of cameras usually have a 4:3 horizontal to vertical format. Accordingly, the image sensor for tracking movement of an object along the horizon is best used in what is called landscape orientation. However, when a vertical motion is tracked a portrait orientation of the image sensor may be preferred. Cameras generally are fixed in a housing relative to the horizon, wherein the orientation is commonly in landscape orientation with respect to the preferred position of the camera.

It is not always predictable how a user will hold a camera, especially not when the user is moving. In one case a user may attach device 4300 (via a band through a bracket for instance) on a head or arm. During movement, even when handheld, the orientation of the sensor relative to the horizon may change. With input of the orientation sensors, the processor is configured to activate the micromotor 5302 so that the camera 4302 maintains substantially a constant angle to a horizon either in portrait or in landscape mode. Both the preferred format (landscape or portrait) and the angle of operation are set initially or during operation, for instance by activating 5001 or another control on 4300 or a control on 4200 that remotely sets a configuration on 4300. A number of configurations with choices portrait and landscape and a series of angles, for instance increases of 5 degrees from 0 to 90 degrees, may be stored on a memory and selected by way of a button or a control. One may also place body 4300 in a preferred position and by activating a control the horizon angle and orientation format are set based on that position/orientation. A preferred orientation of camera 4302 in body 4300 may be set followed by deactivating motor 5302 so that the orientation is held fixedly during the time that motor 5302 is deactivated or held inoperable.

It is assumed that most commonly a horizontal landscape format/orientation is preferred and that may be the default position and operation of platform 5300. However, other default positions may be set on device 4300. In accordance with an aspect of the present invention micromotor 5302 has a capability of turning platform 5300 over an arc of up to preferably 90 degrees, more preferably up to 100 degrees, more preferably up to 180 degrees and most preferably up to over 180 degrees such as 200 degrees. In one embodiment of the present invention, all platforms are returned to a neutral position. For instance after completion of recording an image.

The use of rotatable platform 5200 allows camera 4302 to be used as a tracking camera with the camera in unusual orientation. This is illustrated in FIG. 54. An image in landscape orientation recorded by camera 4302 is illustrated as 5400. The platform in one embodiment of the present invention is rotated in position 5401 so the diagonal of the image is parallel to the horizon. An object 5403 that in 5400 would fall outside the field of view of the camera is now inside the field of view of the camera. In fact, the field of view along the diagonal is extended by 20% in this way when the sensor has a 3:4 format. In general, one would not want an image shown as 5401. Though a screen held in the position of 5401 would show an image reflecting the orientation, a recorded image would be represented in the format of 5400, thus showing object 5403 in the upper right corner. For object tracking it would generally not matter how the body of 4300 and camera 4302 are oriented. The tracking software has to adjust its reference frame to the rotation of the camera and adjust similarly for the control of the camera. In the viewer's reference frame, the object may follow the direction of the arrow associated with numeral 5404. In the reference frame of the body of 4300 the object moves to the upper right corner and the camera will be instructed to follow that path. The extra field of view may be needed if the camera is reaching the edge of its movability cone.

In accordance with an aspect of the present invention, the processor is instructed to set a horizon or orientation of an image, for instance based on a position or orientation of the camera 4302 relative to the actual horizon. However, the processor may be instructed to set any realizable artificial horizon. The processor or image processor that outputs image data to a screen, is instructed to apply the rotation of the horizon to show image data relative to its artificial horizon. In one embodiment of the present invention, the processor may also resize the image to have the image, such as 5401, fit on a screen. It may show areas outside 5401 as black or any other background color on a screen of a size as 5400. Thus, while the image is captured by a rectangle, reflecting the format of the image sensor, the rectangle is displayed on a rectangular screen on an angle reflecting an angle of the sensor relative to the body of the camera.

To provide a better grip to a user and better feel between a presence and absence of presence, a dip 5002 may be provided in a surface of 4300. This provides a natural grip for a user. In FIG. 50 bars 4502 and 4501 are extended or activated while 4503 and 4601 are withdrawn and/or deactivated. The purpose of these bars is to be activated so that the camera will be rotated inside the body of the housing in a predetermined direction.

To carry two devices as described above may be inconvenient, especially if they are two full-blown devices such as smartphones or tablets. In accordance with an aspect of the present invention, device 4300 or what is called the camera containing device, is a compact mobile computing device that can be held in the palm of a user's hand or can be easily held by 3 or 4 fingers and a thumb of a user's hand. The size of 4300 is important and should not be bigger than a 1980s pager for instance and preferably the size of a box of matches. In one embodiment of the present invention, device 4300 has a preferably a volume not greater than 4 cubic inch, more preferably a volume not greater than 2 cubic inch, even more preferably a volume not greater than 1 cubic inch, most preferably a volume not greater than 0.5 cubic inch. Components nowadays are such that all electronic components and the one or more cameras can easily be stored in such a volume. For instance a standard 5EJ Matchstick Box has a format of 51 by 35.5 by 14 mm. A box with a body of that format can easily hold all components of device 4300 and thus 4300 should preferably not be bigger than that. One is referred to high quality cameras in current smartphone which can fit well into a housing of earlier provided dimensions. Accordingly a housing that is in volume not greater than 6 by 3 by 2 cm can be held conveniently in a hand and contain all necessary components in accordance with an embodiment of the present invention. The surface of device 4300 is determined by the size of a display that is required. In one embodiment of the present invention the surface of screen 4401 in device 4300 is not greater than about 16 square cm, preferably not greater than 20 square cm. If the size is too large 4300 becomes too large to handle conveniently and to store conveniently, for instance in a coat, shirt or trouser pocket or attached to an arm or a head with a flexible band. For that reason a housing of 4300 may have a clip to be attached to a belt or band. As an illustrative example FIG. 47 illustrates one embodiment wherein a bracket 4701 is part of the housing of 4300. The bracket creates an opening 4703 that allows the device to be placed on a belt or band. Other attachments, including hooks, pins, Velcro tape, screws, bolts, rings and other fastening construction may be part (detachable or permanent) of the device 4300 to attach 4300 to an object or body part.

The selected size, surface and volume of device 4300 is not an arbitrary choice, but is determined on functional conditions and considerations. Clearly 4300 should not be too large as it will become inoperable to be held in a palm of a hand, easily be held in positions above a head for instance and to be conveniently carried around. However, the device 4300 cannot be too small, as it will 1) be difficult to handle as it may be too small; 2) it may easily be lost 3) the room for placing a display on 4300 if the housing is too small, may not be sufficient to be operable; 4) there is not enough room to incorporate required controls, to be discussed below. An example of a camera device that is too small in size is a "micro security camera" as provided on https://niftychic.net/products/micro-security-camera?variant=8855162224701&gclid=EAIaIQob ChMIvObs6t_74QIVkozICh3ekA5JEAQYBCABEg JRIPD_BwE which is incorporated herein by reference. The camera offered on this site has a housing that is as wide as a fingertip or about 1 by 1 cm. Such a size may be good for hiding a camera or placing it in a drone or other device. However, it is too small by itself to serve its purpose as a handheld camera device as described herein.

Even standard sized camera modules are able to be installed on a micromotor driven platform that fits inside a housing as described herein. For instance, a production type camera module, used as a FaceTime camera module in an Apple phone product is a mere 6.0 mm×5.5 mm×3.8 mm thick, as disclosed in a Chipworks product teardown at http://www.chipworks.com/ko/node/359, which is incorporated herein by reference. OmniVision's OVM9724 CameraCubeChip has a size of 3.9×2.9×2.3 mm of which the datasheet is incorporated herein by reference. Even smaller camera modules, 1 mm×1 mm×1 mm are produced by AWAIBA Gmbh under the NanEye brand name of which a datasheet DS000501 named NanEye/NanEye Stereo Miniature Camera Module, v2-02.2018-Oct-05 downloaded from https://ams.com/documents/20143/36005NanEy-e_NanEyeStereo_DS000501_2-02.pdf/f46c15da-52fb-78fd-aea6-faf4cf784da2 is incorporated herein by reference.

For activating mechanisms as illustrated in FIGS. 52 and 53 microactuators may be used. Microactuators are taught in U.S. Pat. No. 10,033,303 to Liu et al. on Jul. 24, 2018 which is incorporated herein by reference. U.S. Pat. No. 9,939,608 to Peng et al. on Apr. 10, 2018 which is incorporated herein by reference teaches small (smaller than 4 mm) voice coil motors.

A requirement for the tracking camera as disclosed herein is that it fits in a relatively tight space of device 4300. As disclosed earlier herein, device 4300 should have some heft and size to be able to handle it comfortably, and should not be too small and not too large. A width of 6 cm in a range from 4 to 8 cm and a breadth of 4 cm in a range of 2 to 6 cm is in an acceptable range. The thickness of the device should preferably not be less than 0.5 cm and not thicker than 3 cm. A thickness of around 2-2.5 cm provides a good grip while not being too thin or too thick. Accordingly, for a preferred embodiment, the lateral size of 4300 (the large surface) has sufficient room to store all components. For thickness some limitations on the components exist.

Figure 55:
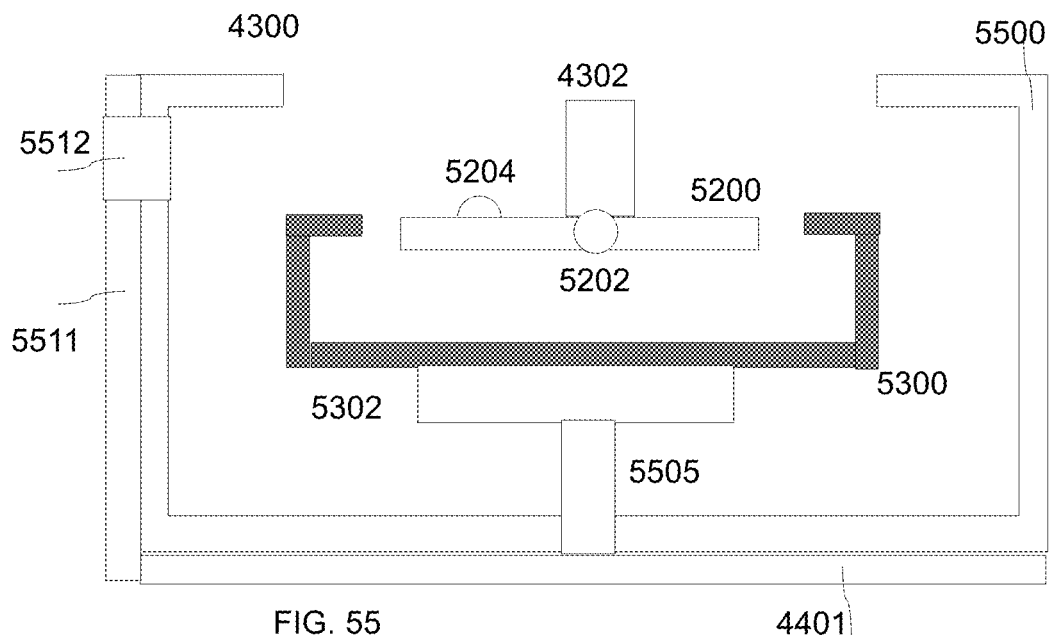
FIG. 55 illustrates a computing device with a camera in accordance with an aspect of the present invention.

FIG. 55 illustrates a cross section of an embodiment of a device 4300 with camera 4302 on platform 5200 with motorized hinges 5202 and 5204 to move/rotate camera 4302 in two planes. The platform 5200 is fixed on housing 5300 which is rotatable in the plane perpendicular to the plane of the drawing by motor 5302 on axis 5505 attached to housing 5500. Other structures and configurations are possible and are contemplated. The embodiment of FIG. 55 allows for spreading the components in horizontal direction. For instance motor 5302 can be a micro stepping motor placed to the side of 5302 and drive 5300 via gears. Motor 5300 may also be a processor controlled brushless DC micromotor. These motors are small and fit well within the requirements. In one embodiment of the present invention it is preferable that camera 4302 does not stick out above the surface of housing 5500. All housing and platforms are made of a material that provides sufficient structural strength at a thickness of 0.5 mm thick to 1 mm thick. Materials which those properties include certain polymers, metals such as steel and titanium, ceramics and graphene as an advanced material.

Considering material thickness of 0.5 mm, a length of axis 5505 of 2-3 mm and fixture 5302 (which may be a gear) of 2 mm one gets an expenditure of close to 7 mm. Carrying device 5300 requires a moving depth of up to 2 mm depending on the maximum rotation angle of 5200. Plus a depth of about 4 mm for camera 4302. This brings the total expenditure on depth to 13 mm. Well within the parameters of requirements for thickness In a further embodiment one may use thicker structural material, like 0.8 mm thick. This increases the budget for depth to about 15 mm, still well within the requirements. The motor/hinges 5202 and 5204 fall within room available of 4 mm up, offered by camera 4302. There are many mini and micro-actuators that will meet the requirements. For instance U.S. Pat. No. 7,355,305 to Nakamura et al. on Apr. 8, 2008, which is incorporated herein by reference, teaches mm size direct acting actuators. An overview of microactuators that implement the motors on 5202 and 5204 is provided in the article Microactuators-Principles, Applications, Trends by Dr. Ing. Janocha from Saarland University and downloaded on May 14 2019 from http://www.lpa.uni-saarland.de/pdf/a2-1.pdf and which is incorporated herein by reference.

Certain micromotors available at this time may be just too large for the present camera device. They may be in the 10 mm by 10 mm by 8 mm range. However, about 50% can be reduced in size. For instance, dimensions of commercially available micromotors and microactuators are determined by housing and support that are not needed to be incorporated inside 4300. Thus, the size of these actuators are reduced to not more than 5 mm by 5 mm by 4 mm and will fit inside the requirements of 4300. Signal paths for power and control are not shown in the figures as to not obscure other details, but are present. Connections between moving parts are formed by flexible ribbons of preferably insulated conductors or wires. Conductors on components in one embodiment are one or more thin layers of conductor material, attached to a surface of a component.

Direct connection networks are also sometimes called point-to-point connections or peer-to-peer connections. They have a physical aspect, the transmission medium and the transceiving equipment and a protocol. They can be wired, using galvanic or optical fiber connections, or wireless, using radio or optical transmissions. Wired USB is an example of direct connection. A connection may be a baseband connection or a modulated and/or coded (such as digitally coded, including PAM and PCM) connection. A direct connection is also offered by Bluetooth for wireless connections. Other types of P2P connections, such as via Wi-Fi over Internet are also available. The use of USB and Bluetooth herein provides illustrative examples of direct connections, other direct connections are known in the art and are fully contemplated.

Platforms like gimbals have 3 degrees of rotational freedom. Within the limitations as provided herein, the platform illustrated as a combination of 5200 with two degrees of rotational freedom and motorized 5300 with one degree of rotational freedom, illustrates a mechanical micro-platform within a housing that provides 3 degrees of rotational freedom relative to the housing. Other constructions and configurations are possible and are contemplated. For instance FIG. 52 illustrates how two degrees of rotational freedom are realized in one plane. This facilitates a minimized depth when expansion room is available in the direction of that plane. One may also construct the micro-platform in an orientation wherein depth is available but sideway expansion is limited. In that case one platform is hung in depth with brackets as in 5300. This allows the micro-platform with micro-camera to be oriented on the small side of the housing.

Figure 56:
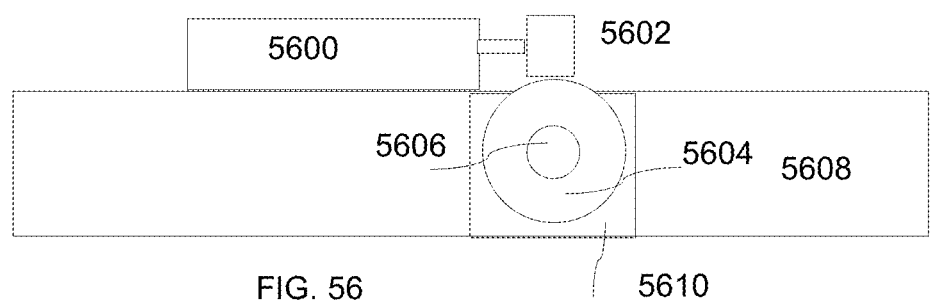
FIG. 56 illustrates a motorized platform in accordance with an aspect of the present invention.

Embodiments of micromotors/microactuators that displace over a considerable distances, millimeters to 10s of millimeters are piezoelectric devices. One of those devices is marketed by New Scale Technologies of Victor, N.Y. as what is called the SQUIGGLE Motor with dimensions of 1.8 by 1.8 by 6 mm. These SQUIGGLE motors are described on https://www.newscaletech.com/resources/technology/squiggle-micro-motor-technology/ which is incorporated herein by reference. An illustrative example of a micro SQUIGGLE-rotary motor is illustrated in FIG. 56. The SQUIGGLE motor 5600 is placed on a surface next to the axle 5606 attached to a platform 5800, and has a rotating wheel 5602. In one embodiment the wheel 5602 is perpendicular to 5606. In order to drive and rotate the axle 5606 a wormwheel gear set 5602 to 5604 is used to effectuate rotation of 5602 to a rotation of 5606. A recess 5610 is created in 5608 to allow wheel 5604 to be placed underneath 5602 without being obstructed by platform 5608 in its rotation. Other constructions are possible and are contemplated and will not substantially add to consume depth.

One purpose of device 4300 is to be a separate camera and camera controller for device 4200 as well a remote controller for 4200. When 4300 is of a sufficient size device 4300 can also serve as a remote controller of 4200, like reviewing emails and activating or deactivating devices that are controlled by 4200, including in one embodiment a camera on 4200. Screen 4401 is for instance greater than 5 $cm^2$, preferably greater than 9 $cm^2$ but not greater than 50 $cm^2$. In one embodiment of the present invention device 4200 is a controller of device 4300. Devices 4200 and 4300 exchange data, preferably in real-time or substantially in real-time that allows mutual viewing of image data in real-time from the remote camera. That is, all aspects of device 4300, including switching on/off of the device, including the display, the camera, selection of objects being tracked and all other aspects are able to be performed from 4200. To facilitate tracking, the field of view of camera 4302 is displayed, for instance on display 4401 of 4200 and/or display 4701 on 4200 in sectors. That is, the field of view of camera 4302 is divided into sectors, such as 2 sectors, preferably 4 sectors, more preferable 8 sectors and even more preferable 16 sectors, wherein a sector may be a rectangular part of a display. A user then can touch on a sector and a processor will select an object in the selected sector to be tracked. This makes selecting an object to be tracked by 4302 much easier and quicker. An object can also be individually selected for tracking. In that case, camera 4302 is directed to an object and an image is displayed in real-time, either on 4401 or 4701. A user can touch the area on the display with the object and the processor will extract or segment the object from its background and identify the object to be tracked.

In one embodiment of the present invention, an activation of a control, such as a sector on a display or a button or an item on a screen, moves the camera to place that item or sector in the center of the camera and of the screen. This is convenient when the housing is in a fixed position. The user then can direct the camera in a preferred or desired position, without moving the housing or substantially moving the housing.

In one embodiment of the present invention, an image of a scene with an object is recorded with camera 4302 and is associated with a position of device 4300 determined by sensors, such as inertial sensors and GPS sensors or other positional sensors. Recording of image and position may take place by activating a control such as a button or menu item on either 4200 or 4300. The static picture can be reviewed in any position, an object selected and the device 4300 can be put back in about the same position and pointing direction. In accordance with an aspect of the present invention, the position of the platforms 5300, 5205 and 4302 are being determined with positional coders as is known in the art. This allows a processor to determine a pointing position of the camera 4302 using the position of the device 4300 determined by the above disclosed positional and inertial sensors, 3-dimensional geometry, projective geometry and for instance RANSAC software as is known in the art. One may initially calibrate the position of device 4300 with camera in a neutral position and device 4200 with a fixed camera. determining of a calibration point and determining of a pointing direction is disclosed in for instance U.S. Pat. No. 7,741,961 to Rafii et al. issued on Jun. 22, 2010 and U.S. Ser. No. 13/058,962 to Garcia et al. filed on May 6, 2011 which are incorporated herein by reference. After selecting an object for tracking, device 4300 may be held up again to point in the general direction of the object and the processor will calculate and steer the camera to the position of the selected object by activating the motors of the platforms.

In one embodiment of the present invention, the initial position of 2 of more cameras with tracking capability is determined. A first camera tracks an object that is in its field-of-view. When the object leaves the field-of-view or is close to leaving a field-of-view, a hand-off of tracking is activated to the second camera that will have the object in its field-of-view. The hand-off includes a transfer of pointing direction based on the position of the first camera to the second device containing a pointing camera having its own position and with a processor that calculates the pointing direction of the second camera to track the object based on the position and pointing information of the first device and modified by the position data of the second device to point the tracking camera of the second device to the object. Transfer of data may include data that determines segmenting and/or tracking of an object in an image. The hand-off may be determined and calculated by a third computer networked with the first and second device and that has all data related to position and pointing direction of devices and cameras. When there are 3 or more tracking cameras or devices, the third computer determines a priority of which device takes over tracking from the first device.

Figure 57:
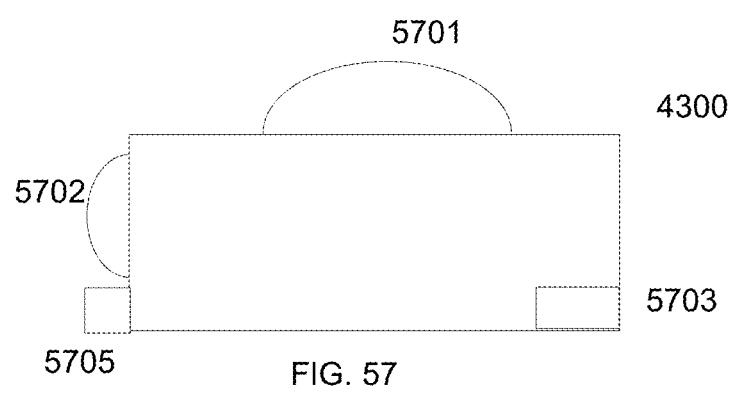
FIG. 57 illustrates a handheld and mobile computing device with a tracking camera in accordance with an aspect of the present invention.

Device 4300 with tracking camera 4302 is illustrated as the camera being below the surface of housing 4300, further including a battery 5511 to provide power and a connector 5512, for instance a micro-USB connector to connect a power cord and/or a network wire. Again, internal connections, such as power connections and signal bus are not drawn to prevent obscuring of the figure. However such connections are there and are fully contemplated. In one embodiment it is preferred that the tracking camera covers a wide field of view and the tracking camera 4302 of device 4300 is positioned so it stick out above the surface of the body 5500 of 4300. The camera is mechanically protected from the outside environment by dome 5701. In one embodiment of the present invention the camera with movement has an effective unobstructed view in a position preferably moved 60 degrees from its neutral (perpendicular) position and more preferably moved. In a further embodiment the camera is placed on the short side of the body with a protective dome 5702 as illustrated in FIG. 57. At a size of the short side of 2 cm this should not be a problem. A mechanical connector 5703 allows a mechanic support, like a pole or a tripod to be attached to 4300. Mechanical connector 5703 may also attach to a fixture attached to another object, like a wall, a drone, a vehicle, a person, a computing device or any other object that can carry device 4300.

The housing with the micro-camera attached to a moveable and controllable/controlled micro-platform inside the housing, in one embodiment of the present invention is box-shaped or substantially box shaped, with rectangular sides. In one embodiment the sides and/or corners of the box are rounded to provide a more pleasant grip. The housing may look or appear as a small version of a camera or smartphone or other portable electronic device. In one embodiment of the present invention, the device 4300 has more of a stick-like appearance as is illustrated in FIG. 57 with the tracking camera being located at 5702 or at a small end surface of the housing of 4300. In one illustrative example the housing has at least one end surface of preferably not larger than 10 $cm^2$, more preferably not larger than 5 $cm^2$ and of a length of preferably between 2-10 cm, but can be longer also. A display may cover one of the larger sides. This allows the device 4300 to be held as for instance a flash-light. A light element 5705 which may be one or more LEDs may be included to light the environment. The length of the housing may be used to store batteries to power the device. The shape of the housing is shown to be rectangular as an illustrative example. However, the shape may also be cylindrical, ellipsoid, half-cylindrical with one flat long side or any other shape that is convenient and may be within dimensions as disclosed earlier herein.

In accordance with an aspect of the present invention a small handheld portable and mobile device with tracking camera is provided with the tracking mechanism inside the housing of the handheld device. When the housing is made of opaque material the movable micro-platform is hidden from view. This is different from known tracking mechanisms attached to a housing of a camera and the mechanism or gimbal or platform being outside the housing of the camera. The handheld device being in direct and preferably wireless communication with a second computing device that is preferably a handheld and mobile computing device, preferably a smartphone or a tablet and wherein the device with the tracking mechanism is remotely controlled from the second computing device. A direct connection may be established over a network that guarantees the privacy of the connection. A direct distinction is made between a short distance direct connection such as a wired USB or wireless Bluetooth or other known short distance connections and private connections made over a wide area network such as Wi-Fi, internet, cellular network, wherein privacy is created through a VPN or other cryptographic circuits and methods.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A mobile and portable computing device to focus lenses on a scene, comprising: a plurality of cameras of at least three cameras on a same side of the mobile and portable computing device, each camera in the plurality of cameras having a lens and an image sensor, the plurality of cameras being included in a housing of the mobile and portable computing device, each camera being fixed in the housing; a focus sensor that determines during a calibration a first focus setting in a plurality of focus settings of a lens of a first camera in the plurality of cameras, the first focus setting depending on a distance of the housing to the scene; a memory that stores a first focus setting of a lens of a second camera based on the first focus setting of the lens of the first camera; the memory stores a plurality of focus settings of the lens of the second camera and of the third camera, each of the plurality of focus settings of the lens of the second camera and of the lens of the third camera being associated in the memory with a focus position of the lens of the first camera; and an auto-focus mechanism controlled by a controller enabled to place the lens of the first camera in the first focus position related to a scene based on an output of the focus sensor, the controller enabled to retrieve the first focus setting of the lens of the second camera and of the lens of the third camera from the memory and to place the lens of the second camera and the lens of the third camera in a first focus position based on the first focus setting of the lens of the first camera.

2. The mobile and portable computing device of claim 1, wherein the plurality of cameras generates a video image.

3. The mobile and portable computing device of claim 1, wherein the plurality of cameras generates a panoramic image.

4. The mobile and portable computing device of claim 1, wherein the mobile and portable computing device is a cellular phone.

5. The mobile and portable computing device of claim 1, wherein the mobile and portable computing device is a smartphone.

6. The mobile and portable computing device of claim 1, wherein the mobile and portable computing device is a tablet computer.

7. A method for lens focusing on a scene in a plurality of cameras,
each camera in the plurality of cameras including a lens and an image sensor, comprising:
determining during a calibration with a focus sensor a first focus setting in a plurality of focus settings of the lens of a first camera in the plurality of cameras including at least three cameras, the plurality of cameras being fixed on a same side of a housing of a portable and mobile computing device, the first focus setting depending on a distance of the housing to the scene;
storing on a memory a first focus setting of the lens of a second camera and a third camera in the housing based on the first focus setting of the lens of the first camera determined by the focus sensor;
storing on the memory a plurality of focus settings of the lens of the second camera and the third camera, each of the plurality of focus settings of the lens of the second camera and the lens of the third camera being associated in the memory with a focus setting of the lens of the first camera; and
placing by an auto-focus mechanism controlled by a controller the lens of the first camera in a first focus position related to a scene based on an output of the focus sensor, the controller enabled to retrieve the first focus setting of the lens of the second camera and the lens of the third camera from the memory and placing the lens of the second camera and the lens of the third camera in a first focus position based on the retrieved first focus setting of the lens of the first camera.

8. The method of claim 7, wherein the portable and mobile computing device has at least four cameras on the same side of the housing.

9. The method of claim 7, wherein the plurality of cameras generates a video image.

10. The method of claim 7, wherein the plurality of cameras generates a panoramic image.

11. The method of claim 7, wherein the mobile and portable computing device is a smartphone.

12. The method of claim 7, wherein the mobile and portable computing device is a tablet computer.

13. The mobile and portable computing device of claim 1, further comprising:
the memory stores additional data associated with the first focus setting of the lens of the first camera, the additional data determines an active sensor area of the image sensors of the first and the second camera, the active areas being smaller than a total pixel area of the image sensors and image data generated by the active areas of the first and second cameras establishing an aligned image.

14. The method of claim 7, further comprising:
storing in the memory additional data associated with the first focus setting of the lens of the first camera, the additional data determines an active sensor area of the image sensors of the first and the second camera, the active areas being smaller than a total pixel area of the image sensors and image data generated by the active areas of the first and second cameras establishing an aligned image.

* * * * *